(12) United States Patent
Otsuki

(10) Patent No.: US 10,164,337 B2
(45) Date of Patent: Dec. 25, 2018

(54) ANTENNA DEVICE

(71) Applicant: Takashi Otsuki, Hyogo (JP)

(72) Inventor: Takashi Otsuki, Hyogo (JP)

(73) Assignee: RICOH COMPANY, LTD., Tokyo (JP)

( * ) Notice: Subject to any disclaimer, the term of this patent is extended or adjusted under 35 U.S.C. 154(b) by 14 days.

(21) Appl. No.: 14/773,941

(22) PCT Filed: Mar. 13, 2014

(86) PCT No.: PCT/JP2014/057630
§ 371 (c)(1),
(2) Date: Sep. 9, 2015

(87) PCT Pub. No.: WO2014/142345
PCT Pub. Date: Sep. 18, 2014

(65) Prior Publication Data
US 2016/0028160 A1 Jan. 28, 2016

(30) Foreign Application Priority Data

Mar. 15, 2013 (JP) .................... 2013-053237
Mar. 28, 2013 (JP) .................... 2013-070150
Mar. 28, 2013 (JP) .................... 2013-070151

(51) Int. Cl.
H01Q 7/08 (2006.01)
H01Q 7/06 (2006.01)
G06K 19/077 (2006.01)
H01Q 21/24 (2006.01)

(52) U.S. Cl.
CPC ......... H01Q 7/08 (2013.01); G06K 19/07777 (2013.01); H01Q 7/06 (2013.01); H01Q 21/24 (2013.01)

(58) Field of Classification Search
CPC ............ H01Q 7/08; H01Q 7/06; H01Q 1/273; H01Q 1/38
USPC ........................ 343/788, 878, 850
See application file for complete search history.

(56) References Cited

U.S. PATENT DOCUMENTS

| 5,587,719 | A | * | 12/1996 | Steffy | ............ | B64G 1/22 343/853 |
| 7,511,679 | B2 | | 3/2009 | Araki et al. | | |
| 8,294,629 | B2 | | 10/2012 | Yosui et al. | | |
| 8,794,534 | B2 | | 8/2014 | Oshima | | |
| 2003/0222829 | A1 | | 12/2003 | Kitahara et al. | | |
| 2005/0162331 | A1 | * | 7/2005 | Endo | ............ | G06K 7/10336 343/788 |

(Continued)

FOREIGN PATENT DOCUMENTS

JP 63-115403 5/1988
JP 6-59046 3/1994

(Continued)

OTHER PUBLICATIONS

JP2008-42761A_English.*

(Continued)

Primary Examiner — Dameon E Levi
Assistant Examiner — Collin Dawkins
(74) Attorney, Agent, or Firm — Cooper & Dunham LLP

(57) ABSTRACT

An antenna device of a magnetic coupling type includes a magnetic body having a plate-like shape; and a coil, which is wound around the magnetic body.

11 Claims, 55 Drawing Sheets

(56) References Cited

U.S. PATENT DOCUMENTS

| | | | | |
|---|---|---|---|---|
| 2007/0195001 | A1* | 8/2007 | Ueda | H01Q 21/24 343/788 |
| 2007/0273596 | A1 | 11/2007 | Nakamura et al. | |
| 2008/0007473 | A1* | 1/2008 | Yosui | H01Q 1/2225 343/788 |
| 2008/0129629 | A1 | 6/2008 | Kimura et al. | |
| 2012/0112971 | A1* | 5/2012 | Takeyama | H01Q 1/243 343/702 |

FOREIGN PATENT DOCUMENTS

| | | | | |
|---|---|---|---|---|
| JP | 10-22722 | 1/1998 | | |
| JP | 10-75113 | 3/1998 | | |
| JP | 2002-298116 | 10/2002 | | |
| JP | 2003-218626 | 7/2003 | | |
| JP | 2003-318633 | 11/2003 | | |
| JP | 2004-200829 | 7/2004 | | |
| JP | 2005-39809 | 2/2005 | | |
| JP | 2005-318102 | 11/2005 | | |
| JP | 2006-050522 | 2/2006 | | |
| JP | 3121577 U | 5/2006 | | |
| JP | 2006-295981 | 10/2006 | | |
| JP | 2007-019891 | 1/2007 | | |
| JP | 2007-028114 | 2/2007 | | |
| JP | 3956172 | 8/2007 | | |
| JP | 2008-042761 | 2/2008 | | |
| JP | 2008042761 A | * | 2/2008 | H01Q 1/52 |
| JP | 4265114 | 5/2009 | | |
| JP | 2010-056982 | 3/2010 | | |
| JP | 2011-193052 | 9/2011 | | |
| JP | 2011-244316 | 12/2011 | | |
| JP | 2012-181684 | 9/2012 | | |
| JP | 2014-075109 | 4/2014 | | |
| WO | WO 2005/0029639 A1 | 3/2005 | | |
| WO | 2010/013992 A1 | 2/2010 | | |
| WO | 2014/042277 A1 | 3/2014 | | |

OTHER PUBLICATIONS

Singapore official action dated Jul. 25, 2016 in corresponding Singapore Patent Application No. 11201507502T.
International Search Report dated Jul. 1, 2014 in PCT/JP2014/057630 filed Mar. 13, 2014.
Japanese official action dated Jun. 6, 2017 in connection with corresponding Japanese patent application No. 2013-070151.
Japanese official action dated Apr. 4, 2017 in connection with corresponding Japanese patent application No. 2013-053237.
European official communication dated Mar. 21, 2018 in connection with corresponding European patent application No. 14763106.3.

* cited by examiner

FIG.5A
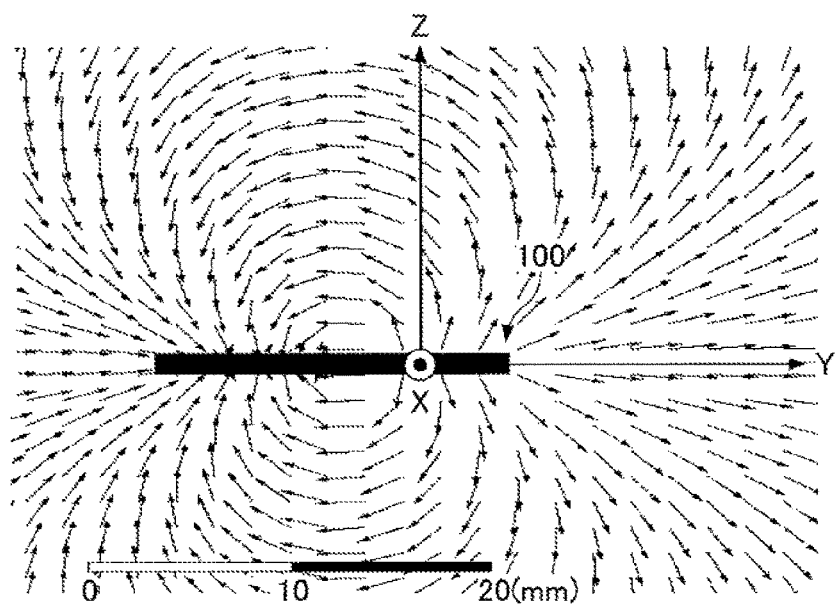
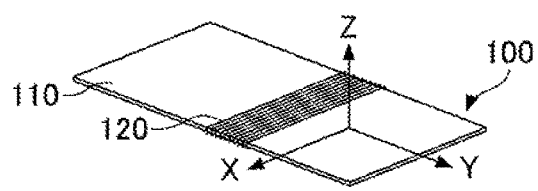
FIG.5B
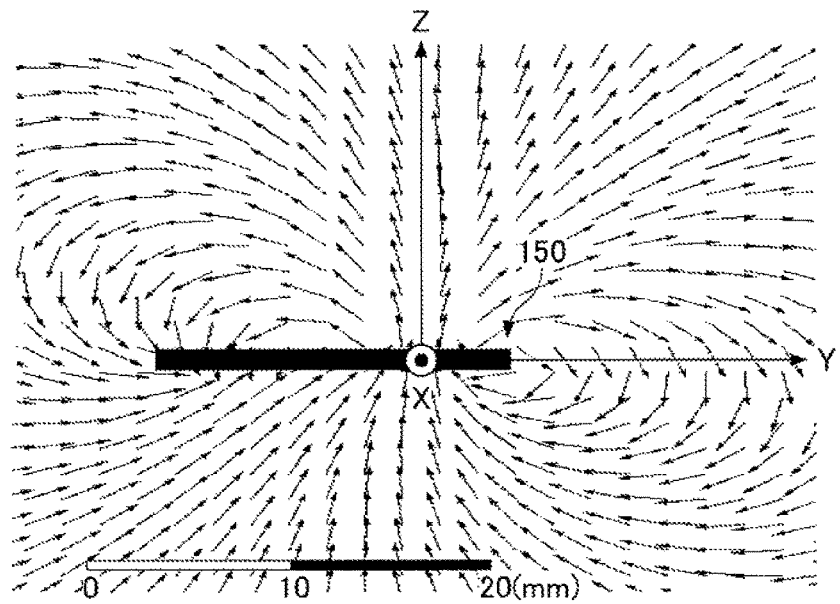
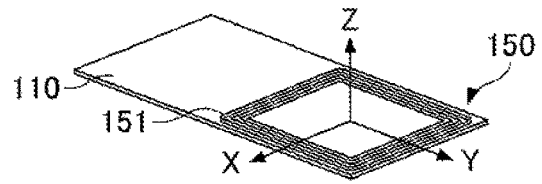

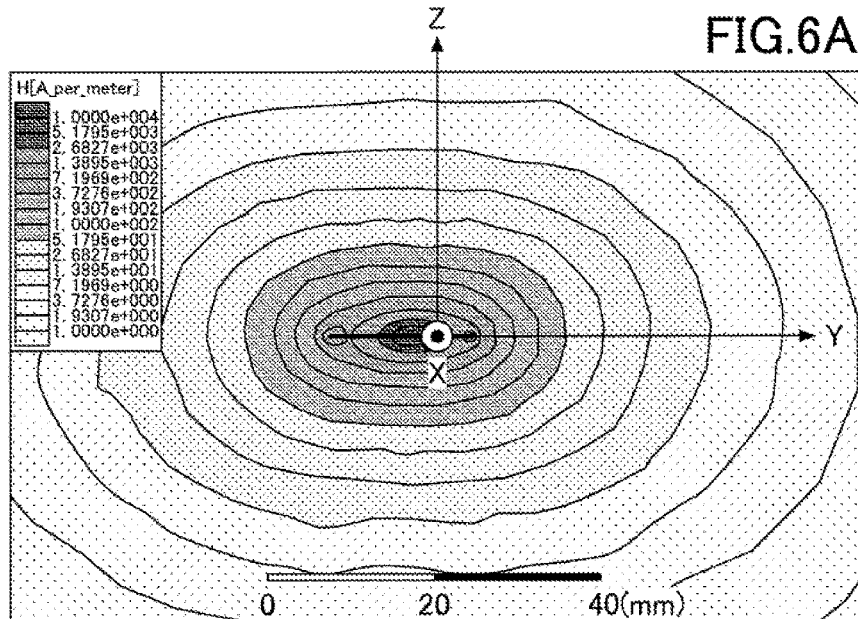
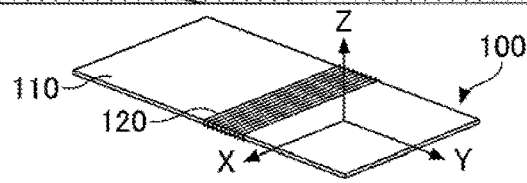
FIG.6A
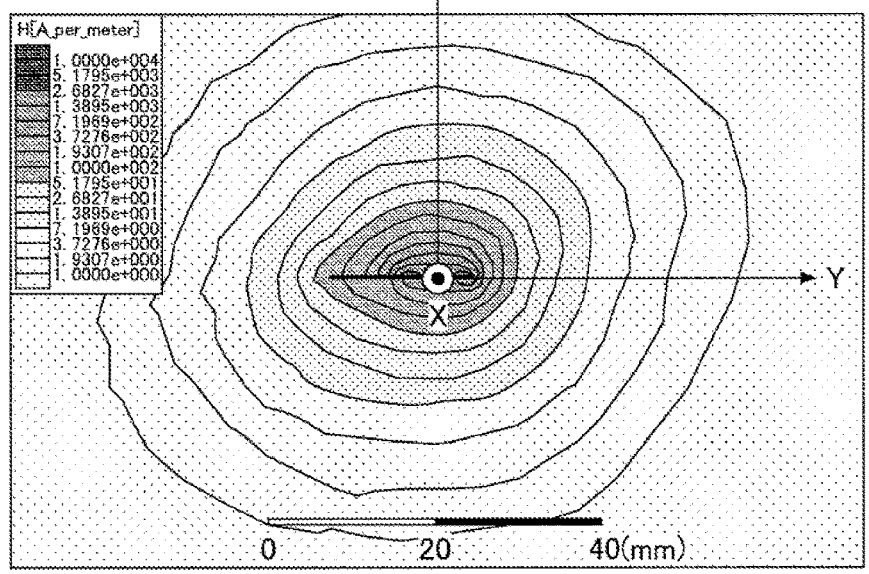
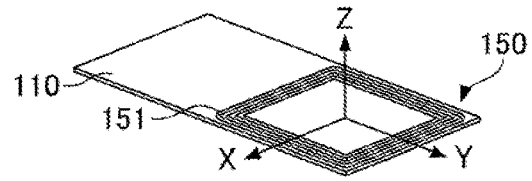
FIG.6B

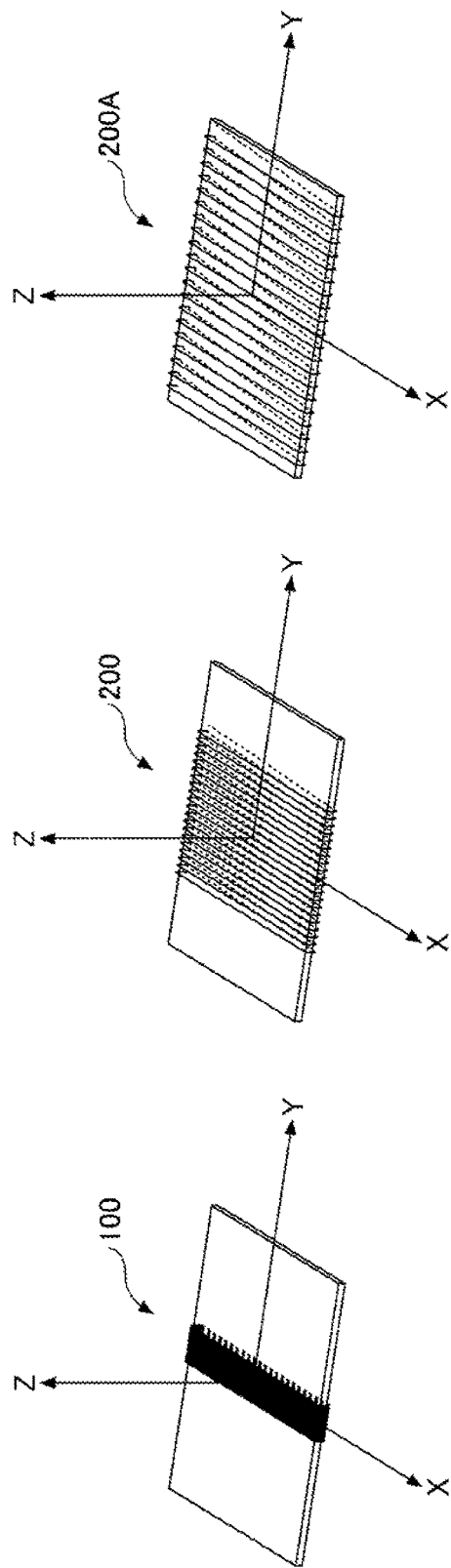

FIG.25A
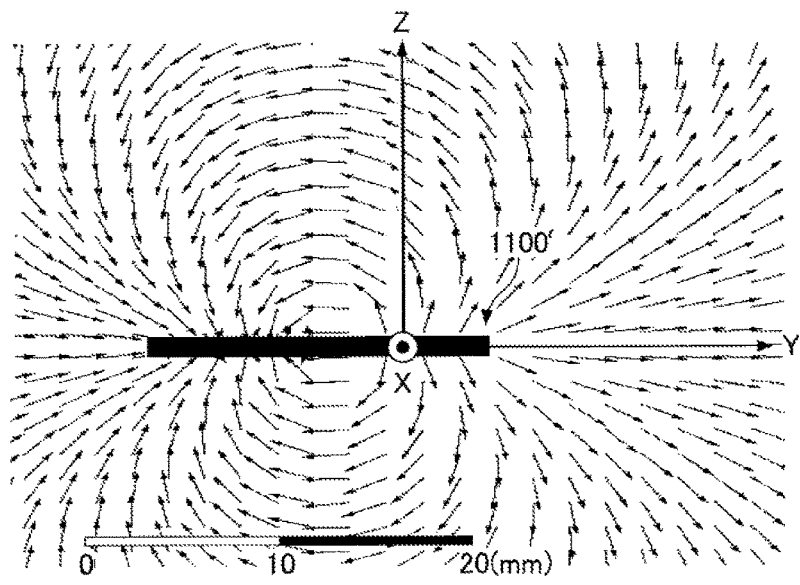
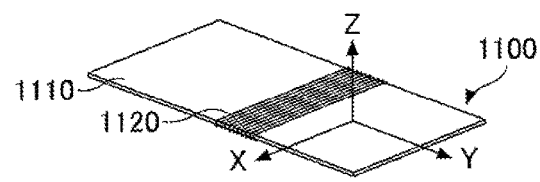
FIG.25B
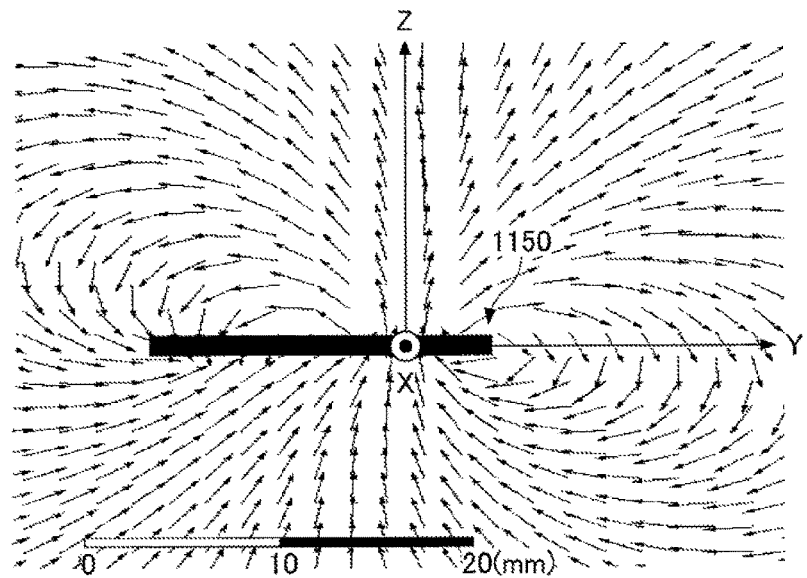
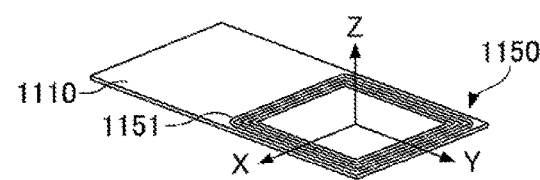

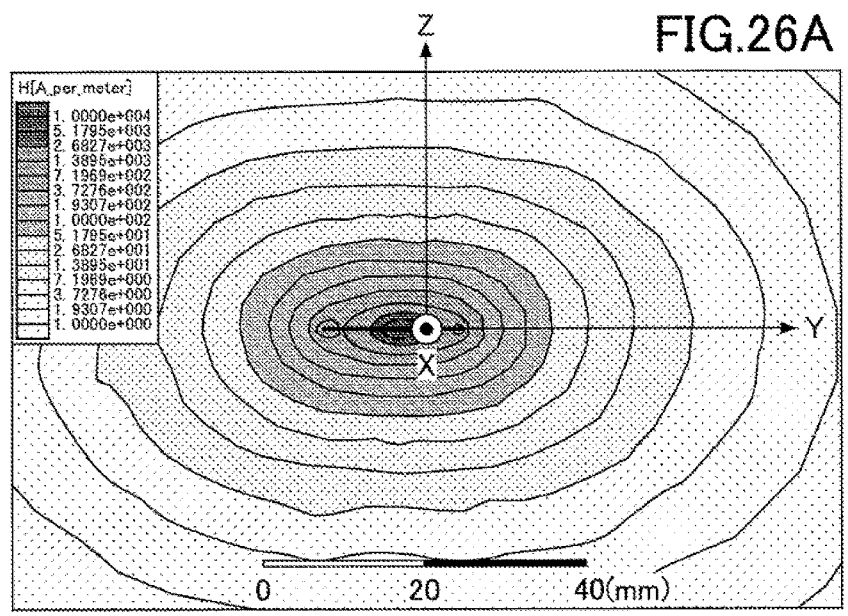
FIG.26A
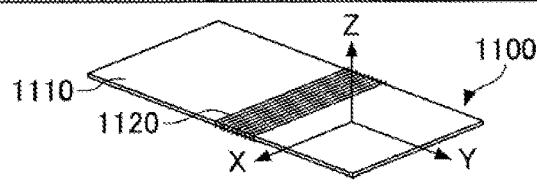
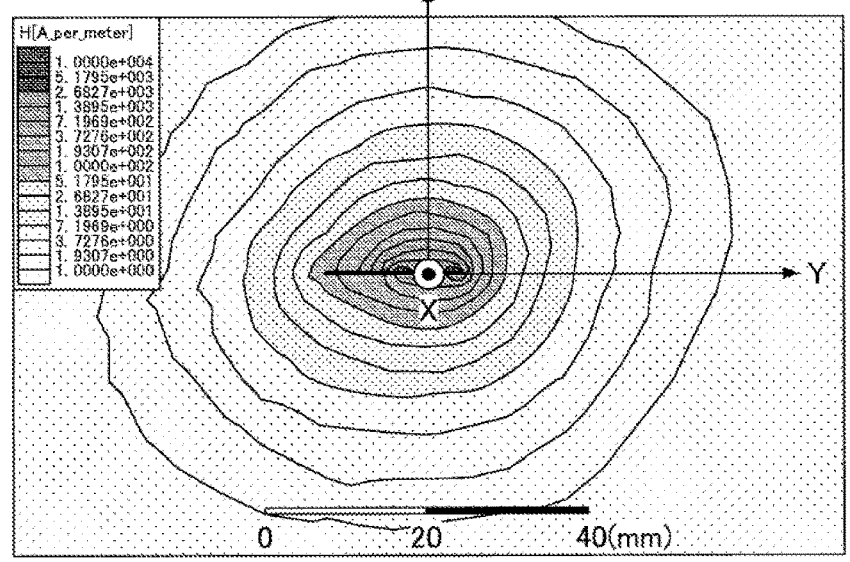
FIG.26B
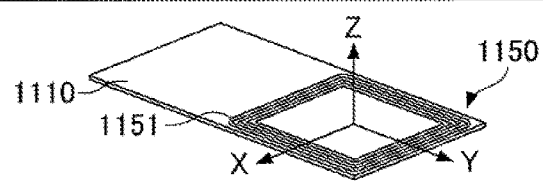

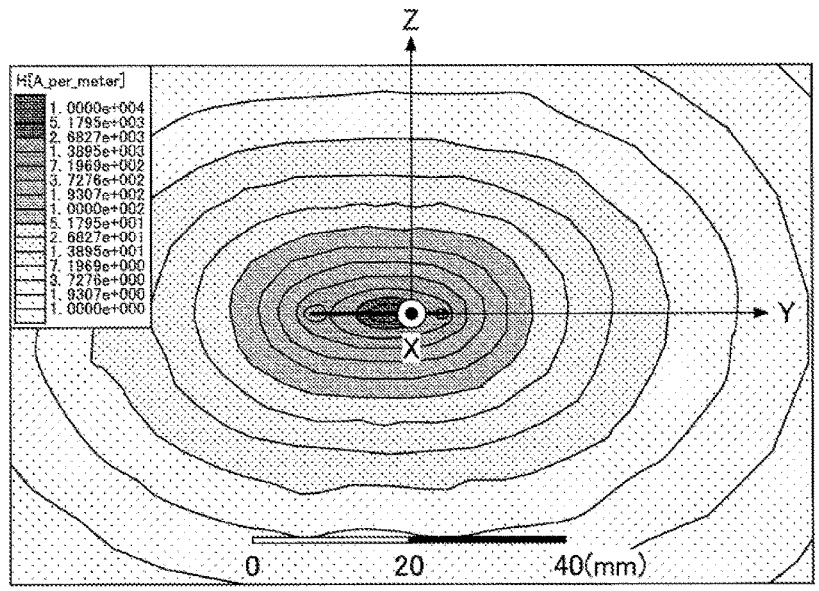
FIG.45A
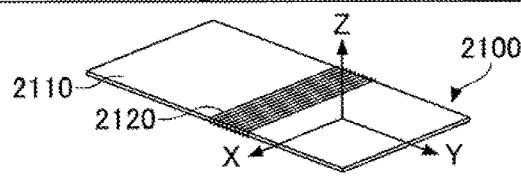
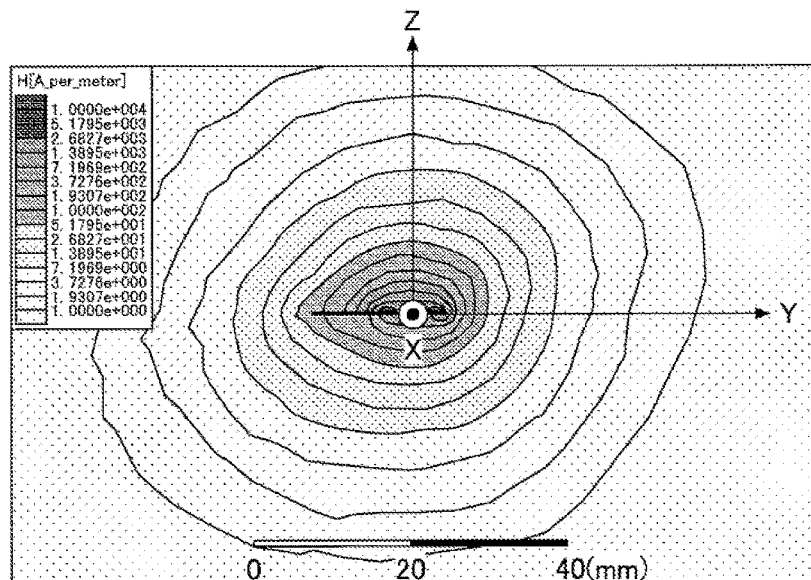
FIG.45B
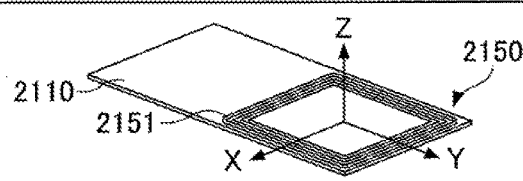

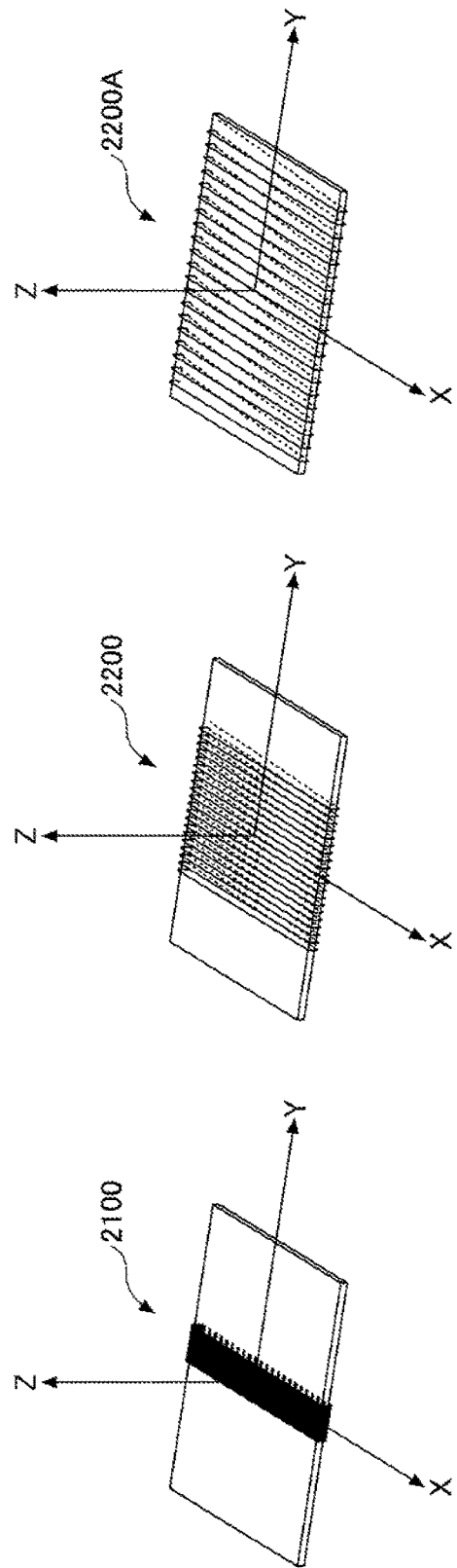

ANTENNA DEVICE

TECHNICAL FIELD

The present invention relates to an antenna device.

BACKGROUND ART

Some magnetic antennas include a flexible substrate, on which a coil conductor is formed, which is wrapped around a surface of a magnetic core. In such a magnetic antenna, the magnetic core is a plate-like body having at least two parallel sides, and the coil conductor forms a rectangular spiral shape with at least two parallel sides where a winding center is a conductor opening. Patent Document 1 discloses a magnetic antenna, in which a flexible substrate is bent along two sides of a coil conductor separated from a center of a conductor opening and along two sides of the magnetic core.

Moreover, some magnetic sensor type antennas arranged inside a chassis, have magnetic cores including a magnetic body around which coils are wound, and receive magnetic components in electromagnetic waves. Patent Document 2 discloses a magnetic sensor type antenna, in which an end portion of the magnetic core collecting magnetic fluxes is bent in a direction moving away from an adjacent chassis or an adjacent metal part inside the chassis.

CITATION LIST

Patent Literature

Patent Document 1: Japanese Published Patent Application No. 2010-056982; and
Patent Document 2: Japanese Published Patent Application No. 2006-050522.

DISCLOSURE OF INVENTION

Problem to be Solved by the Invention

However, by the magnetic antenna disclosed in Patent Document 1 or Patent Document 2, which are magnetic sensor types, it is difficult to communicate over long distances.

Moreover, a resonant type antenna in the related art cannot be used for magnetic coupling communication, because the communication distance is long.

In view of the above subject matter, it is a general object of at least one embodiment of the present invention to provide an antenna device, which is a magnetic coupling type antenna that can communicate over long distances.

Means to be Solve the Problem

In order to solve the above problem, according to an aspect of the present invention, an antenna device of a magnetic coupling type includes a magnetic body having a plate-like shape; and a coil, which is wound around the magnetic body.

According to another aspect of the invention, an antenna device of a magnetic coupling type includes a magnetic body including a first magnetic body part having a plate-like shape; and a second magnetic body part having a plate-like shape, which is connected at an angle to the first magnetic body part; a first antenna which has a coiled shape and is wound around the first magnetic body part; and a second antenna which has a coiled shape and is wound around the second magnetic body part which generates a magnetic field, a polarity of which is opposite to a polarity of a magnetic field generated by the first antenna.

Effects of the Present Invention

According to the present invention, a magnetic coupling type antenna device having a long communication distance is provided.

BRIEF DESCRIPTION OF DRAWINGS

FIG. 5A is a diagram illustrating an example of a result of a simulation for a density of magnetic flux B around the antenna device 100 according to the first embodiment;

FIG. 5B is a diagram illustrating an example of a result of a simulation for a density of magnetic flux B around the antenna device for comparison 150;

FIG. 6A is a diagram illustrating an example of a result of a simulation for a magnetic field H around the antenna device 100 according to the first embodiment;

FIG. 6B is a diagram illustrating an example of a result of a simulation for a magnetic field H around the antenna device for comparison 150;

FIG. 13 is a perspective view illustrating an example of the antenna device 100 according to the first embodiment and the antenna devices 200 and 200A according to the second embodiment;

FIG. 25A is a diagram illustrating an example of a result of a simulation for a density of magnetic flux B around the antenna device 1100 according to the third embodiment;

FIG. 25B is a diagram illustrating an example of a result of a simulation for a density of magnetic flux B around the antenna unit for comparison 1150;

FIG. 26A is a diagram illustrating an example of a result of a simulation for a magnetic field H around the antenna device 1100 according to the third embodiment;

FIG. 26B is a diagram illustrating an example of a result of a simulation for a magnetic field H around the antenna unit for comparison 1150;

FIG. 45A is a diagram illustrating an example of a result of a simulation for a magnetic field H around the antenna device 2100 according to the fifth embodiment;

FIG. 45B is a diagram illustrating an example of a result of a simulation for a magnetic field H around the antenna unit for comparison 2150;

FIG. 52 is a perspective view illustrating an example of the antenna device 2100 according to the fifth embodiment and the antenna units 2200 and 2200A according to the sixth embodiment;

BEST MODE FOR CARRYING OUT THE INVENTION

Although the present invention will be described with reference to embodiments, the present invention is not limited to these embodiments, but various variations and modifications may be made without departing from the scope of the invention as set forth in the accompanying claims.

In the following, embodiments to which an antenna device according to the present invention is applied will be described.

<First Embodiment>

Figure 1:
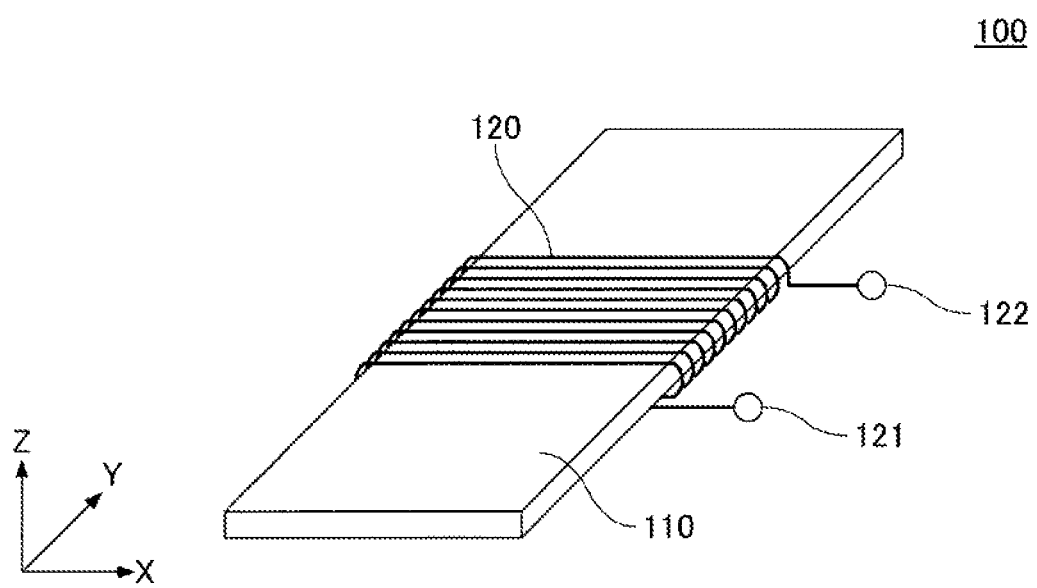
FIG. 1 is a perspective view illustrating an example of an antenna device 100 according to a first embodiment.
Figure 2:
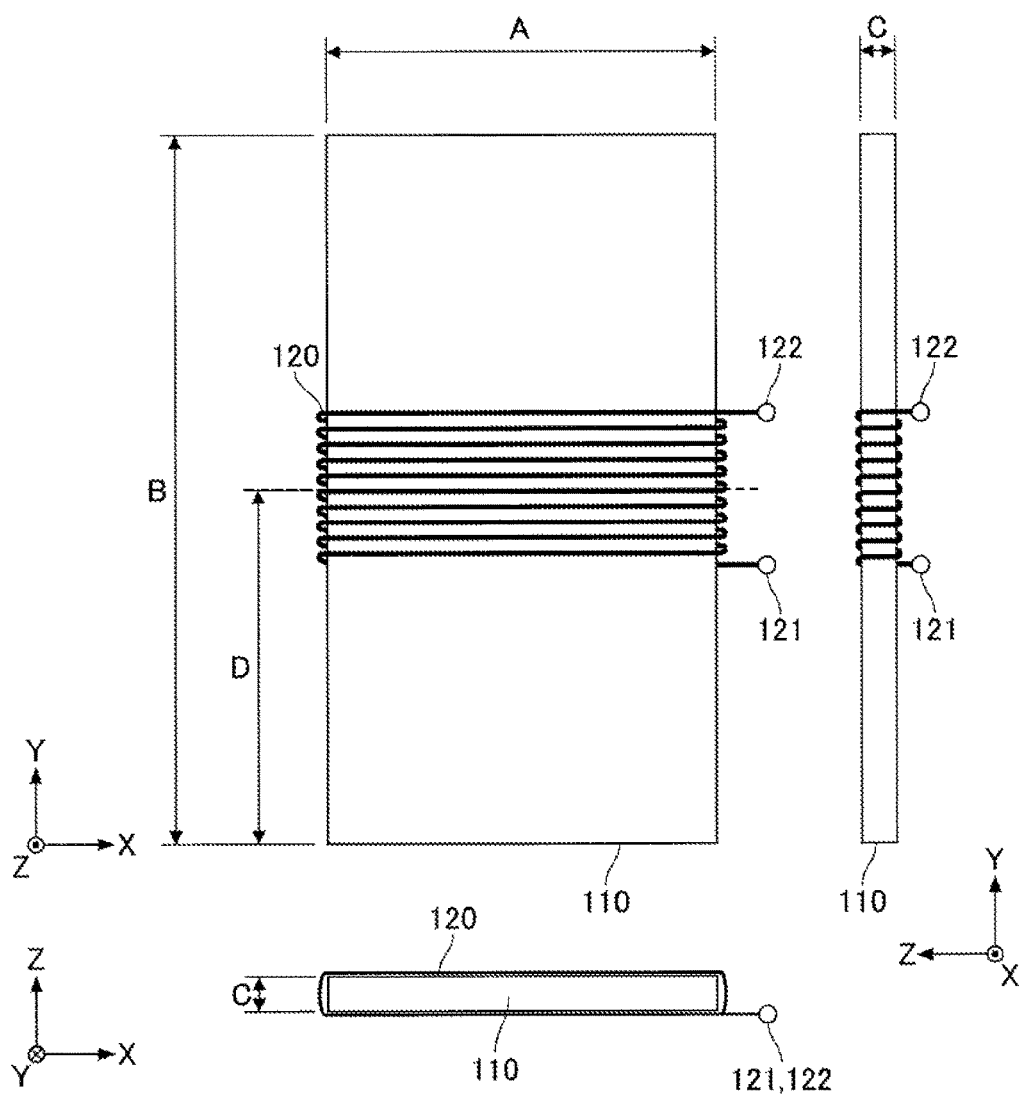
FIG. 2 is a top-front-side view illustrating an example of the antenna device 100 according to the first embodiment.

FIG. 1 is a perspective view illustrating an antenna device 100 according to a first embodiment. FIG. 2 is a top-front-side view illustrating the antenna device 100 according to the first embodiment. In FIGS. 1 and 2, an XYZ coordinate system, which is an orthogonal coordinate system, is employed.

The antenna device 100 is a magnetic coupling type antenna device, and includes a magnetic body 110 and a coil 120.

The magnetic coupling type antenna device 100 is different from a resonant type antenna device, which sends/receives electromagnetic waves by resonating with an electromagnetic wave of a specific frequency. Whereas, the magnetic coupling type antenna device 100 is an antenna device which magnetically couples to the magnetic flux generated from an antenna device in an other communication party, to perform communication.

Accordingly, a communication distance of the resonance type antenna device is from a few meters to more than several kilometers. On the other hand, the communication distance of the magnetic coupling type device 100 is, for example, about one meter or less.

That is, the magnetic coupling type antenna device 100 is an antenna device for short distance communication or proximity communication. The antenna device 100, for example, sends/receives a signal with a frequency of 13.56 MHz.

A magnetic body 110 is a cuboid-shaped sintered ferrite, and for example, may have a short direction length (X-axis direction) A of 11 mm, a longitudinal direction length (Y-axis direction) B of 14 mm, and a thickness (Z-axis direction) C of 0.2 mm.

A size of the magnetic body 110, as above, is an example. The magnetic body 110 may have the short direction length (X-axis direction) A of 6 mm, the longitudinal direction length (Y-axis direction) B of 24 mm and the thickness (Z-axis direction) C of 0.2 mm.

The magnetic body 110 is only required to be plate-like, and the shape of the magnetic body 110 may be determined according to the size or the shape of a space where the antenna device 100 is implemented. The magnetic body 110 is not limited to a sintered ferrite, but may use any ferromagnetic body, such as iron, nickel, cobalt, or an alloy of these metals. Moreover, the magnetic body 110 may be a flexible sheet-like member having flexibility.

A coil 120 is an example of a coiled antenna (coil antenna) which is wound in the short direction of the magnetic body 110 (X-axis direction) around the magnetic body 110 at a central region in the longitudinal direction of the magnetic body 110 (Y-axis direction). Accordingly, a distance D between the center of the region where the coil 120 is wound around the magnetic body 110 in the Y-axis direction and the end portion of the magnetic body 110 on the side of the negative direction of the Y-axis is 7 mm where the length B is 14 mm. When the length B is 24 mm, the length D is 12 mm.

Both ends 121 and 122 of the coil 120 are connected to a communication unit of a device which performs communication using the antenna device 100.

As a coil 120, for example, a copper line may be used. A diameter of the coil 120 (wire diameter) may, for example, be 50 μm. A number of turns of the coil 120 may be, for example, about twenty. Wires in the coil 120 wound around the magnetic body 110 are wound so as to be closely in contact with each other.

The winding of the coil 120, as above, will be denoted as "close coiling" in the following. Moreover, on a surface of the conductor wire used for the coil 120 an enamel coating is applied. The diameter of the coil 120 is 69 μm including the enamel coating.

Meanwhile, the diameter or the number of turns is an example, and they may be arbitrarily determined according to a purpose of the antenna device 100 or the like.

Moreover, in the present embodiment, the coil 120 is wound around the magnetic body 110 in the short direction of the magnetic body 110. The coil 120 wound around the magnetic body 110 in the short direction of the magnetic body 110, as shown in FIG. 2, is considered to have a better characteristic than the coil 120 wound around the magnetic body 110 in the longitudinal direction of the magnetic body 110.

This is because demagnetizing fields are generated at both end portions of the magnetic body 110 (at the end portion on the side of the negative direction of the Y-axis, and at the end portion on the side of the positive direction of the Y-axis) by the coil 120 wound in the short direction of the magnetic body 110 in a looped shape. The influence of the demagnetizing field becomes smaller as the distance between the part where the coil 120 is wound and the end portions of the magnetic body 110.

Moreover, the coil wound around the magnetic body 110 in the longitudinal direction of the magnetic body has a larger cross section than that of the coil wound in the short direction of the magnetic body and the magnetic resistance becomes smaller.

When the magnetic resistance increases, a magnetic field in a different direction from the Y-axis may occur, which will be explained later. On the other hand, when the magnetic resistance decreases, only the magnetic field in the Y-axis direction is used, and a range of use is restricted depending on the requirement or specification of the antenna.

For these reasons, the coil is preferably wound around the magnetic body 110 in the short direction of the magnetic body 110. Moreover, the magnetic body 110 preferably has a rectangular shape from a planar view. Moreover, the coil 120 is wound preferably at a central region of the magnetic body 110, not at the end portion of the magnetic body.

Next, the antenna device 100 according to the present embodiment will be compared with an antenna device for comparison 150 having a planar antenna. The antenna device for comparison 150 will be explained with reference to FIGS. 3 and 4.

Figure 3:
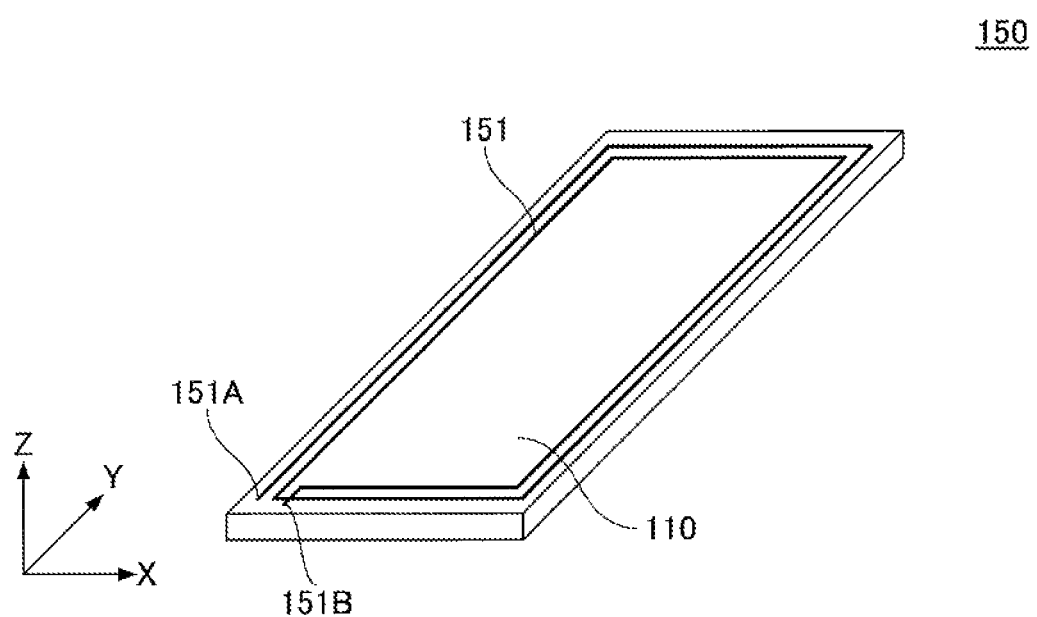
FIG. 3 is a perspective view illustrating an antenna device for comparison 150.
Figure 4:
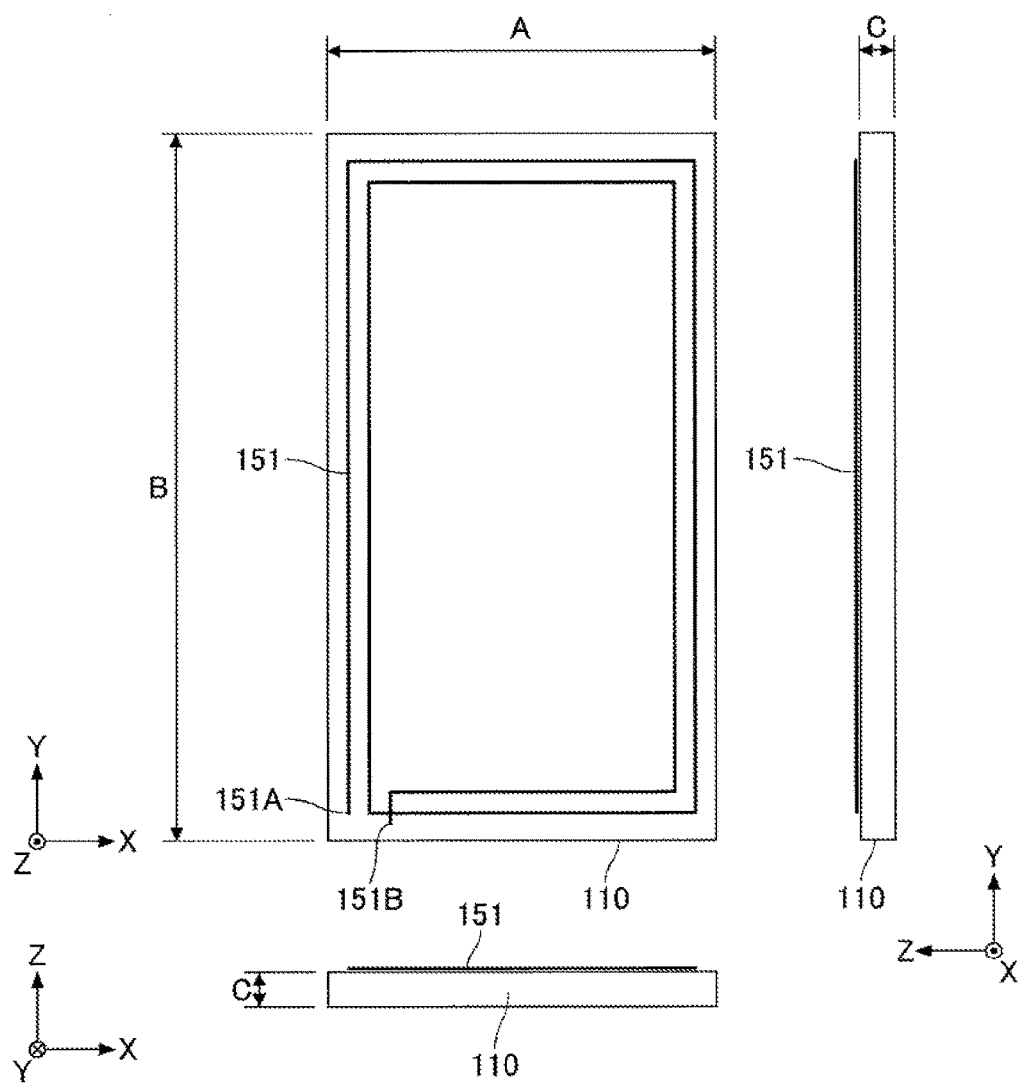
FIG. 4 is a top-front-side view illustrating the antenna device for comparison 150.

FIG. 3 is a perspective view illustrating the antenna device for comparison 150. FIG. 4 is a top-front-side view illustrating the antenna device for comparison 150. In FIGS. 3 and 4, as in the FIGS. 1 and 2, the XYZ coordinate system, which is an orthogonal coordinate system, is employed.

The antenna device for comparison 150 is a magnetic coupling type antenna device, as well as the antenna device 100 according to the first embodiment, and includes a magnetic body 110 and a planar antenna 151. The magnetic body 110 in the antenna device for comparison 150 is the same as the magnetic body in the antenna device 100 according to the present embodiment.

The planar antenna 151 is a copper line which is wound in a rectangular shape along an outer periphery of a surface on a positive side in the Z-axis direction of the magnetic body 110. A number of turns of the planar antenna 151 is, for example, two. Both ends 151A and 151B of the planar antenna 151 are connected to a communication unit in an apparatus, which performs communication using the antenna device 150.

Next, with reference to FIGS. 5A to 6B, results of electromagnetic field simulations will be explained for the antenna device 100 according to the first embodiment and the antenna device for comparison 150.

FIGS. 5A and 5B are diagrams illustrating results of simulations for density of magnetic flux B around the antenna device 100 according to the first embodiment and the antenna device for comparison 150, respectively. FIG. 5A shows the density of magnetic flux B of the antenna device 100, and FIG. 5B shows the density of magnetic flux B of the antenna device 150.

In FIGS. 5A and 5B, directions of arrows indicate directions of the density of magnetic flux B (directions of vectors).

Moreover, in the electromagnetic field simulations, models for the antenna device 100 and antenna device 150, which are shown in lower parts of FIGS. 5A and 5B, respectively. In the antenna device 100, the origin of the XYZ coordinate system is on the surface on the positive side in the Z-axis direction of the magnetic body 110 (Z=0), at a center of the magnetic body 110 in the short direction (X=0), and at the midpoint of the end portion of the magnetic body 110 on the positive side in the Y-axis direction and an end portion of the coil 120 on the positive side in the Y-axis direction.

Moreover, in the antenna device 150, on the positive side in the Y-axis direction, on a half of the surface on the positive side in the Z-axis direction, the planar antenna 151 having a rectangular shape is disposed, and the origin of the XYZ coordinate system is set at the center of the loop of the planar antenna 151. Positions of the origins are the same in FIGS. 5A and 5B.

Comparing FIGS. 5A and 5B, it is found that the density of magnetic flux by the antenna device for comparison 150 is concentrated around the Z-axis in the Z-axis direction, and that the density of magnetic flux by the antenna device according to the first embodiment is widely distributed in the total YZ-plane.

Moreover, strengths of the magnetic field H at a point separated in the Z-axis direction from the origin are found to be almost equivalent between the antenna device 100 according to the first embodiment and the antenna device for comparison 150.

A density of magnetic flux B around the antenna device for comparison 150 is distributed so as to arise from the planar coil 151 in the positive direction of the Z-axis, turn to the positive and negative directions of the Y-axis, and return to the planar coil 151 from the side of the negative direction of the Z-axis.

A density of magnetic flux B around the antenna device 100 according to the first embodiment is distributed so as to arise from the coil 120 in the positive direction of the Y-axis, turn to the positive and negative directions of the Z-axis, and return to the coil 120 from the side of the negative direction of the Y-axis.

Moreover, at a position separated from the origin in the Y-axis direction, the magnetic field H and the density of magnetic flux B of the antenna device 100 according to the first embodiment are found to be higher than those of the antenna device for comparison 150, respectively.

FIGS. 6A and 6B show results of simulations for the magnetic field H around the antenna device 100 according to the first embodiment and the antenna device for comparison 150, respectively. FIG. 6A shows the magnetic field H of the antenna device 100, and FIG. 6B shows the magnetic field H of the antenna device 150.

In the simulations for the magnetic field H, as shown in FIGS. 6A and 6B, the same models for the antenna devices 100 and 150 as in FIGS. 5A and 5B are employed, and the positions of the origins in the XYZ coordinate system are the same as in FIGS. 5A and 5B, respectively.

In FIGS. 6A and 6B, the magnetic field in a dark region is higher than that in a lighter region.

As shown in FIGS. 6A and 6B, compared with the magnetic field H formed by the antenna device for comparison 150 (FIG. 6B), the magnetic field H formed by the antenna device 100 according to the first embodiment (FIG. 6A) is found to show overall higher values. Moreover, also at positions separated from the origin in the Z-axis direction and in the Y-axis direction, higher values of the magnetic field are obtained for the antenna device 100 according to the first embodiment.

As described above, from the results of the electromagnetic field simulation, shown in FIGS. 5A to 6B, the distribution of the density of magnetic flux B is found to be quite different between the antenna device 100 according to the first embodiment and the antenna device for comparison 150.

Moreover, the magnetic field H of the antenna device 100 according to the first embodiment is higher in a wider area than that of the antenna device for comparison 150, and also at positions separated from the origin in the Z-axis direction and in the Y-axis direction, higher values are obtained.

When an electric current is applied to the planar antenna in the antenna device for comparison 150, a magnetic field H in the Z-axis direction arises according to Ampere's right-handed screw rule.

Since the directions of the magnetic field H and of the magnetic flux B are the same, the magnetic flux from the planar coil 151 of the antenna device for comparison 150 is radiated from the magnetic body 110 in the Z-axis direction, and as shown in FIG. 5B, forms a distribution having a shape of a figure eight rotated by 90 degrees with a center at the origin.

On the other hand, in the antenna device 100 according to the first embodiment, the magnetic field H formed by the coil 120, which is wound around the magnetic body 110 in a form of a loop, has a direction of the Y-axis according to the Ampere's right-handed screw rule.

For this reason, in the case of the antenna device 100 according to the first embodiment, the magnetic flux by the coil 120 propagates in the Y-axis direction inside the magnetic body 110.

In this way, the magnetic flux by the coil 120 has the direction of the Y-axis, but on the whole, as shown in FIG. 5A, the magnetic flux by the antenna device 100 according to the first embodiment is found to be distributed in the Z-axis direction. Moreover, the magnetic field H generated by the coil 120 is found to spread also in the Z-axis direction, as shown in FIG. 6A.

Since a magnetic resistance inside the magnetic body 110 is higher than that outside the magnetic body (in the air), a magnetic flux having the Y-axis direction generated by the antenna device 100 propagates in a space where the magnetic resistance is lower, i.e. outside the magnetic body 110.

For this reason, in the antenna device 100 according to the first embodiment, the magnetic flux having the Y-axis direction generated inside the magnetic body 110 by the coil 120 spreads outside the magnetic body 110, and is considered to spread also to the Z-axis direction (see FIG. 5A).

Moreover, the magnetic body 110 has a length in the Z-axis direction which is quite small compared with the lengths in the Z-axis direction and the Y-axis direction. That is, the magnetic body 110 is quite like a thin plate-like member. This means that a cross section of the magnetic body 110 parallel to the XZ-plane is small and thin in the Z-axis direction.

In general, the magnetic resistance of the magnetic body becomes higher, as the cross section becomes smaller. For this reason, the magnetic resistance of the magnetic body 110 according to the first embodiment is quite high.

Accordingly, when an electric current is applied to the coil 120 of the antenna device 100 according to the first embodiment, the magnetic flux generated inside the magnetic body 110 in the Y-axis direction enters a state easily radiated in the Z-axis direction.

For this reason, in the antenna device 100, making the thickness of the magnetic body 110 thin is effective for obtaining a long communication distance in the Z-axis direction (direction of the thickness of the magnetic body 110).

Next, with reference to FIGS. 7 and 8, a communication distance in the case where the antenna device 100 according to the first embodiment is mounted on a PCB (Printer Circuit Board) 130 will be explained.

Figure 7:
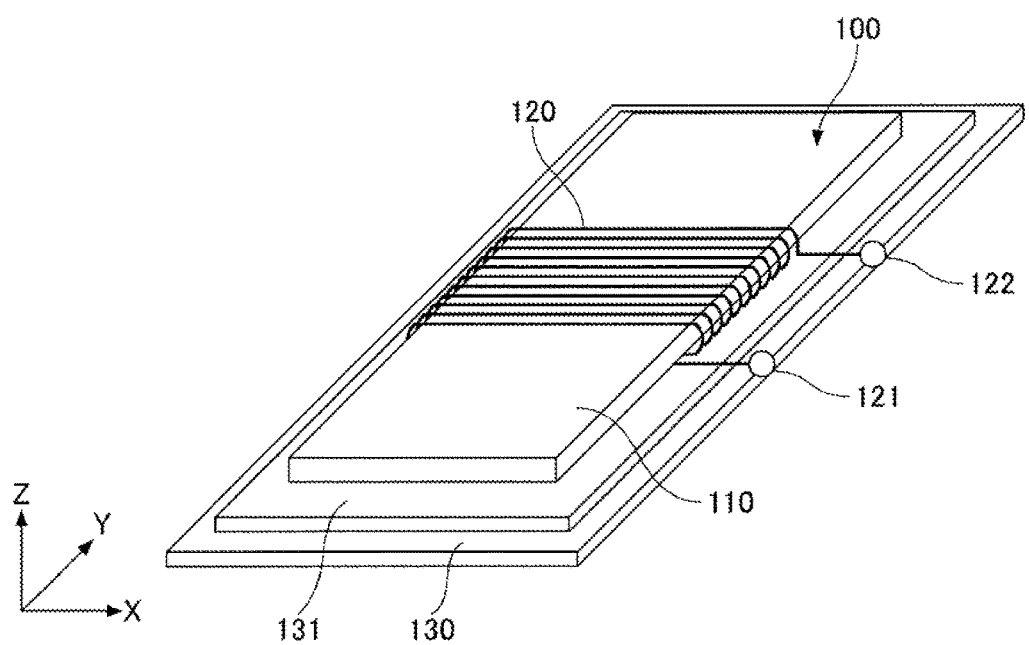
FIG. 7 is a perspective view illustrating an example of the antenna device 100 according to the first embodiment mounted on a PCB (Printed Circuit Board) 130.
Figure 8:
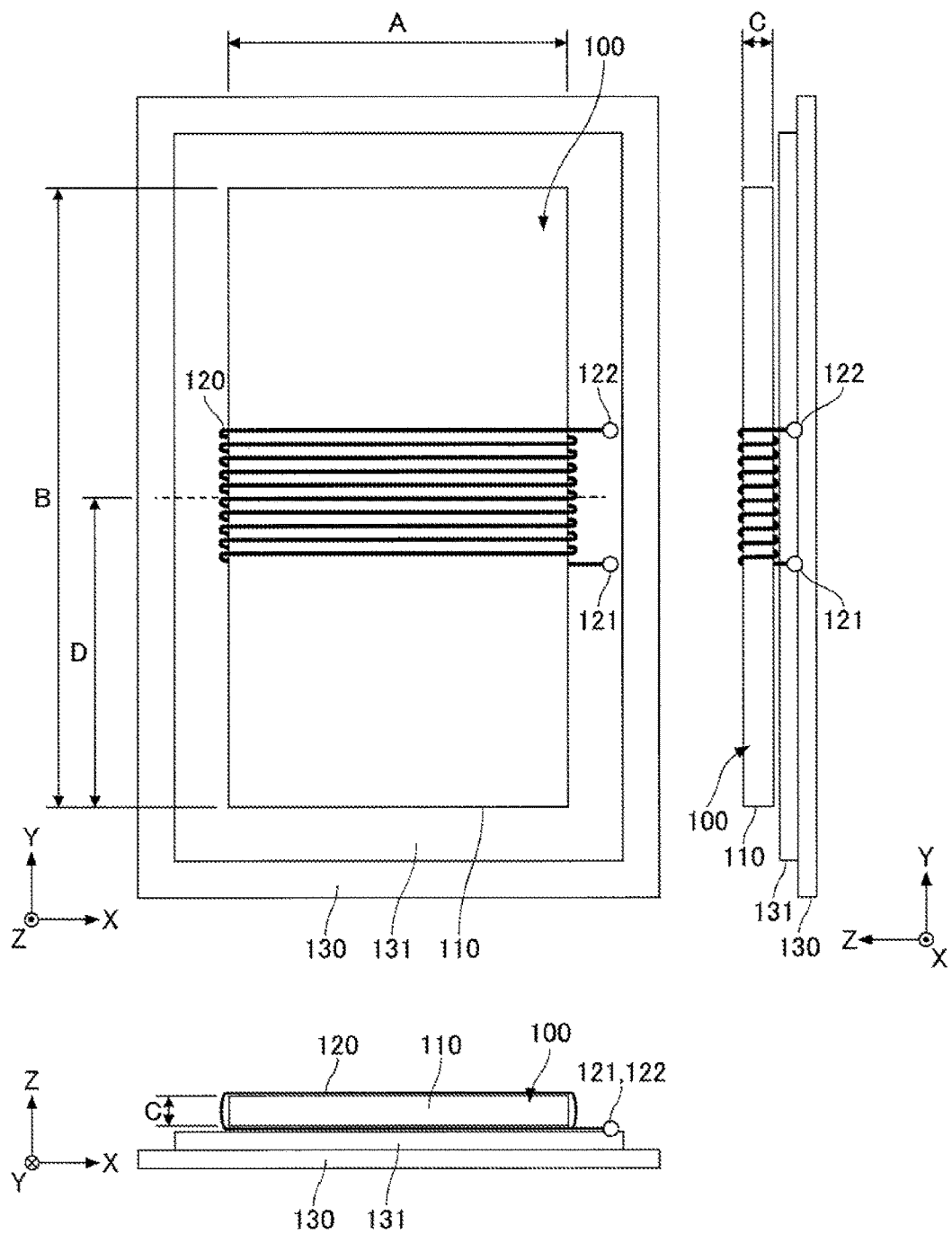
FIG. 8 is a top-front-side view illustrating an example of the antenna device 100 according to the first embodiment mounted on the PCB 130.

FIG. 7 is a perspective view illustrating a state where the antenna device 100 according to the first embodiment mounted on the PCB 130. FIG. 8 is a top-front-side view illustrating the state where the antenna device 100 according to the first embodiment mounted on the PCB 130. In FIGS. 7 and 8, as in the FIGS. 1 and 2, the XYZ coordinate system, which is an orthogonal coordinate system, is employed.

The PCB includes a copper foil 131 formed on a surface on the side of the positive direction of the Z-axis. As shown in FIGS. 7 and 8, the antenna device 100 is mounted on the copper foil 131 of the PCB 130.

In the following, a communication distance in the Z-axis direction in the case where the antenna device 100 is mounted on the PCB 130, and a communication distance in the Z-axis direction of the antenna device 100, which is not mounted on the PCB 130 will be compared.

Moreover, as well as the antenna device 100, communication distances in the case where the antenna device for comparison 150 is not mounted on the PCB 130 and in the case where the antenna device 150 is mounted on the PCB 130 will be compared.

The communication distance in the present embodiment is defined as a distance in the Z-axis direction from a surface of the magnetic body 110 of the antenna device 100 or 150 on the side of positive direction of the Z-axis to the antenna of the apparatus on the other end of the communication.

A result of the comparison shows that the communication distance in the case where the antenna device 100 is not mounted on the PCB 130 is 28.5 mm, and the communication distance of the antenna device 100 mounted on the PCB 130 is 29.0 mm.

That is, it is found that the antenna device 100 according to the first embodiment is barely affected by the copper foil 131, and even if the antenna device 100 is mounted on the copper foil 131, the communication distance as in the case where the antenna device 100 is not mounted on the copper foil 131 can be obtained which is almost the same.

Moreover, the communication distance in the case where the antenna device for comparison 150 is not mounted on the PCB 130 is 30.5 mm, and the communication distance in the case where the antenna device 150 is mounted on the PCB 130 is 13.0 mm.

That is, it is found that the antenna device for comparison 150 is significantly affected by the copper foil 131, and the communication distance is shortened markedly when the antenna device 150 is mounted on the PCB 130.

In the case of actually incorporating the antenna device 100 into a terminal apparatus, the PCB (printed circuit board), on which the communication circuit is mounted, is supposed to exit the terminal apparatus, since the communication circuit connected to the antenna device 100 is necessary.

The PCB includes, in general, a solid pattern, which is a copper foil formed on a surface or in an inner layer for a ground or a power source. As the copper foil 131 shown in FIGS. 7 and 8, the solid pattern has approximately the same size as the PCB 130 in planar view. That is, the copper foil has been provided assuming a solid pattern included in a general PCB.

Since even if the antenna device 100 according to the first embodiment is mounted on the PCB 130, the communication distance is barely affected, so the antenna device is more suitable to be mounted on the PCB 130 than the antenna device for comparison 150.

In this way, the reason why the communication distance is barely affected, even if the antenna device 100 is mounted on the PCB 130, is considered to be that in the antenna device 100, the coil 120 is wound in the short direction around the magnetic body 110 in a central region in the longitudinal direction of the magnetic body 110, which is formed in a cuboid having a thin-plate shape.

It is considered that by using a coil 120, which is wound as above, the magnetic flux is propagated in the thickness direction of the magnetic body 110 (Z-axis direction) efficiently, the influence from the existence of the copper foil 131 to the communication distance is minimized.

As described above, according to the first embodiment, the antenna device 100, which provides a long communication distance in the thickness direction of the magnetic body 110 having a thin plate shape wherein the communication distance is not shortened even if the antenna device 100 is embedded in a terminal apparatus which performs short distance communication by magnetic coupling, is provided.

That is, according to the first embodiment, the antenna device 100 is provided, wherein the communication distance in the thickness direction of the magnetic body 110 is long.

In the antenna device 100, at the central part in the longitudinal direction of the magnetic body 110 formed in a cuboid having a thin plate shape, by winding the coil 120 in the short direction of the magnetic body 110, the communication distance in the thickness direction of the magnetic body becomes longer.

As explained above with reference to FIGS. 5A to 6B, the antenna device 100 according to the first embodiment includes the magnetic body 110 and the coil 120, having the above configurations, and most of the magnetic flux generated at the coil 120 is directed in the positive direction of the Y-axis inside the magnetic body 110.

Then, the magnetic flux radiated from the coil 120 in the positive direction of the Y-axis, is directed in the positive direction of the Z-axis, drawing a loop, and returns to the coil 120 from the side of the negative direction of the Y-axis.

The antenna device 100 according to the first embodiment generates the magnetic flux which is distributed as above, and even if the antenna device 100 is mounted on the copper foil 131, the returned magnetic flux propagates inside the magnetic body 110 in the Y-axis direction, and is radiated in the Z-axis direction, without the copper foil 131 blocking the path.

In the antenna device for comparison 150, the magnetic flux radiated from the planar coil 151 in the positive direction of the Z-axis, draws a loop passing the sides of the positive and negative directions of the Y-axis, and returns to the planar coil 151 from the side of the negative direction of the Y-axis. When the magnetic flux returns to the planar coil 151, the magnetic flux passes through the copper foil 131, whereas an opposing magnetic flux is generated by an eddy current reducing the magnetic flux.

According to the difference, as explained above, the antenna device 100 according to the first embodiment, in the state of being mounted on the copper foil 131, provides a longer communication distance in the Z-axis direction than that of the antenna device for comparison 150.

Moreover, in the case of mounting the antenna device 100 on the copper foil 131, not only the communication distance in the Z-axis direction, but also the communication distance in the longitudinal direction (Y-axis direction) are longer than those for the antenna device 150, since the density of magnetic flux B and the magnetic field H in the longitudinal direction of the magnetic body 110 are higher than those in the antenna device 150.

Moreover, although the communication distances in the X-axis direction for the antenna devices 100 and 150 are not compared, since the density of magnetic flux B and the magnetic field H in the Y-axis direction and in the Z-axis direction are high for the antenna device 100, the density of magnetic flux B and the magnetic field H in the X-axis direction of the magnetic body 110 are also considered to be high compared to the antenna device 150.

As described above, according to the first embodiment, in a short distance communication of the magnetic coupling type, the antenna device 100 which provides a longer communication distance than that by the antenna device for comparison 150, in which the planar coil 151 is used, can be provided.

By incorporating the antenna device 100 as above into, for example, a terminal apparatus which performs a short distance communication by the magnetic coupling, the communication distance to the other end of the communication becomes longer than the case of incorporating the antenna device 150 into the terminal apparatus of the same kind, and a certain communication can be performed.

As a result, a usability of the terminal apparatus including the antenna device 100 can be improved and reliability can be enhanced.

<Second Embodiment>

Figure 9:
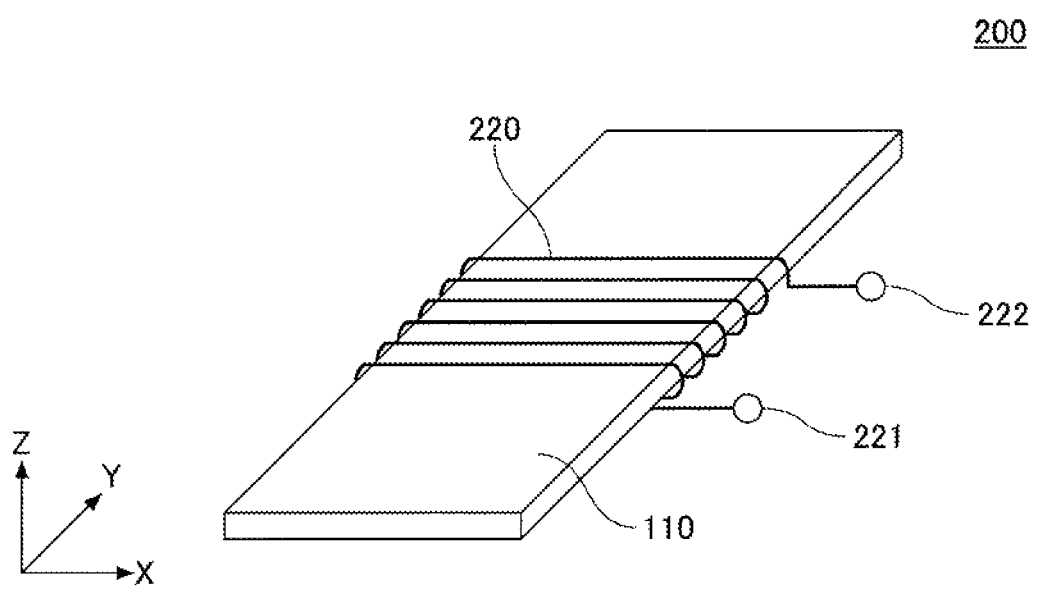
FIG. 9 is a perspective view illustrating an example of an antenna device 200 according to a second embodiment.
Figure 10:
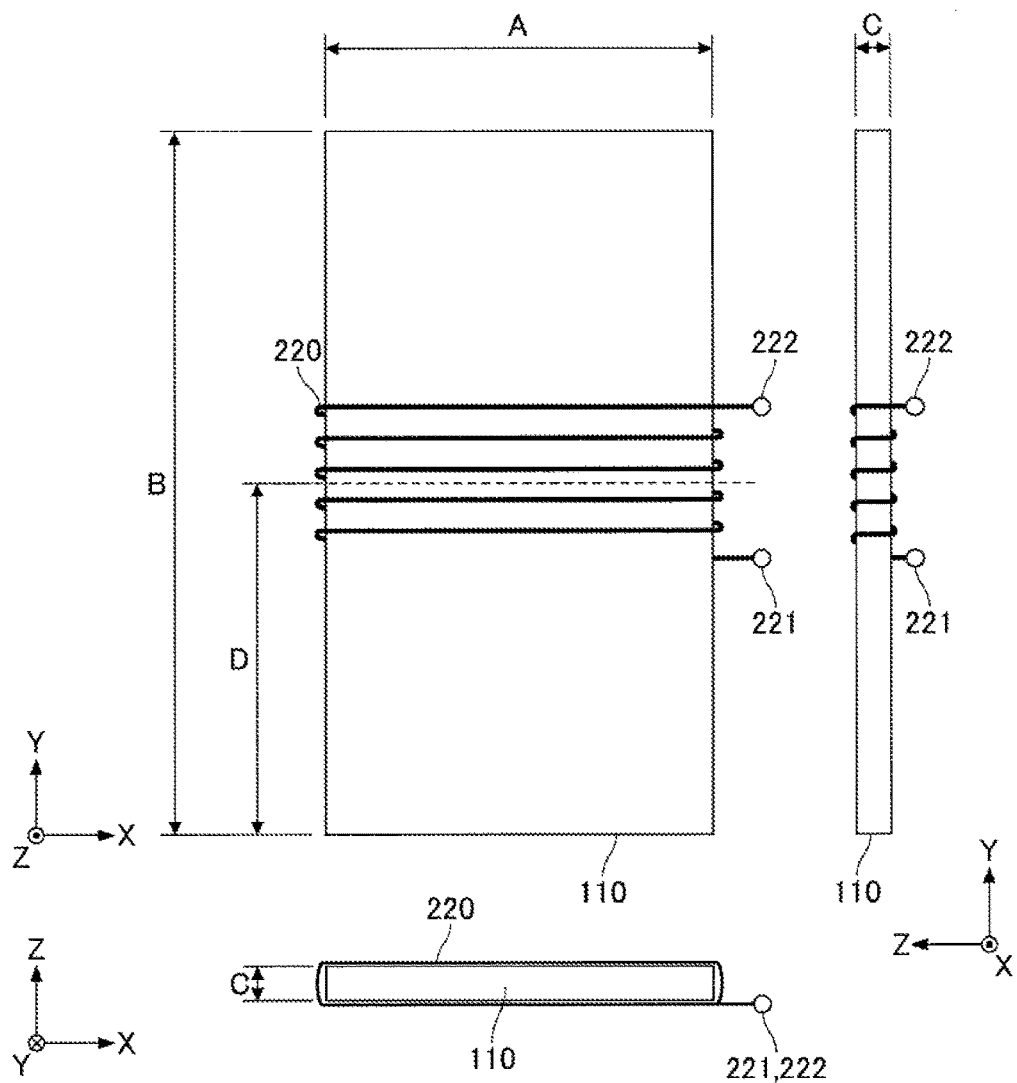
FIG. 10 is a top-front-side view illustrating an example of the antenna device 200 according to the second embodiment.

FIG. 9 is a perspective view showing an antenna device 200 according to a second embodiment. FIG. 10 is a top-front-side view showing the antenna device 200 according to the second embodiment. In FIGS. 9 and 10, an XYZ coordinate system, which is an orthogonal coordinate system, is employed.

The antenna device 200 according to the second embodiment is different from the antenna device 100 according to the first embodiment in that a number of turns of the coil 220 is less than that of the coil 120 in the first embodiment. Accordingly, wires in the coil 220 wound around the magnetic body 110 are wound so as not to be in contact with each other.

The antenna device 200 is a magnetic coupling type antenna device, and includes a magnetic body 110 and a coil 220. The magnetic body 110 is the same as the magnetic body 110 in the antenna device according to the first embodiment. The coil 220 is a coil, a number of turns of which is less than the coil 120 according to the first embodiment. According to this feature, wires in the coil 220 wound around the magnetic body 110 are wound so as not to be in contact with each other.

The other configurations are the same as the antenna device 100 according to the first embodiment, and duplicate explanations will be omitted.

The coil 220 is wound in the short direction (X-axis direction) of the magnetic body 110 in the central part in the longitudinal direction (Y-axis direction) of the magnetic body 110. Accordingly, a distance D between the center of the region where the coil 220 is wound around the magnetic body 110 in the Y-axis direction and the end portion of the magnetic body 110 on the side of the negative direction of the Y-axis is 7 mm where the length B is 14 mm. When the length B is 24 mm, the length D is 12 mm.

Both ends 221 and 222 of the coil 220 are connected to a communication unit of an apparatus which performs a communication using the antenna device 200.

As a coil 220, for example, a copper line may be used. A diameter of the coil 220 (wire diameter) may, for example, be 50 μm. A number of turns of the coil 220 may be, for example, about eight. Wires in the coil 220 wound around the magnetic body 110 are wound so as not to be in contact with each other. The winding of the coil 220, as above, will be denoted as "coarse coiling" in the following.

Next, with reference to FIGS. 11A to 12B, results of electromagnetic field simulations will be explained for the antenna device 200 (coarse coiling) according to the second embodiment and for the antenna device 100 (close coiling) according to the first embodiment.

Figure 11A:
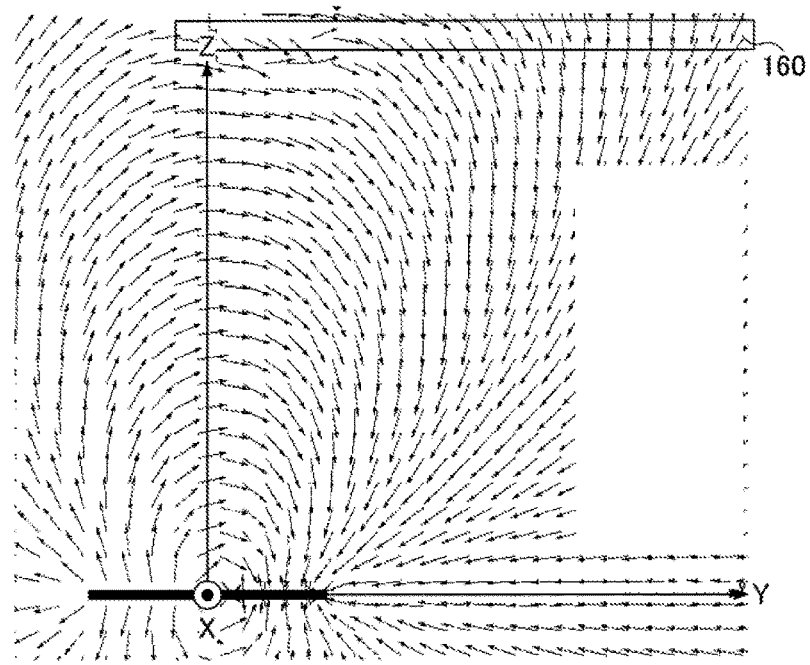
FIG. 11A is a diagram illustrating an example of a result of a simulation for a density of magnetic flux around the antenna device 100 according to the first embodiment.
Figure 11B:
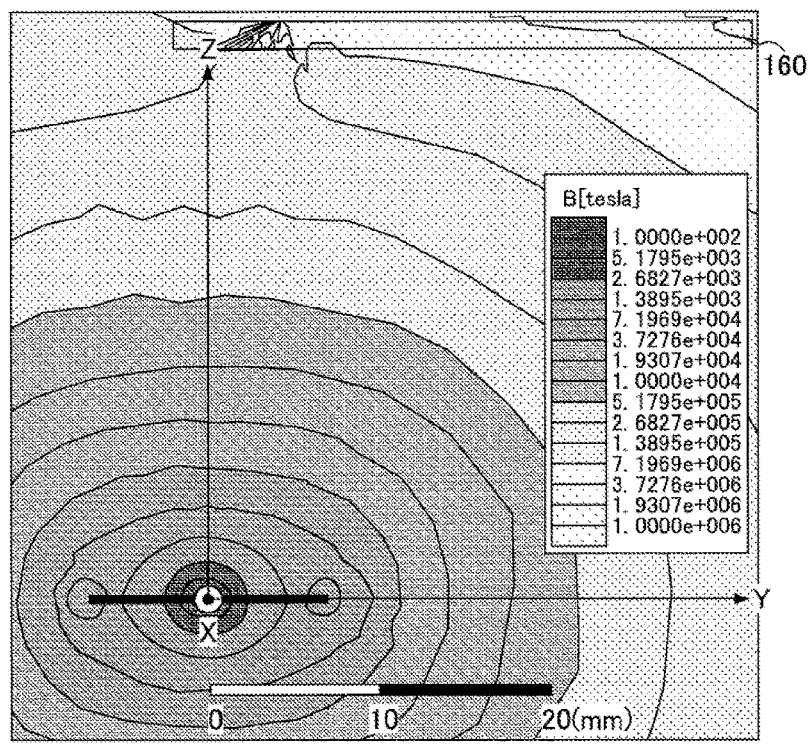
FIG. 11B is a diagram illustrating an example of a result of a simulation for a magnetic field H around the antenna device 100 according to the first embodiment.

FIGS. 11A and 11B are diagrams illustrating results of simulations for density of magnetic flux B and the magnetic field H around the antenna device 100 according to the first embodiment, respectively. FIG. 11A shows the density of magnetic flux B of the antenna device 100, and FIG. 11B shows the magnetic field H of the antenna device 100.

Figure 12A:
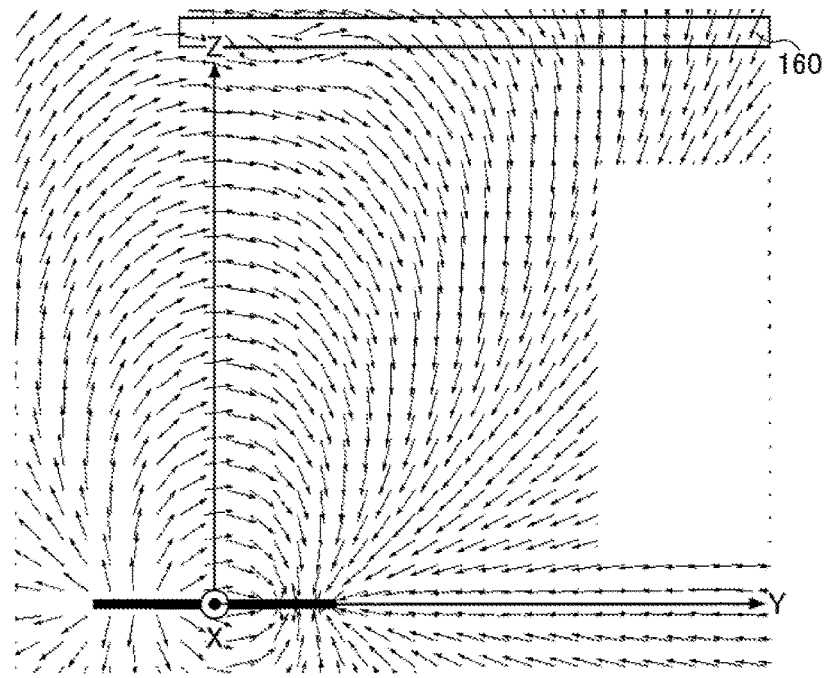
FIG. 12A is a diagram illustrating an example of a result of a simulation for a density of magnetic flux around the antenna device 200 according to the second embodiment.
Figure 12B:
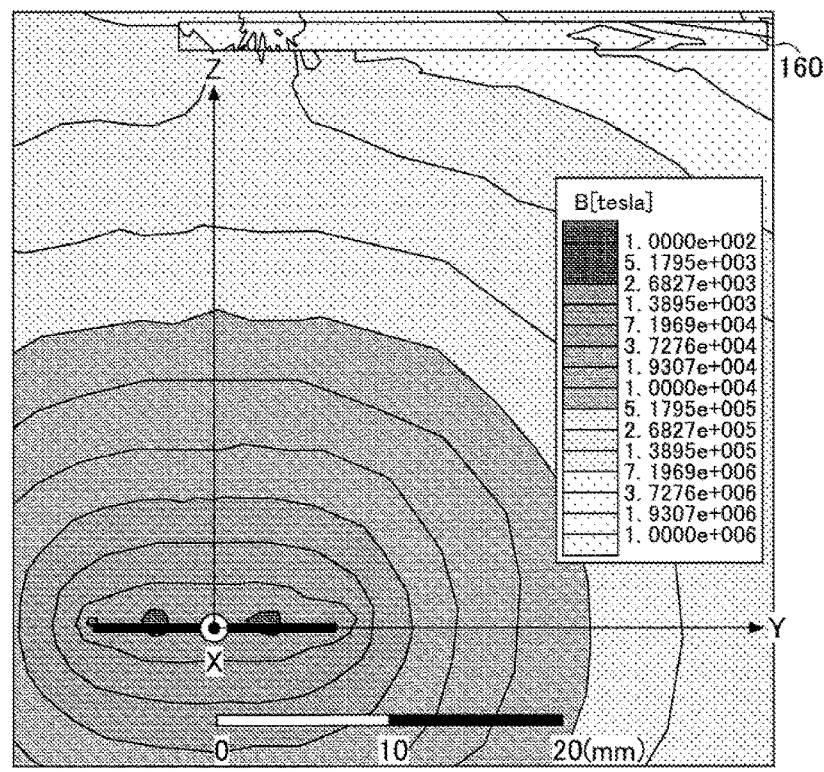
FIG. 12B is a diagram illustrating an example of a result of a simulation for a magnetic field H around the antenna device 200 according to the second embodiment.

FIGS. 12A and 12B are diagrams illustrating results of simulations for density of magnetic flux B and the magnetic field H around the antenna device 200 according to the second embodiment, respectively. FIG. 12A shows the density of magnetic flux B of the antenna device 200, and FIG. 12B shows the magnetic field of the antenna device 200.

In FIGS. 11A and 12A, directions of arrows indicate directions of the density of magnetic flux B (directions of vectors). Moreover, in FIGS. 11B and 12B, the magnetic field in a dark region is higher than that in a bright region.

Moreover, the origin of the XYZ coordinate system in the antenna devices 100 and 200 is on the surface on the positive side in the Z-axis direction of the magnetic body 110 (Z=0), at a center of the magnetic body 110 in the short direction (X=0), and at a center of the magnetic body 110 in the positive direction of the Y-axis.

Moreover, values of the density of magnetic flux B and the magnetic field H are obtained under a condition that a loop antenna 160 is arranged above the antenna device 100 or 200 at a position where Z is 50 mm.

Comparing FIG. 11A with FIG. 12A, it is found that curvatures of the density of magnetic flux B in the vicinity of the origin for the antenna device 200 according to the second embodiment are smaller than those for the antenna device 100 according to the first embodiment. Furthermore, the changes in directions of the density of magnetic flux B around the antenna device 200 according to the second embodiment are more gradual than those around the antenna device 100 according to the first embodiment.

The density of magnetic flux at a position separated from the origin in the Y-axis direction for the antenna device 100 according to the first embodiment is almost the same as the density of magnetic flux at the same position for the antenna device 200 according to the second embodiment.

Moreover, for the magnetic field H, comparing FIG. 11B with FIG. 12B, it is found that curvatures of the isomagnetics of the magnetic field H in the vicinity of the origin for the antenna device 200 according to the second embodiment are smaller than those for the antenna device 100 according to the first embodiment. Furthermore, the distribution of the magnetic field H around the antenna device 200 according to the second embodiment is wholly more gradual than that around the antenna device 100 according to the first embodiment.

The magnetic field at a position separated from the origin in the Y-axis direction for the antenna device 100 according to the first embodiment is almost the same as the magnetic field at the same position for the antenna device 200 according to the second embodiment.

As described above, it is found that the distribution of the density of magnetic flux B and the magnetic field H around the antenna device 200 according to the second embodiment (coarse coiling) is more gradual than those around the antenna device 100 according to the first embodiment (close coiling). According to this property, the antenna device 200 according to the second embodiment generates the magnetic field H more effectively, and wider distribution of the density of magnetic flux can be obtained.

The above results are obtained by comparing the antenna device 100 (close coiling) prepared under the condition setting of the first embodiment and the antenna device 200 (coarse coiling) prepared under the condition setting of the second embodiment.

The number of turns of the coil 120 or 220, therefore, may be optimized depending on the intended use of the antenna device 100 or 200, or the like.

A communication distance is obtained for antenna devices 100, 200 and 200A, as shown in FIG. 13, in order to investigate an influence of the way of winding in the coil 100 or 200 on the communication distance.

FIG. 13 is a perspective view illustrating the antenna device 100 according to the first embodiment, and the antenna devices 200 and 200A according to the second embodiment.

The antenna device 100, shown in FIG. 13, is the same as the antenna device 100 according to the first embodiment, shown in FIG. 1. The antenna device 200, shown in FIG. 13 is the same as the antenna device 200 according to the second embodiment, shown in FIG. 9.

In the antenna device 200A, as shown in FIG. 13, the coil 220 is wound, so as to maintain the number of turns for the coil 220 in the antenna device 200, shown in FIG. 9, i.e. twenty turns, and to wind wires in a wider area in the Y-axis direction around the magnetic body 110 in order to make the space between the wires in the coil 220 wound around the magnetic body 110 wider. The way of winding for the coil 220 in the antenna device 200A will be denoted as "very coarse coiling" in the following.

In the antenna device 100, a line to space ratio (L/S ratio) for the coil 120 is 50/19 μm. That is, in the coil 120, a wire with a diameter of 69 μm, including a conductive wire with a diameter of 50 μm and enamel coating on it, is wound in the close coiling.

Moreover, in the antenna device 200, the line to space ratio (L/S ratio) for the coil 220 is 50/300 μm. That is, in the coil 220, a wire including a conductive wire with a diameter of 50 μm is wound in the coarse coiling with a space of 300 μm between wires.

Moreover, in the antenna device 200A, the line to space ratio (L/S ratio) for the coil 220A is 50/600 μm. That is, in the coil 200A, a wire including a conductive wire with a diameter of 50 μm is wound in the coarse coiling with a space of 600 μm between wires.

The communication distances in the Z-axis direction for the antenna devices 100, 200 and 200A are 27.5 mm, 30.0 mm and 31.0 mm, respectively, according to actual measurements.

From the results of the measurements as above, it is found that the communication distance can be adjusted by making the way of winding for the coil 120 or 220 either close or coarse.

As described above, according to the second embodiment, the antenna device 200 having a long communication distance in the thickness direction of the magnetic body 110 can be provided as in the first embodiment.

Next, connection coefficients in the antenna device 200 (coarse coiling) and in the antenna device 200A (very coarse coiling) will be described.

Figure 14:
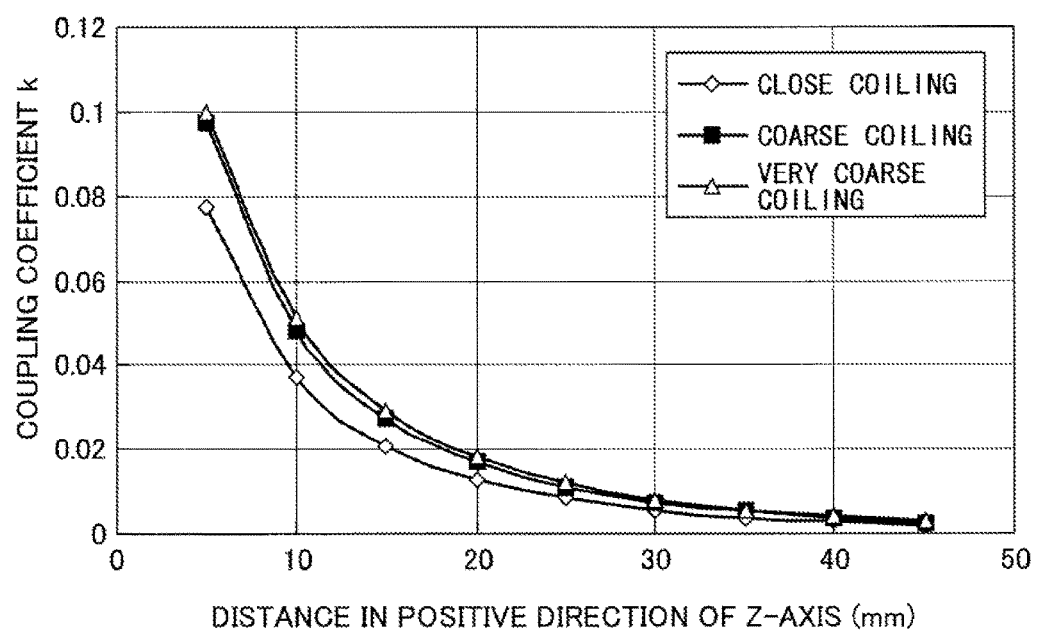
FIG. 14 is a diagram illustrating a coupling coefficients of the antenna device 100 (close coiling), the antenna device 200 (coarse coiling) and the antenna device 200A (very coarse coiling)

FIG. 14 is a diagram illustrating coupling coefficients of the antenna device 100 (close coiling), the antenna device 200 (coarse coiling) and the antenna device 200A (very coarse coiling).

As shown in FIG. 14, the coupling coefficient k of the antenna device 200A (very coarse coiling) is the largest, and the coupling coefficient k of the antenna device 100 (close coiling) is the smallest.

From the above results, by winding the coil 220 in the coarse coiling or in the very coarse coiling as in the antenna device 200 or 200A, rather than winding the coil 120 in the close coiling as in the antenna device 100, a large coupling coefficient and a long communication distance can be obtained.

As described above, the way of winding for the coil 120 or 220 may be set depending on the intended use of the antenna device 100 or 200, or the like. If the magnetic body 110 is large enough in the Y-axis direction, the way of winding is preferably the coarse coiling or the very coarse coiling.

Figure 15:
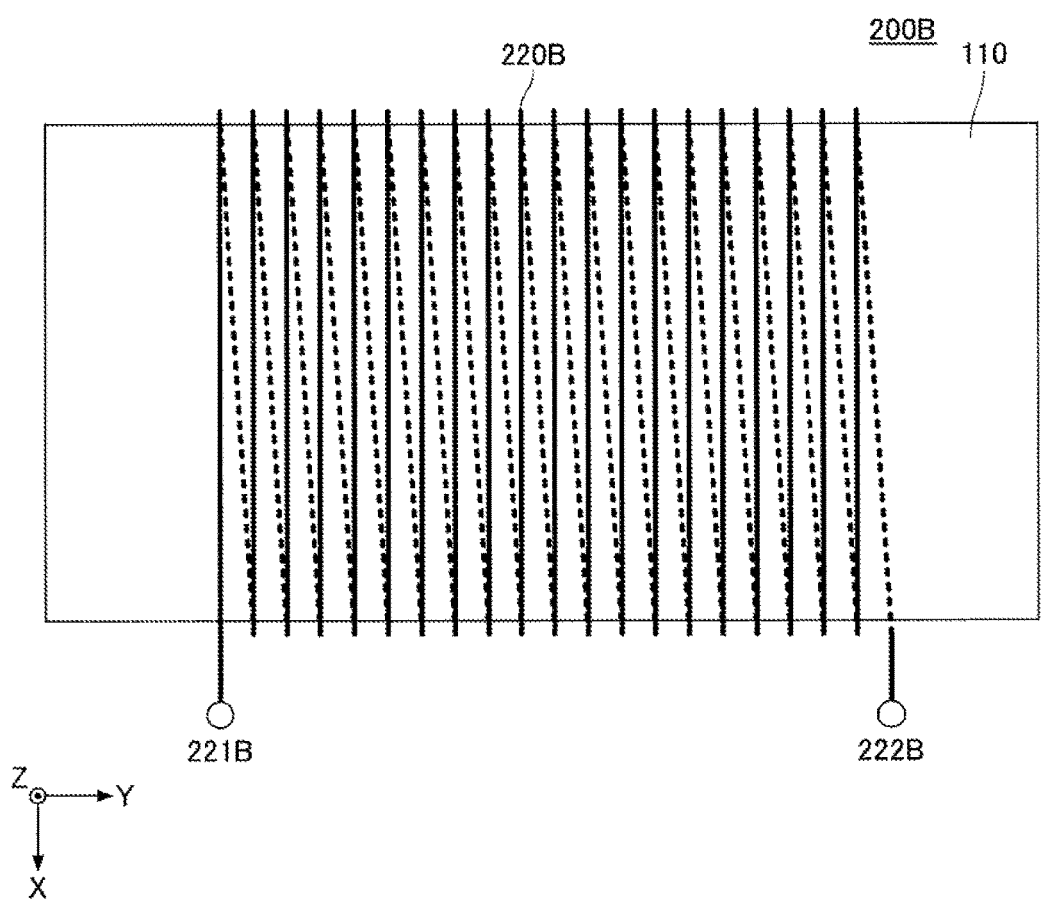
FIG. 15 is a diagram illustrating an example of an antenna device 200B according to a variation of the second embodiment.
Figure 16:
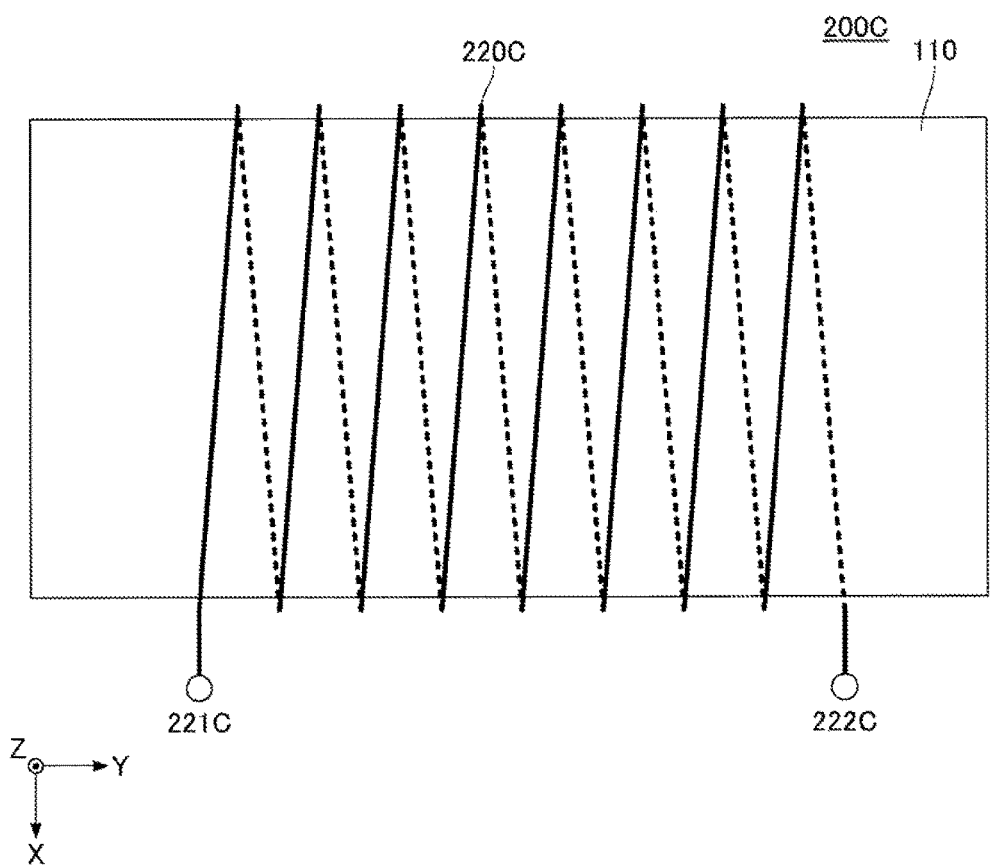
FIG. 16 is a diagram illustrating an example of an antenna device 200C according to the variation of the second embodiment.
Figure 17:
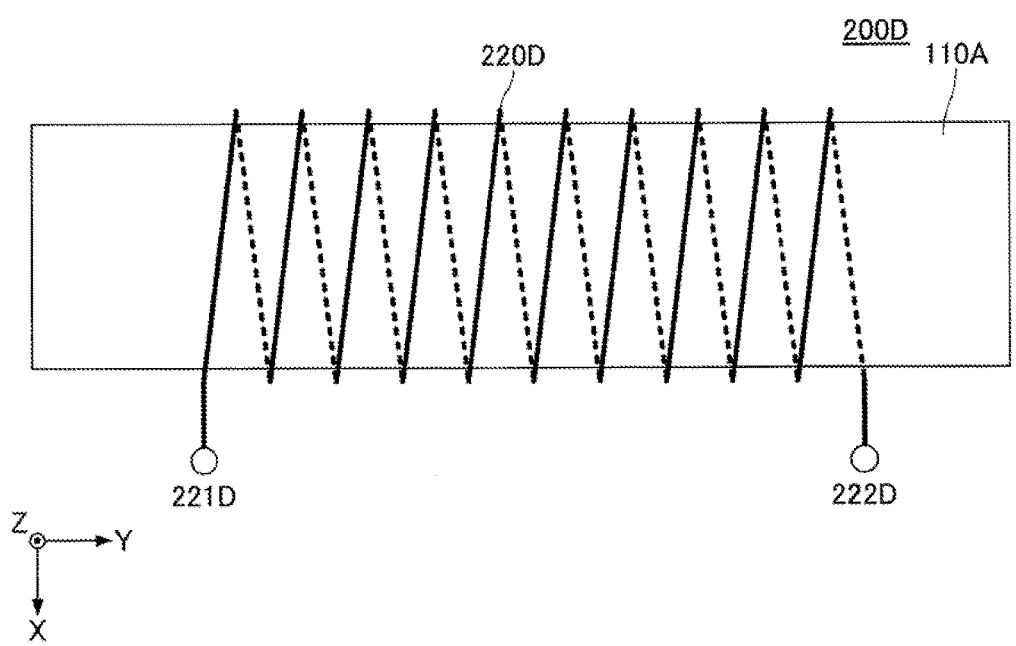
FIG. 17 is a diagram illustrating an example of an antenna device 200D according to the variation of the second embodiment.

Moreover, in the case of winding the coil 220 in the coarse coiling, the way of winding may be changed, as shown in FIGS. 15 to 17.

FIGS. 15 to 17 are diagrams illustrating antenna devices 200B, 200C and 200D according to a variation of the second embodiment.

In the antenna device 200B shown in FIG. 15, a coil 220B is wound in parallel to the X-axis on a surface of the magnetic body 110 on the side of the positive direction of the Z-axis of the magnetic body 110. On a surface on the side of the negative direction of the Z-axis of the magnetic body 110, the coil 220B is wound at an angle with the X-axis.

For example, in the antenna device 200B, a distance between the ends 221B and 222B of the coil 220B is 50 mm. The coil 220B is wound wherein the space between the wires is from 0.4 mm to 0.5 mm and the number of turns is twenty (twenty turns).

In the antenna device 200C shown in FIG. 16, a coil 220C is wound at an angle with the X-axis on the surface on the side of the positive direction of the Z-axis of the magnetic body 110 and on the surface on the side of the negative direction of the Z-axis of the magnetic body 110. The angle between the coil 220C and the X-axis on the side of the positive direction of the Z-axis is the same as the angle between the coil 220C and the X-axis on the side of the negative direction of the Z-axis.

Accordingly, the coil 220C on the surface on the side of the positive direction of the Z-axis and the coil 220C on the surface on the side of the negative direction of the Z-axis are arranged in parallel, respectively.

For example, in the antenna device 200C, a distance between the ends 221C and 222C of the coil 220C is 50 mm. The coil 220C is wound wherein the space between the wires is 1.5 mm and the number of turns is twenty (twenty turns).

In the antenna device 200D shown in FIG. 17, a coil 220D is wound around a magnetic body 110A which is more elongated than the magnetic body 110 shown in FIG. 16, i.e. the size in the X-axis direction is smaller, by the same way of winding as the coil 220C in FIG. 16.

The coil 220D is wound at an angle with the X-axis on the surface on the side of the positive direction of the Z-axis of the magnetic body 110A and on the surface on the side of the negative direction of the Z-axis of the magnetic body 110A. The angle between the coil 220D and the X-axis on the side of the positive direction of the Z-axis of the magnetic body 110A is the same as the angle between the coil 220D and the X-axis on the side of the negative direction of the Z-axis of the magnetic body 110A.

Accordingly, the coil 220D on the surface on the side of the positive direction of the Z-axis and the coil 220D on the surface on the side of the negative direction of the Z-axis are arranged in parallel, respectively.

For example, in the antenna device 200D, a distance between the ends 221D and 222D of the coil 220D is 50 mm. The coil 220D is wound wherein the space between the wires is 0.7 mm to 1.1 mm and the number of turns is twenty (twenty turns).

<Third Embodiment>

Figure 18A:
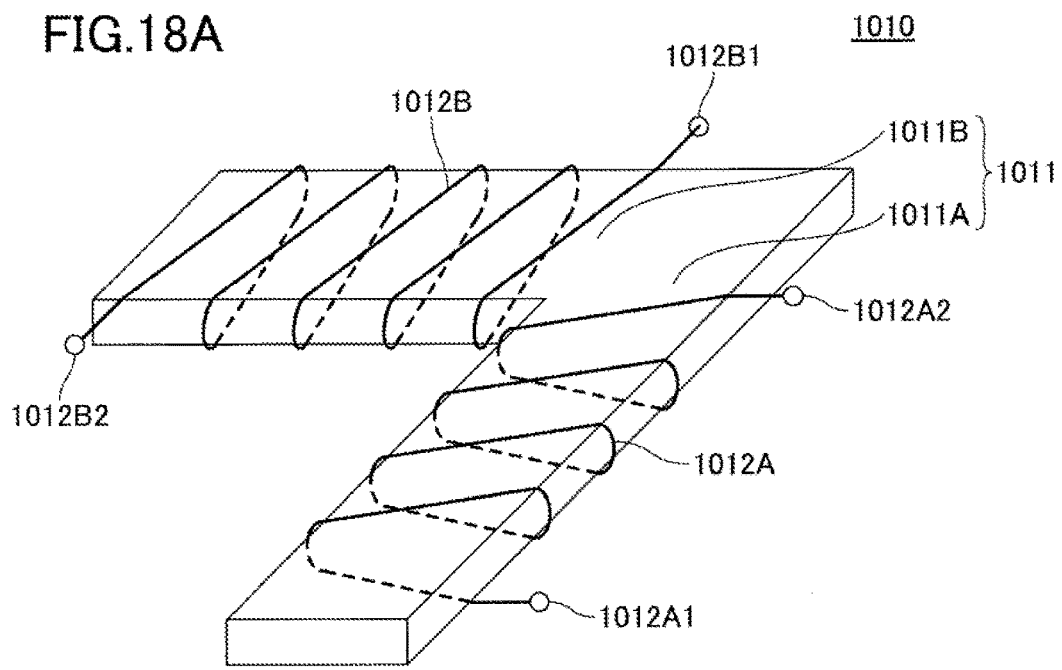
FIG. 18A is a perspective view illustrating an example of an antenna unit 1010 according to a third embodiment.
Figure 18B:
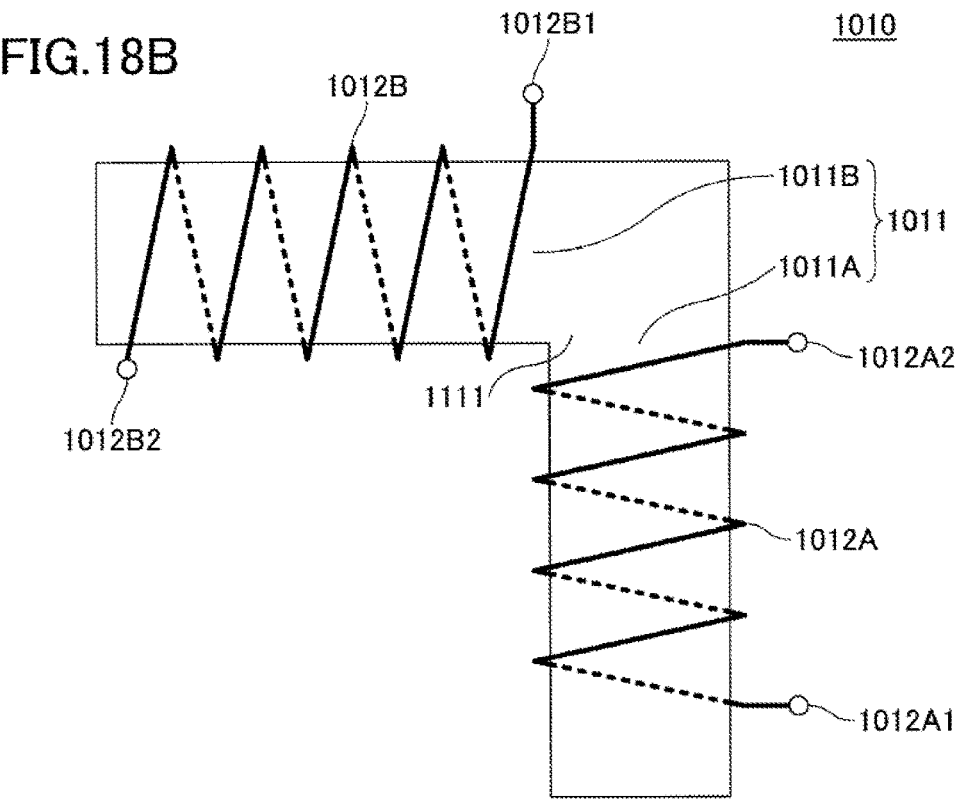
FIG. 18B is a plan view illustrating the example of the antenna unit 1010 according to the third embodiment.

FIGS. 18A and 18B are diagrams illustrating an antenna unit 1010 according to the third embodiment. FIG. 18A is a perspective view of the antenna unit 1010, and FIG. 18B is a plan view of the antenna unit 1010.

The antenna unit 1010 includes a magnetic body 1011, a coil 1012A and a coil 1012B.

The magnetic body 1011 is a thin plate-like sintered ferrite having an L-shape in planar view. The magnetic body 1011 is formed by connecting a cuboid-shaped magnetic body part 1011A and a cuboid-shaped magnetic body part 1011B at an angle of 90 degrees. The magnetic body part 1011A is an example of a first magnetic body part, and the magnetic body part 1011B is an example of a second magnetic body part.

The coil 1012A and the coil 1012B are wound around the magnetic body part 1011A and the magnetic body part 1011B, respectively.

As the coils 1012A and 1012B, for example a copper line may be used. A diameter of the coils 1012A and 1012B (wire diameter) may, for example, be 50 μm. A number of turns of the coils 1012A and 1012B may be, for example, about twenty. Wires in the coils 1012A and 1012B wound around the magnetic body 1011 are wound so as to closely contact with each other.

The coil 1012A and the coil 1012B are examples of a first antenna and a second antenna, respectively.

The coil 1012A includes ends 1012A1 and 1012A2, and the coil 1012B includes ends 1012B1 and 1012B2. The coils 1012A and 1012B are wound in directions opposite to each other as viewed from a bent part 1111 of the magnetic body 1011.

Accordingly, when an electric current is applied from the end 1012A1 of the coil 1012A to the end 1012B2 of the coil 1012B, wherein the end 1012A2 of the coil 1012A is connected to the end 1012B1 of the coil 1012B, a magnetic field generated by the coil 1012A and a magnetic field generated by the coil 1012B are superimposed at the bent part 1111.

Accordingly, by connecting the coil 1012A and the coil 1012B so that magnetic fields, polarities of which are opposite to each other, are generated, a magnetic field at the bent part is synthesized from the magnetic fields generated at the coils 1012A and 1012B.

Since the numbers of turns of the coils 1012A and 1012B are the same, and the electric current applied to them are the same, the electric field at the bent part 1111 of the magnetic body 1011 is about twice the magnetic field generated at each of the coils 1012A and 1012B.

In the third embodiment, by using the antenna unit 1010, as shown in FIGS. 18A and 18B, the communication distance by the antenna device of the magnetic coupling type is made longer. A principle of the antenna unit 1010 using the coils 1012A and 1012B wound around the magnetic body 1011 will be described later.

Figure 19A:
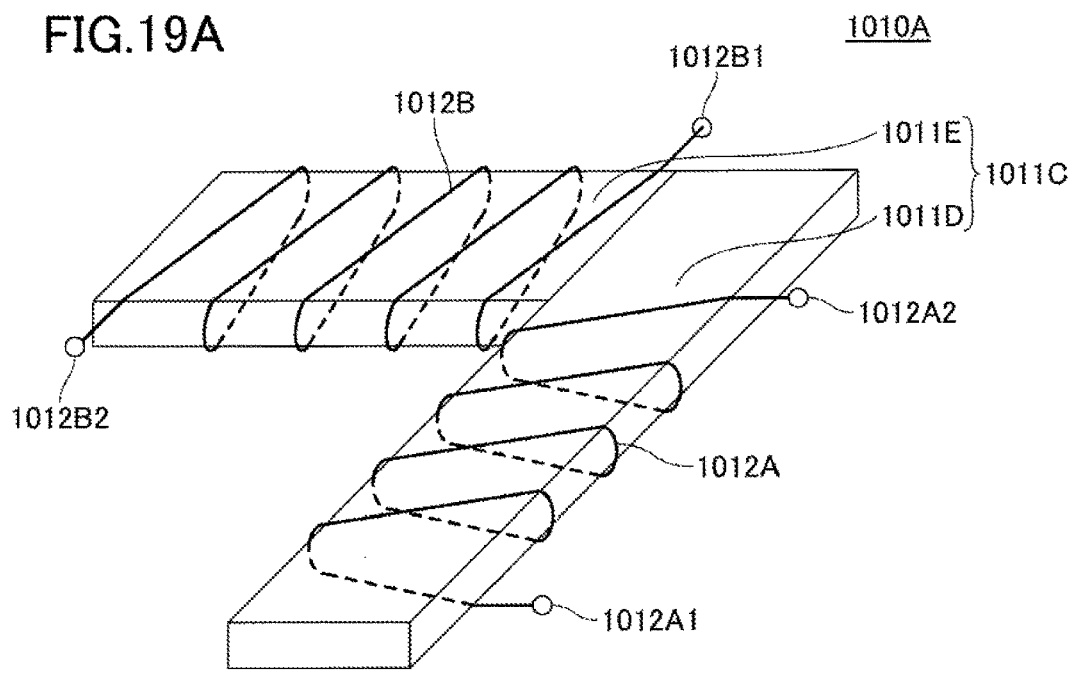
FIG. 19A is a perspective view illustrating an example of an antenna unit 1010A according to a variation of the third embodiment.
Figure 19B:
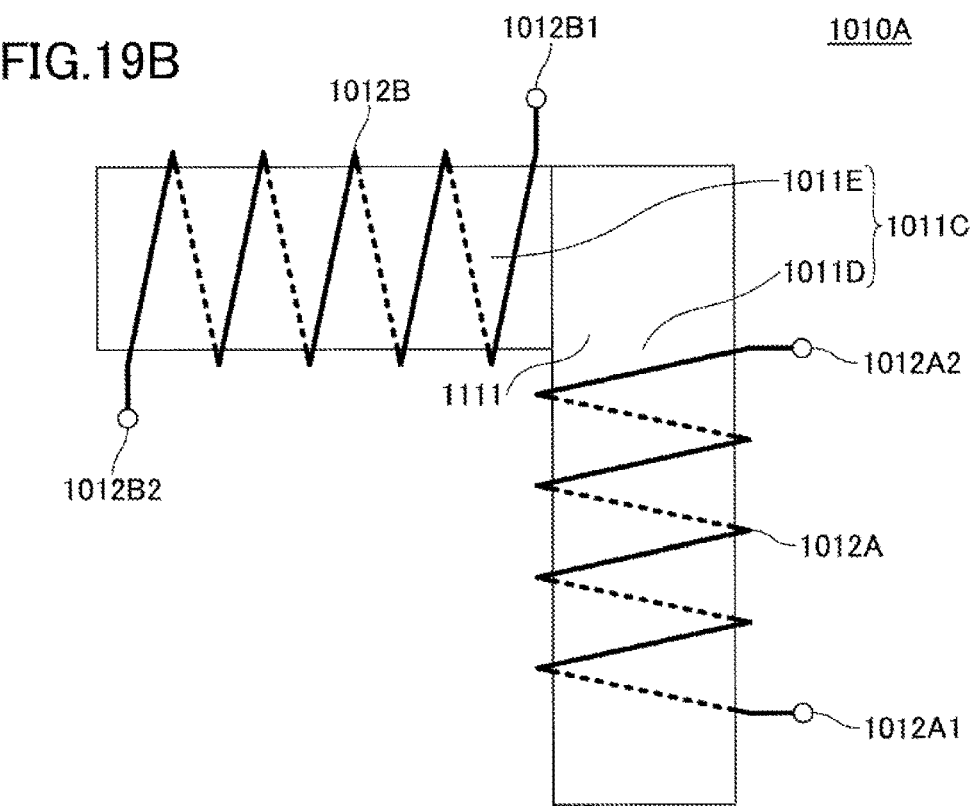
FIG. 19B is a plan view illustrating the example of the antenna unit 1010A according to the variation of the third embodiment.

FIGS. 19A and 19B are diagrams illustrating an antenna unit 1010A according to a variation of the third embodiment. FIG. 19A is a perspective view of the antenna unit, and FIG. 19B is a plan view of the antenna unit.

The antenna unit 1010A includes a magnetic body 1011C, a coil 1012A and a coil 1012B.

The magnetic body 1011C is a thin plate-like sintered ferrite having an L-shape in planar view. The magnetic body 1011C is formed by connecting a cuboid-shaped magnetic body part 1011D and a cuboid-shaped magnetic body part 1011E at an angle of 90 degrees. The magnetic body 1011C is different from the magnetic body 1011 according to the third embodiment in that the magnetic body part 1011D and the magnetic body part 1011E are separated before connection, and connected as shown in FIGS. 19A and 19B. The magnetic body part 1011D has a longer size in the longitudinal direction than that of the magnetic body part 1011E.

The magnetic body part 1011D is an example of the first magnetic body part, and the magnetic body part 1011E is an example of the second magnetic body part.

The coil 1012A and the coil 1012B are wound around the magnetic body part 1011D and the magnetic body part 1011E, respectively.

Figure 20A:
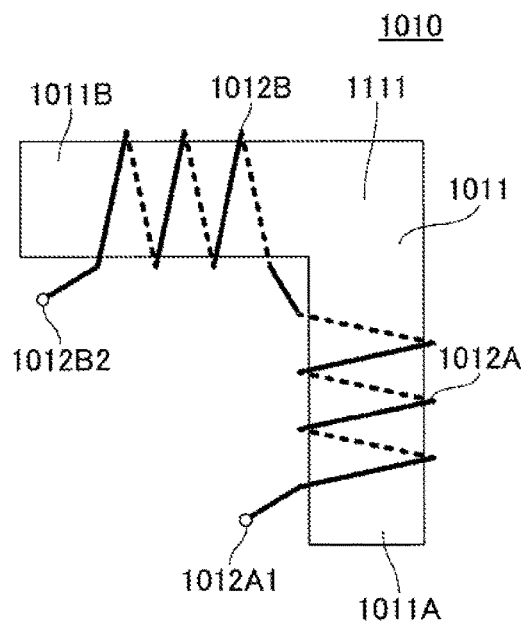
FIG. 20A is an explanatory diagram illustrating an example of a method of connecting coils 1012A and 1012B in the antenna unit 1010 according to the third embodiment.
Figure 20B:
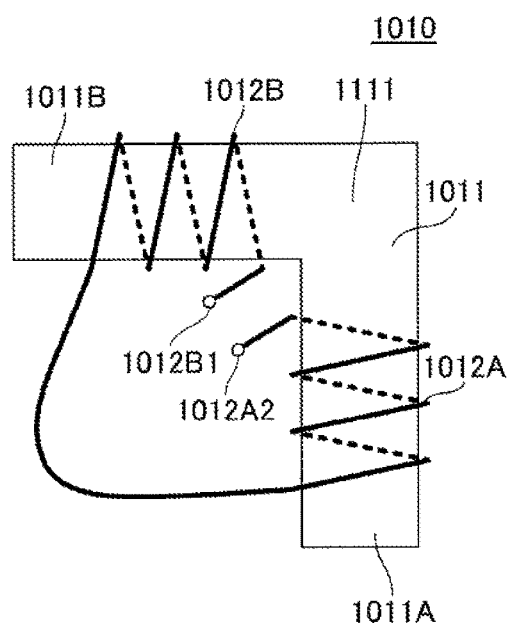
FIG. 20B is an explanatory diagram illustrating another example of the method of connecting the coils 1012A and 1012B in the antenna unit 1010 according to the third embodiment.

FIGS. 20A and 20B are diagrams illustrating methods of connecting coils 1012A and 1012B in the antenna unit 1010 according to the third embodiment.

The method of connecting the coils 1012A and 1012B, shown in FIG. 20A, is the same as the above-described connecting method regarding FIGS. 18A and 18B, and connecting the ends 1012A2 and 1012B1, shown in FIGS. 18A and 18B.

The connection method, shown in FIG. 20B is to connect the ends 1012A1 and 1012B2. Also by this connection method the coils 1012A and 1012B generates the magnetic fields, polarities of which are opposite to each other, and at the bent part 1111, the magnetic fields and the densities of magnetic flux generated by the coils 1012A and 1012B enhances each other.

In this embodiment, the magnetic fields generated by the coils 1012A and 1012B wound around the magnetic body parts 1011A and 1011B, respectively, of the magnetic body 1011 bent in an L-shape, are required only to have the polarities opposite to each other.

Accordingly, a method of winding is not limited to the winding methods, shown in FIGS. 18A, 18B, 19A, 19B, 20A and 20B.

For example, the coil 1012A or 1012B may be wound in an opposite direction to the direction shown in FIGS. 18A, 18B, 19A, 19B, 20A and 20B, and an electric current may be applied in an opposite direction. Furthermore, the coils 1012A and 1012B may be connected in a state of a cross-coupled relation, so as to generate magnetic fields, polarities of which are opposite to each other.

The magnetic fields, polarities of which are opposite to each other, mentioned here are magnetic fields which are generated by the coils 1012A and 1012B and enhance each other, not cancel each other, at the bent part positioned between the coils 1012A and 1012B.

Moreover, the embodiment in which the magnetic body part 1011A and the magnetic body part 1011B of the magnetic body 1011 are connected at an angle of 90 degrees in planar view will be explained in the following. However, the angle between the magnetic body part 1011A and the magnetic body part 1011B may be any value unless it is zero.

Accordingly, making an angle between the magnetic body parts 1011A and 1011B mentioned in this embodiment means that the angle between the magnetic body parts is greater than zero and less than 180 degrees, and that the magnetic body parts 1011A and 1011B are not parallel to each other.

In this way, if the magnetic body part 1011A makes an angle with the magnetic body part 1011B, and the coils 1012A and 1012B, wound around the magnetic body parts 1011A and 1011B respectively, generate magnetic fields, polarities of which are opposite to each other, the magnetic fields enhance each other at the bent part 1111 where the magnetic body part 1011A and the magnetic body part 1011B cross.

In the present embodiment, the coils 1012A and 1012B are connected in series, as shown in FIGS. 18A, 18B, 19A, 19B, 20A and 20B. The coils 1012A and 1012B may be connected in parallel.

Next, the principle of the antenna unit 1010 according to the third embodiment will be explained in detail.

In the antenna unit 1010 according to the third embodiment (See FIGS. 18A and 18B), the coils 1012A and 1012B are wound around the magnetic body parts 1011A and 1011B of the magnetic body 1011, respectively, and can be regarded as having two antenna devices.

One antenna device includes the magnetic body part 1011A and the coil 1012A, and other antenna device includes the magnetic body part 1011B and the coil 1012B.

Since the two antenna devices, as above, have the same configuration, the principle of the antenna unit 1010 according to the third embodiment will be explained in the following by explaining the principle of the antenna device.

Figure 21:
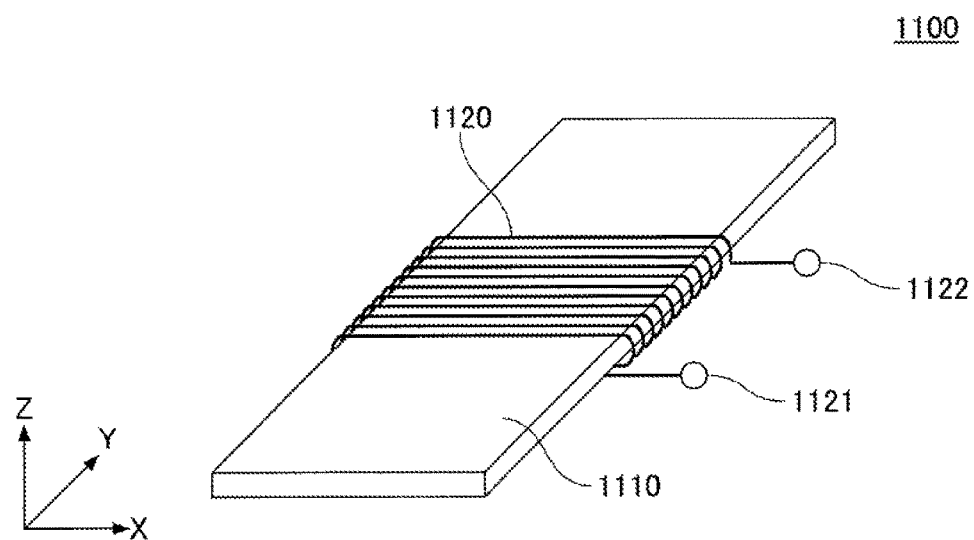
FIG. 21 is a perspective view illustrating an example of an antenna device 1100 according to the third embodiment.
Figure 22:
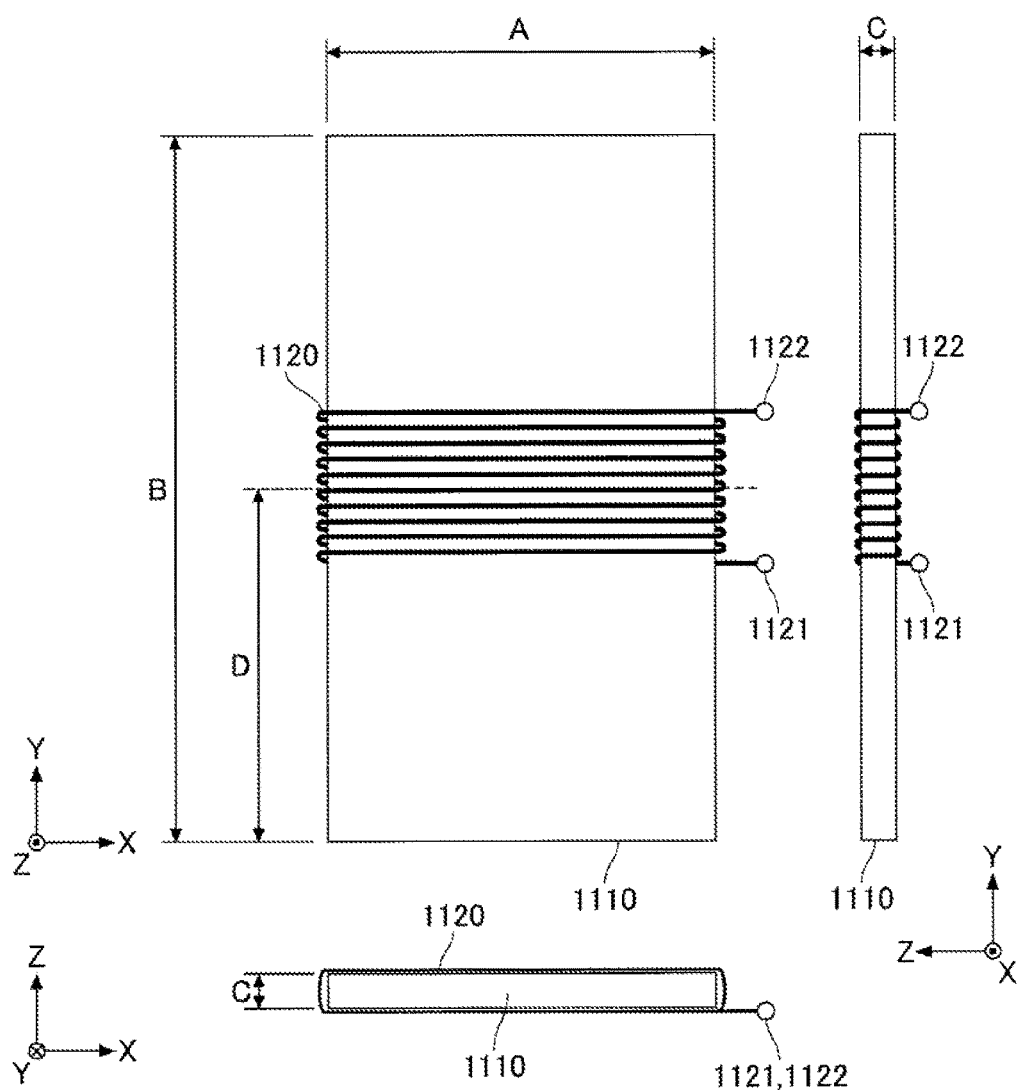
FIG. 22 is a top-front-side view illustrating an example of the antenna device 1100 according to the third embodiment.

FIG. 21 is a perspective view illustrating an antenna device 1100 according to a third embodiment. FIG. 22 is a top-front-side view illustrating the antenna device 1100 according to the third embodiment. In FIGS. 21 and 22, an XYZ coordinate system, which is an orthogonal coordinate system, is employed.

The antenna device 1100 is a magnetic coupling type antenna device, and includes a magnetic body 1110 and a coil 1120.

The magnetic coupling type antenna device 1100 is different from a resonant type antenna device, which sends/receives electromagnetic waves by resonating with an electromagnetic wave of a specific frequency. Whereas, the magnetic coupling type antenna device 1100 is an antenna device which magnetically couples to the magnetic flux generated from an antenna in an other communication party, to perform communication.

Accordingly, a communication distance of the resonance type antenna device is from a few meters to more than several kilometers. On the other hand, the communication distance of the magnetic coupling type antenna device 1100 is, for example, about one meter or less.

That is, the magnetic coupling type antenna device 1100 is an antenna device for short distance communication or proximity communication. The antenna device 1100, for example, sends/receives a signal with a frequency of 13.56 MHz.

A magnetic body 1110 is a cuboid-shaped sintered ferrite, and for example, may have a short direction length (X-axis direction) A of 11 mm, a longitudinal direction length (Y-axis direction) B of 14 mm, and a thickness (Z-axis direction) C of 0.2 mm.

A size of the magnetic body 1110, as above, is an example. The magnetic body 1110 may have the short direction length (X-axis direction) A of 6 mm, the longitudinal direction length (Y-axis direction) B of 24 mm and the thickness (Z-axis direction) C of 0.2 mm.

The magnetic body 1110 is only required to be plate-like, and the shape of the magnetic body 1110 may be determined according to the size or the shape of a space where the antenna device 1100 is implemented. The magnetic body 1110 is not limited to a sintered ferrite, but may use any ferromagnetic body, such as iron, nickel, cobalt, or an alloy of these metals. Moreover, the magnetic body 1110 may be a flexible sheet-like member having flexibility.

A coil 1120 is an example of a coiled antenna (coil antenna) which is wound in the short direction of the magnetic body 1110 (X-axis direction) around the magnetic body 1110 at a central region in the longitudinal direction of the magnetic body 1110 (Y-axis direction). Accordingly, a distance D between the center of the region where the coil 1120 is wound around the magnetic body 1110 in the Y-axis direction and the end portion of the magnetic body 1110 on the side of the negative direction of the Y-axis is 7 mm where the length B is 14 mm. When the length B is 24 mm, the length D is 12 mm.

Both ends 1121 and 1122 of the coil 1120 are connected to a communication unit of an apparatus which performs communication using the antenna device 1100.

As a coil 1120, for example, a copper line may be used. A diameter of the coil 1120 (wire diameter) may, for example, be 50 µm. A number of turns of the coil 1120 may be, for example, about twenty. Wires in the coil 1120 wound around the magnetic body 1110 are wound so as to be closely in contact with each other.

The winding of the coil 1120, as above, will be denoted as "close coiling" in the following. Moreover, on a surface of the conductor wire used for the coil 1120 an enamel coating is applied. The diameter of the coil 1120 is 69 µm including the enamel coating.

Meanwhile, the diameter or the number of turns is an example, and they may be arbitrarily determined according to a purpose of the antenna device 1100 or the like.

Moreover, in the present embodiment, the coil 1120 is wound around the magnetic body 1110 in the short direction of the magnetic body 1110. The coil 1120 wound around the magnetic body 1110 in the short direction of the magnetic body 1110, as shown in FIG. 22, is considered to have a better characteristic than the coil 1120 wound around the magnetic body 1110 in the longitudinal direction of the magnetic body 1110.

This is because demagnetizing fields are generated at both end portions of the magnetic body 1110 (at the end portion on the side of the negative direction of the Y-axis, and at the end portion on the side of the positive direction of the Y-axis) by the coil 1120 wound in the short direction of the magnetic body 1110 in a looped shape. The influence of the demagnetizing field becomes smaller as the distance between the part where the coil 1120 is wound and the end portions of the magnetic body 1110.

Moreover, the coil wound around the magnetic body 1110 in the longitudinal direction of the magnetic body has a larger cross section than that of the coil wound in the short direction of the magnetic body and the magnetic resistance becomes smaller.

When the magnetic resistance increases, a magnetic field in a different direction from the Y-axis may occur, which will be explained later. On the other hand, when the magnetic resistance decreases, only the magnetic field in the Y-axis direction is used, and a range of use is restricted depending on the requirement or specification of the antenna.

For these reasons, the coil is preferably wound around the magnetic body 1110 in the short direction of the magnetic body 1110. Moreover, the magnetic body 1110 preferably has a rectangular shape from a planar view. Moreover, the coil 1120 is wound preferably at a central region of the magnetic body 1110, not at the end portion of the magnetic body.

Next, the antenna device 1100 according to the present embodiment will be compared with an antenna device for comparison 1150 having a planar antenna. The antenna device for comparison 1150 will be explained with reference to FIGS. 23 and 24.

Figure 23:
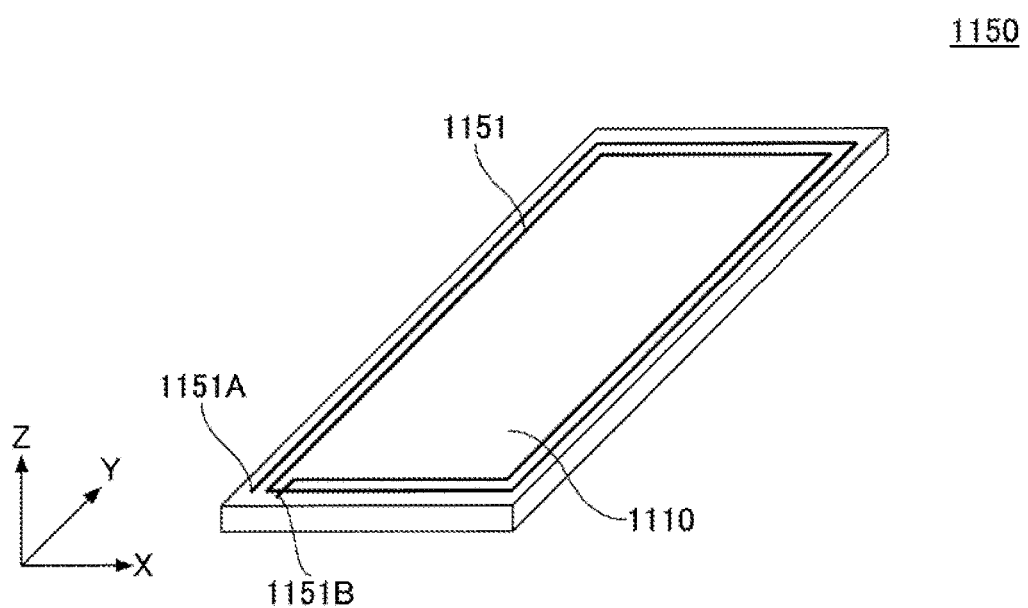
FIG. 23 is a perspective view illustrating the antenna unit for comparison 1150.
Figure 24:
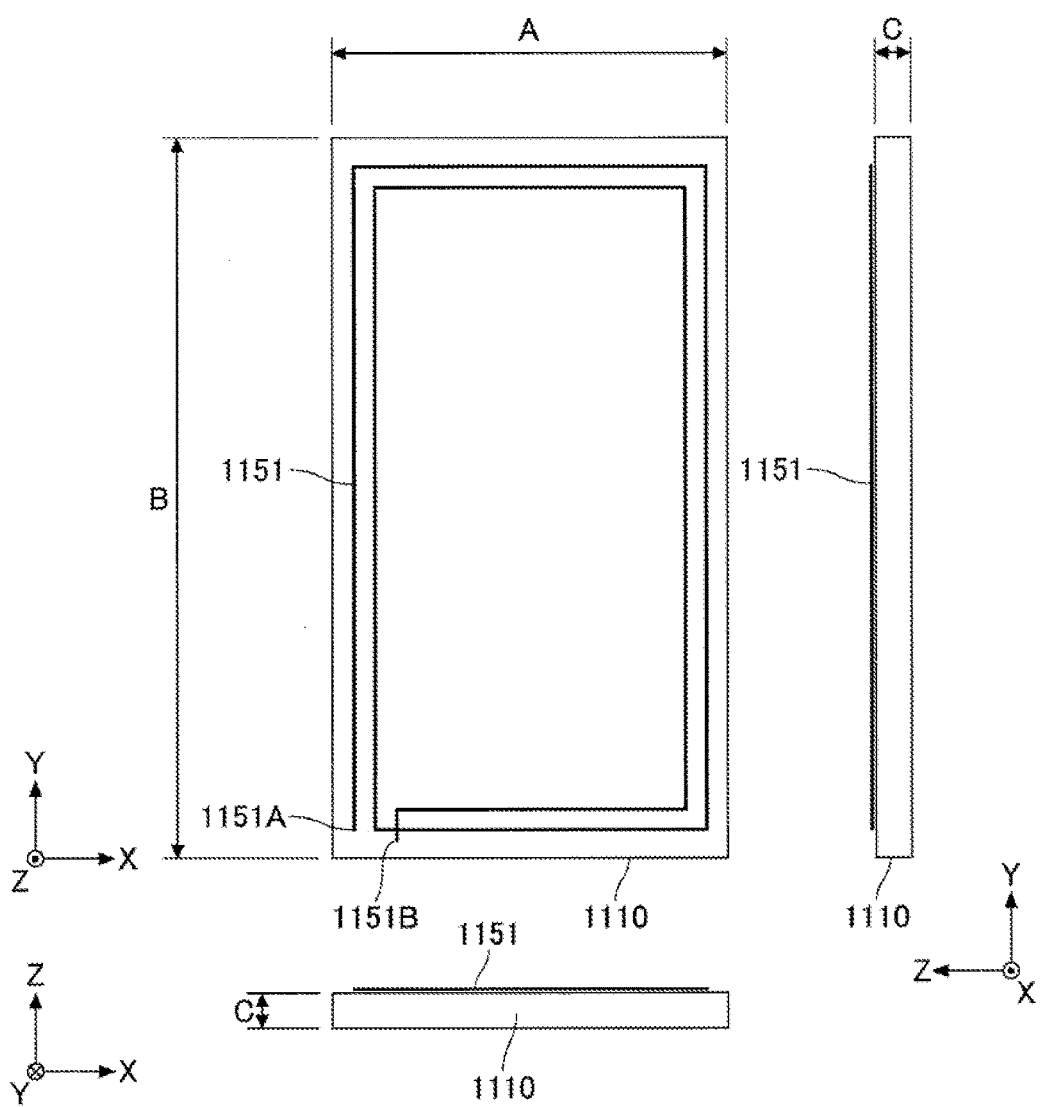
FIG. 24 is a top-front-side view illustrating the antenna unit for comparison 1150.

FIG. 23 is a perspective view illustrating the antenna device for comparison 1150. FIG. 24 is a top-front-side view illustrating the antenna device for comparison 1150. In FIGS. 23 and 24, as in the FIGS. 21 and 22, the XYZ coordinate system, which is an orthogonal coordinate system, is employed.

The antenna device for comparison 1150 is a magnetic coupling type antenna device, as well as the antenna device 1100 according to the third embodiment, and includes a magnetic body 1110 and a planar antenna 1151. The magnetic body 1110 in the antenna device for comparison 1150 is the same as the magnetic body in the antenna device 1100 according to the present embodiment.

The planar antenna 1151 is a copper line which is wound in a rectangular shape along an outer periphery of a surface on a positive side in the Z-axis direction of the magnetic body 1110. A number of turns of the planar antenna 1151 is, for example, two. Both ends 1151A and 1151B of the planar antenna 1151 are connected to a communication unit in an apparatus, which performs communication using the antenna device 1150.

Next, with reference to FIGS. 25A to 26B, results of electromagnetic field simulations will be explained for the antenna device 1100 according to the third embodiment and the antenna device for comparison 1150.

FIGS. 25A and 25B are diagrams illustrating results of simulations for density of magnetic flux B around the antenna device 1100 according to the third embodiment and the antenna device for comparison 1150, respectively. FIG. 25A shows the density of magnetic flux B of the antenna device 1100, and FIG. 25B shows the density of magnetic flux B of the antenna device 1150.

In FIGS. 25A and 25B, directions of arrows indicate directions of the density of magnetic flux B (directions of vectors).

Moreover, in the electromagnetic field simulations, models for the antenna device 1100 and antenna device 1150, which are shown in lower parts of FIGS. 25A and 25B, respectively. In the antenna device 1100, the origin of the XYZ coordinate system is on the surface on the positive side in the Z-axis direction of the magnetic body 1110 (Z=0), at a center of the magnetic body 1110 in the short direction (X=0), and at the midpoint of the end portion of the magnetic body 1110 on the positive side in the Y-axis direction and an end portion of the coil 1120 on the positive side in the Y-axis direction.

Moreover, in the antenna device 1150, on the positive side in the Y-axis direction, on a half of the surface on the positive side in the Z-axis direction, the planar antenna 1151 having a rectangular shape is disposed, and the origin of the XYZ coordinate system is set at the center of the loop of the planar antenna 1151. Positions of the origins are the same in FIGS. 25A and 25B.

Comparing FIGS. 25A and 25B, it is found that the density of magnetic flux B by the antenna device for comparison 1150 is concentrated around the Z-axis in the Z-axis direction, and that the density of magnetic flux by the antenna device according to the third embodiment is widely distributed in the total YZ-plane.

Moreover, strengths of the magnetic field H at a point separated in the Z-axis direction from the origin are found to be almost equivalent between the antenna device 1100 according to the third embodiment and the antenna device for comparison 1150.

A density of magnetic flux B around the antenna device for comparison 1150 is distributed so as to arise from the planar coil 1151 in the positive direction of the Z-axis, turn to the positive and negative directions of the Y-axis, and return to the planar coil 1151 from the side of the negative direction of the Z-axis.

A density of magnetic flux B around the antenna device 1100 according to the third embodiment is distributed so as to arise from the coil 1120 in the positive direction of the Y-axis, turn to the positive and negative directions of the Z-axis, and return to the coil 1120 from the side of the negative direction of the Y-axis.

Moreover, at a position separated from the origin in the Y-axis direction, it is found that the magnetic flux loop is larger in the direction of the Z-axis and the intensity of the magnetic field is larger for the antenna device 1100 according to the third embodiment compared with the antenna device for comparison 1150.

FIGS. 26A and 26B show results of simulations for the magnetic field H around the antenna device 1100 according to the third embodiment and the antenna device for comparison 1150, respectively. FIG. 26A shows the magnetic field H of the antenna device 1100, and FIG. 26B shows the magnetic field H of the antenna device 1150.

In the simulations for the magnetic field H, as shown in FIGS. 26A and 26B, the same models for the antenna devices 1100 and 1150 as in FIGS. 25A and 25B are employed, and the positions of the origins in the XYZ coordinate system are the same as in FIGS. 25A and 25B, respectively.

In FIGS. 26A and 26B, the magnetic field in a dark region is higher than that in a lighter region.

As shown in FIGS. 26A and 26B, compared with the magnetic field H formed by the antenna device for comparison 1150 (FIG. 26B), the magnetic field H formed by the antenna device 1100 according to the third embodiment (FIG. 26A) is found to show overall higher values. Moreover, also at positions separated from the origin in the Z-axis direction and in the Y-axis direction, higher values of the magnetic field are obtained for the antenna device 1100 according to the third embodiment.

As described above, from the results of the electromagnetic field simulation, shown in FIGS. 25A to 26B, the distribution of the density of magnetic flux B is found to be quite different between the antenna device 1100 according to the third embodiment and the antenna device for comparison 1150.

Moreover, the magnetic field H of the antenna device 1100 according to the third embodiment is higher in a wider area than that of the antenna device for comparison 1150, and also at positions separated from the origin in the Z-axis direction and in the Y-axis direction, higher values are obtained.

When an electric current is applied to the planar antenna in the antenna device for comparison 1150, a magnetic field H in the Z-axis direction arises according to Ampere's right-handed screw rule.

Since the directions of the magnetic field H and of the magnetic flux B are the same, the magnetic flux from the planar coil 1151 of the antenna device for comparison 1150 is radiated from the magnetic body 1110 in the Z-axis direction, and as shown in FIG. 25B, forms a distribution having a shape of a figure eight rotated by 90 degrees with a center at the origin.

On the other hand, in the antenna device 1100 according to the third embodiment, the magnetic field H formed by the coil 1120, which is wound around the magnetic body 1110 in a form of a loop, has a direction of the Y-axis according to the Ampere's right-handed screw rule.

For this reason, in the case of the antenna device 1100 according to the third embodiment, the magnetic flux B by the coil 1120 propagates in the Y-axis direction inside the magnetic body 1110.

In this way, the magnetic flux B by the coil 1120 has the direction of the Y-axis, but on the whole, as shown in FIG. 25A, the magnetic flux B by the antenna device 1100 according to the third embodiment is found to be distributed in the Z-axis direction. Moreover, the magnetic field H generated by the coil 1120 is found to spread also in the Z-axis direction, as shown in FIG. 26A.

Since a magnetic resistance inside the magnetic body 1110 is higher than that outside the magnetic body (in the air), a magnetic flux B having the Y-axis direction generated by the antenna device 1100 propagates in a space where the magnetic resistance is lower, i.e. outside the magnetic body 1110.

For this reason, in the antenna device 1100 according to the third embodiment, the magnetic flux B having the Y-axis direction generated inside the magnetic body 1110 by the coil 1120 spreads outside the magnetic body 1110, and is considered to spread also to the Z-axis direction (see FIG. 25A).

Moreover, the magnetic body 1110 has a length in the Z-axis direction which is quite small compared with the lengths in the Z-axis direction and the Y-axis direction. That is, the magnetic body 1110 is like a thin plate-like member. This means that a cross section of the magnetic body 1110 parallel to the XZ-plane is small and thin in the Z-axis direction.

In general, the magnetic resistance of the magnetic body becomes higher, as the cross section becomes smaller. For this reason, the magnetic resistance of the magnetic body 1110 according to the third embodiment is quite high.

Accordingly, when an electric current is applied to the coil 1120 of the antenna device 1100 according to the third embodiment, the magnetic flux generated inside the magnetic body 1110 in the Y-axis direction enters a state of being easily radiated in the Z-axis direction.

For this reason, in the antenna device 1100, making the thickness of the magnetic body 1110 thin is effective for obtaining a long communication distance in the Z-axis direction (direction of the thickness of the magnetic body 1110).

0091b

The antenna unit 1010, as shown in FIGS. 18A and 18B includes the two antenna devices 1100 according to the third embodiment, as above. Since the two antenna devices 1100 are configured so that magnetic fields, polarities of which are opposite to each other, are generated, an antenna unit 1010 having a long communication distance can be provided.

Next, with reference to FIGS. 27 and 28, a communication distance in the case where the antenna device 1100 according to the third embodiment is mounted on a PCB (Printer Circuit Board) 1130 will be explained.

Figure 27:
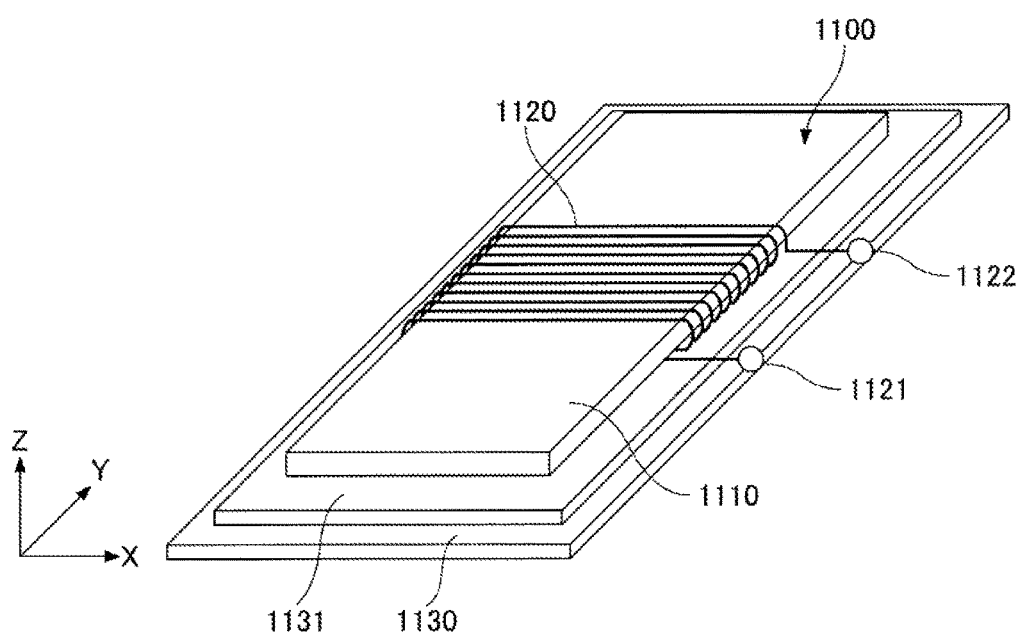
FIG. 27 is a perspective view illustrating an example of the antenna device 1100 according to the third embodiment mounted on a PCB (Printed Circuit Board) 1130.
Figure 28:
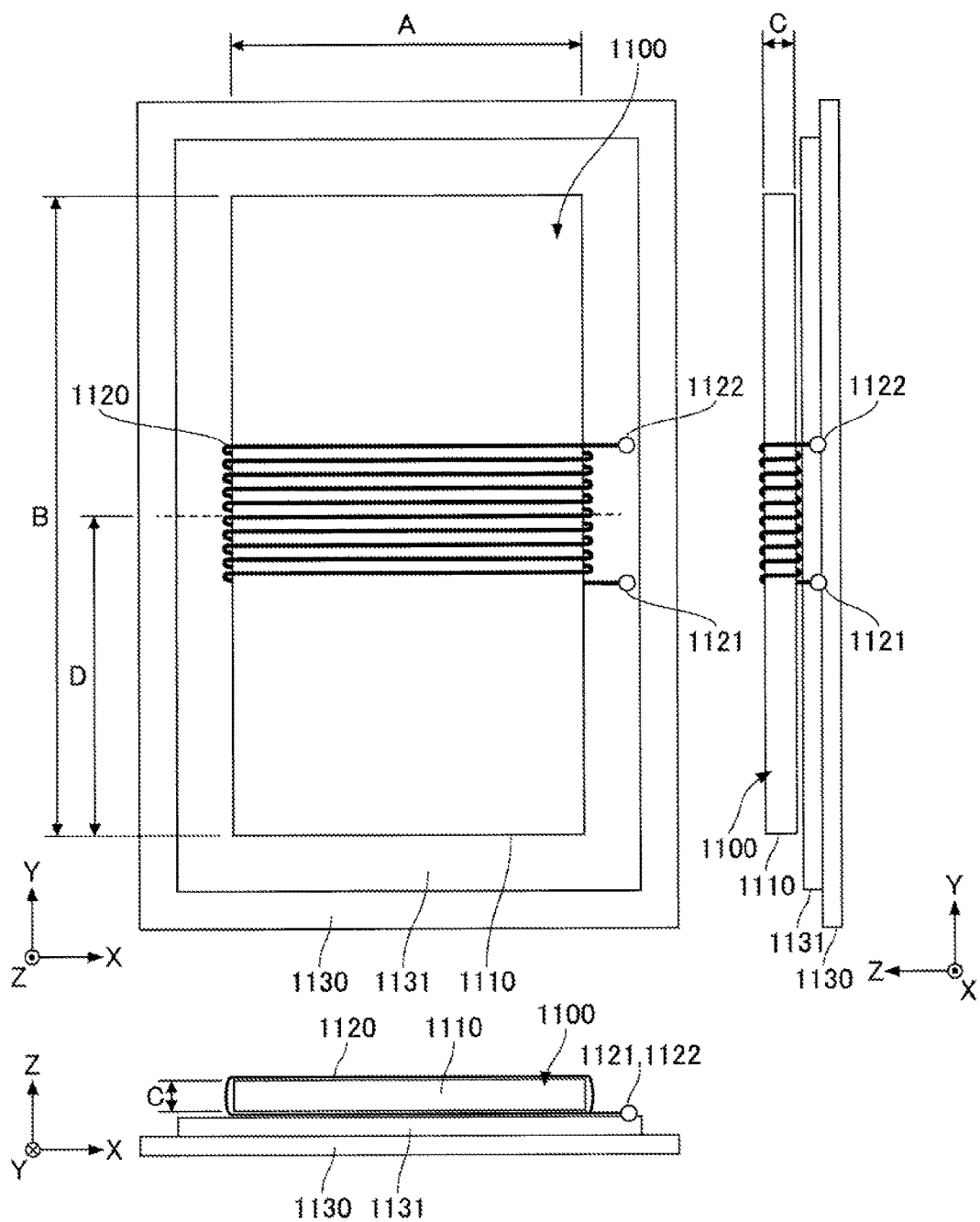
FIG. 28 is a top-front-side view illustrating an example of the antenna device 1100 according to the third embodiment mounted on the PCB 1130.

FIG. 27 is a perspective view illustrating a state where the antenna device 1100 according to the third embodiment mounted on the PCB 1130. FIG. 28 is a top-front-side view illustrating the state where the antenna device 1100 according to the third embodiment mounted on the PCB 1130. In FIGS. 27 and 28, as in the FIGS. 21 and 22, the XYZ coordinate system, which is an orthogonal coordinate system, is employed.

The PCB includes a copper foil 1131 formed on a surface on the side of the positive direction of the Z-axis. As shown in FIGS. 27 and 28, the antenna device 1100 is mounted on the copper foil 1131 of the PCB 1130.

In the following, a communication distance in the Z-axis direction in the case where the antenna device 1100 is mounted on the PCB 1130, and a communication distance in the Z-axis direction of the antenna device 1100, which is not mounted on the PCB 1130 will be compared.

Moreover, as well as the antenna device 1100, communication distances in the case where the antenna device for comparison 1150 is not mounted on the PCB 1130 and in the case where the antenna device 1150 is mounted on the PCB 1130 will be compared.

The communication distance in the present embodiment is defined as a distance in the Z-axis direction from a surface of the magnetic body 1110 of the antenna devices 1100 or 1150 on the side of positive direction of the Z-axis to the antenna of the apparatus on the other end of the communication.

A result of the comparison shows that the communication distance in the case where the antenna device 1100 is not mounted on the PCB 1130 is 28.5 mm, and the communication distance of the antenna device 1100 mounted on the PCB 1130 is 29.0 mm.

That is, it is found that the antenna device 1100 according to the third embodiment is barely affected by the copper foil 1131, and even if the antenna device 1100 is mounted on the copper foil 1131, the communication distance as in the case where the antenna device 1100 is not mounted on the copper foil 1131 can be obtained which is almost the same.

Moreover, the communication distance in the case where the antenna device for comparison 1150 is not mounted on the PCB 1130 is 30.5 mm, and the communication distance in the case where the antenna device 1150 is mounted on the PCB 1130 is 13.0 mm.

That is, it is found that the antenna device for comparison 1150 is significantly affected by the copper foil 1131, and the communication distance is shortened markedly when the antenna device for comparison 1150 is mounted on the PCB 1130.

In the case of actually incorporating the antenna device 1100 into a terminal apparatus, the PCB (printed circuit board), on which the communication circuit is mounted, is supposed to exit the terminal apparatus, since the communication circuit connected to the antenna device 1100 is necessary.

The PCB includes, in general, a solid pattern, which is a copper foil formed on a surface or in an inner layer for a ground or a power source. As the copper foil 1131 shown in FIGS. 27 and 28, the solid pattern has approximately the same size as the PCB 1130 in planar view. That is, the copper foil has been provided assuming a solid pattern included in a general PCB.

Since even if the antenna device 1100 according to the third embodiment is mounted on the PCB 1130, the communication distance is barely affected, so the antenna device is more suitable to be mounted on the PCB 1130 than the antenna device for comparison 1150.

In this way, the reason why the communication distance is barely affected, even if the antenna device 1100 is mounted on the PCB 1130, is considered to be that in the antenna device 1100, the coil 1120 is wound in the short direction around the magnetic body 1110 in a central region in the longitudinal direction of the magnetic body 1110, which is formed in a cuboid having a thin-plate shape.

It is considered that by using a coil 1120, which is wound as above, the magnetic flux is propagated in the thickness direction of the magnetic body 1110 (Z-axis direction) efficiently, the influence from the existence of the copper foil 1131 to the communication distance is minimized.

As described above, according to the third embodiment, the antenna device 1100, which provides a long communication distance in the thickness direction of the magnetic body 1110 having a thin plate shape wherein the communication distance is not shortened even if the antenna device 1100 is embedded in a terminal apparatus which performs short distance communication by magnetic coupling, is provided.

That is, according to the third embodiment, the antenna device 1100 is provided, wherein the communication distance in the thickness direction of the magnetic body 1110 is long.

In the antenna device 1100, at the central part in the longitudinal direction of the magnetic body 1110 formed in a cuboid having a thin plate shape, by winding the coil 1120 in the short direction of the magnetic body 1110, the communication distance in the thickness direction of the magnetic body becomes longer.

As explained above with reference to FIGS. 25 and 26, the antenna device 1100 according to the third embodiment includes the magnetic body 1110 and the coil 1120, having the above configurations, and most of the magnetic flux B generated at the coil 1120 is directed in the positive direction of the Y-axis inside the magnetic body 1110.

Then, the magnetic flux B radiated from the coil 1120 in the positive direction of the Y-axis, is directed in the positive direction of the Z-axis, drawing a loop, and returns to the coil 1120 from the side of the negative direction of the Y-axis.

The antenna device 1100 according to the third embodiment generates the magnetic flux which is distributed as above, and even if the antenna device 1100 is mounted on the copper foil 1131, the returned magnetic flux B propagates inside the magnetic body 1110 in the Y-axis direction, and is radiated in the Z-axis direction, without the copper foil 1131 blocking the path.

In the antenna device for comparison 1150, when the magnetic flux B radiated from the planar coil 1151 in the positive direction of the Z-axis passes through the copper foil 1131, whereas an opposing magnetic flux B is generated by an eddy current reducing the magnetic flux B.

According to the difference, as explained above, the antenna device 1100 according to the third embodiment, in the state of being mounted on the copper foil 1131, provides a longer communication distance in the Z-axis direction than that of the antenna device for comparison 1150.

Moreover, in the case of mounting the antenna device 1100 on the copper foil 1131, not only the communication distance in the Z-axis direction, but also the communication distance in the longitudinal direction (Y-axis direction) are longer than those for the antenna device 1150, since the density of magnetic flux B and the magnetic field H in the longitudinal direction of the magnetic body 1110 are higher than those in the antenna device 1150.

Moreover, although the communication distances in the X-axis direction for the antenna devices 1100 and 1150 are not compared, since the density of magnetic flux B and the magnetic field H in the Y-axis direction and in the Z-axis direction are high for the antenna device 1100, the density of magnetic flux B and the magnetic field H in the X-axis direction of the magnetic body 1110 are also considered to be high compared to the antenna device 1150.

As described above, according to the third embodiment, in a short distance communication of the magnetic coupling type, the antenna device 1100 which provides a longer communication distance than that by the antenna device for comparison 1150, in which the planar coil 1151 is used, can be provided.

The antenna unit 1010, as shown in FIGS. 18A and 18B includes the two antenna devices 1100 according to the third embodiment, as above. By configuring the two antenna devices 1100 so as to generate magnetic fields toward the connection portion, an antenna unit 1010 having a wide directivity and a long communication distance can be provided.

By incorporating the antenna unit 1010 as above into, for example, a terminal apparatus which performs a short distance communication by the magnetic coupling, the directivity becomes wider, the communication distance to the other end of the communication becomes longer, and a certain communication can be performed.

Moreover, when the antenna unit 1010 is installed on the PCB substrate, the form and empty space can be utilized effectively. For example, in the case of incorporating into a SIM card, by arranging at the corner portion of the PCB substrate, a degree of freedom occurs in a layout of other circuit elements or the like.

Furthermore, the connecting portion has an effect of preventing a decline in the magnetic permeability of the magnetic body. For example, compared with the case where two plate-like magnetic bodies are arranged via an air or a material other than the magnetic body, the communication distance can be made longer. Moreover, by changing the shape of the connecting portion, an adjustment to strengthen a magnetic field in a direction slightly deviated from the x- or y-axis directions is possible.

As described above, a usability of the terminal apparatus including the antenna unit 1010 can be improved and reliability can be enhanced.

<Fourth Embodiment>

An antenna device 1200 according to the fourth embodiment is a variation of the antenna device 1100 according to the third embodiment. The two antenna devices 1200 according to the fourth embodiment are included in the antenna unit 1010 (See FIGS. 18A and 18B), as the antenna device 1100 according to the third embodiment.

In the following, a configuration of the antenna device 1200 according to the fourth embodiment will be explained.

Figure 29:
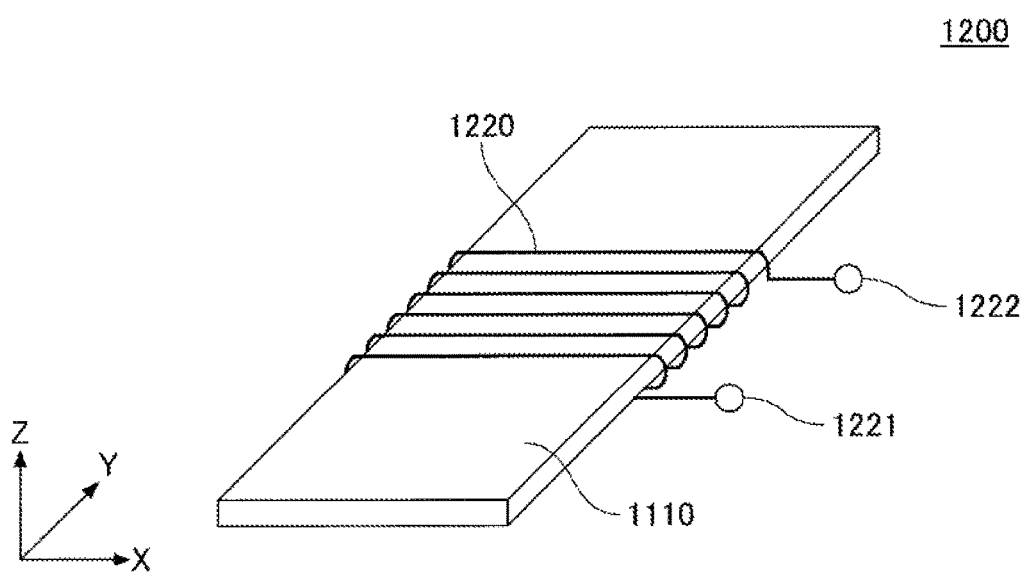
FIG. 29 is a perspective view illustrating an example of an antenna unit 1200 according to a fourth embodiment.
Figure 30:
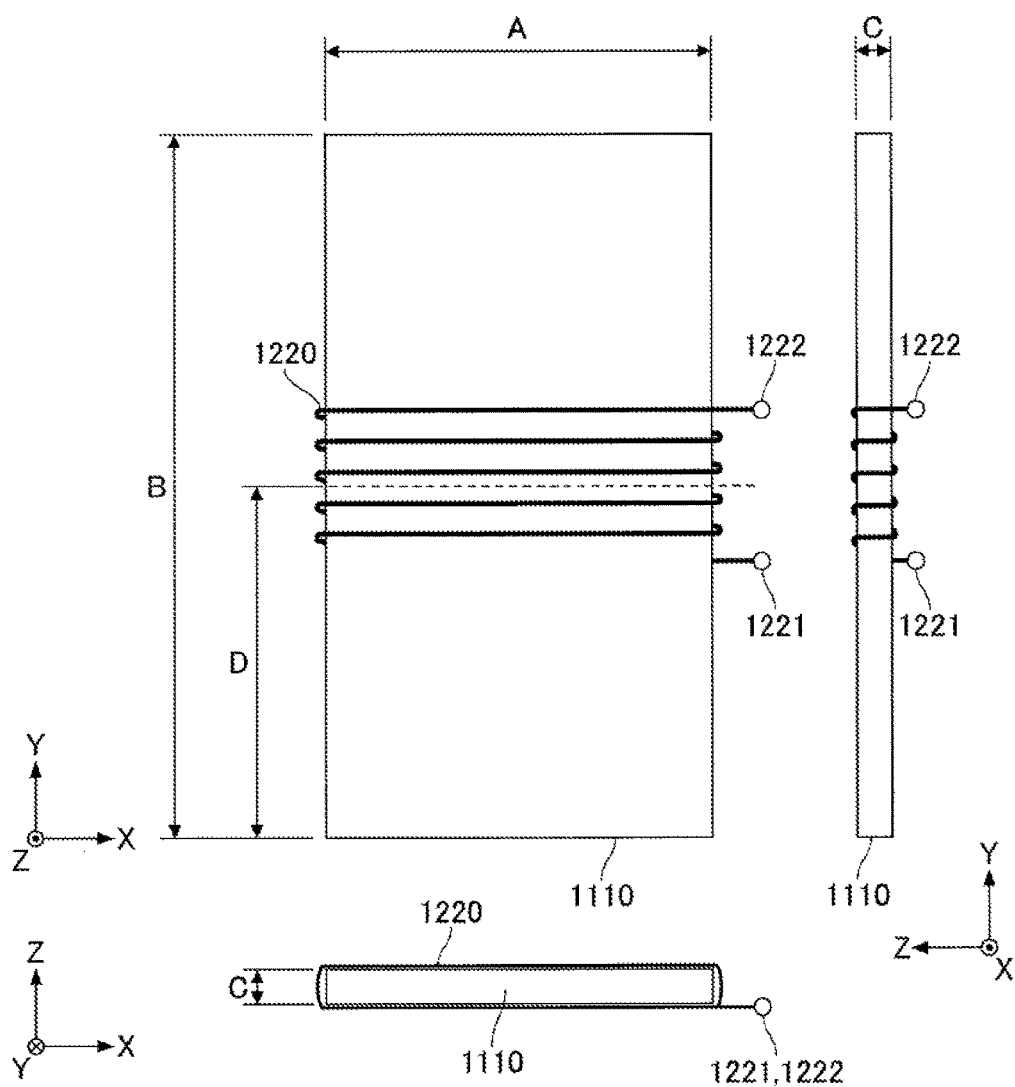
FIG. 30 is a top-front-side view illustrating an example of the antenna unit 1200 according to the fourth embodiment.

FIG. 29 is a perspective view showing an antenna device 1200 according to a fourth embodiment. FIG. 30 is a top-front-side view showing the antenna device 1200 according to the fourth embodiment. In FIGS. 29 and 30, an XYZ coordinate system, which is an orthogonal coordinate system, is employed.

The antenna device 1200 according to the fourth embodiment is different from the antenna device 1100 according to the third embodiment in that a number of turns of the coil 1220 is less than that of the coil 1120 in the third embodiment. Accordingly, wires in the coil 1220 wound around the magnetic body 1110 are wound so as not to be in contact with each other.

The antenna device 1200 is a magnetic coupling type antenna device, and includes a magnetic body 1110 and a coil 1220. The magnetic body 1110 is the same as the magnetic body 1110 in the antenna device according to the third embodiment. The coil 1220 is a coil, a number of turns of which is less than the coil 1120 according to the third embodiment. According to this feature, wires in the coil 1220 wound around the magnetic body 1110 are wound so as not to be in contact with each other.

The other configurations are the same as the antenna device 1100 according to the third embodiment, and duplicate explanations will be omitted.

The coil 1220 is wound in the short direction (X-axis direction) of the magnetic body 1110 in the central part in the longitudinal direction (Y-axis direction) of the magnetic body 1110. Accordingly, a distance D between the center of the region where the coil 1220 is wound around the magnetic body 1110 in the Y-axis direction and the end portion of the magnetic body 1110 on the side of the negative direction of the Y-axis is 7 mm where the length B is 14 mm. When the length B is 24 mm, the length D is 12 mm.

Both ends 1221 and 1222 of the coil 1220 are connected to a communication unit of an apparatus which performs communication using the antenna device 1200.

As a coil 1220, for example, a copper line may be used. A diameter of the coil 1220 (wire diameter) may, for example, be 50 µm. A number of turns of the coil 1220 may be, for example, about eight. Wires in the coil 1220 wound around the magnetic body 1110 are wound so as not to be in contact with each other. The winding of the coil 1220, as above, will be denoted as "coarse coiling" in the following.

Next, with reference to FIGS. 31A to 32B, results of electromagnetic field simulations will be explained for the antenna device 1200 (coarse coiling) according to the fourth embodiment and for the antenna device 1100 (close coiling) according to the third embodiment.

Figure 31A:
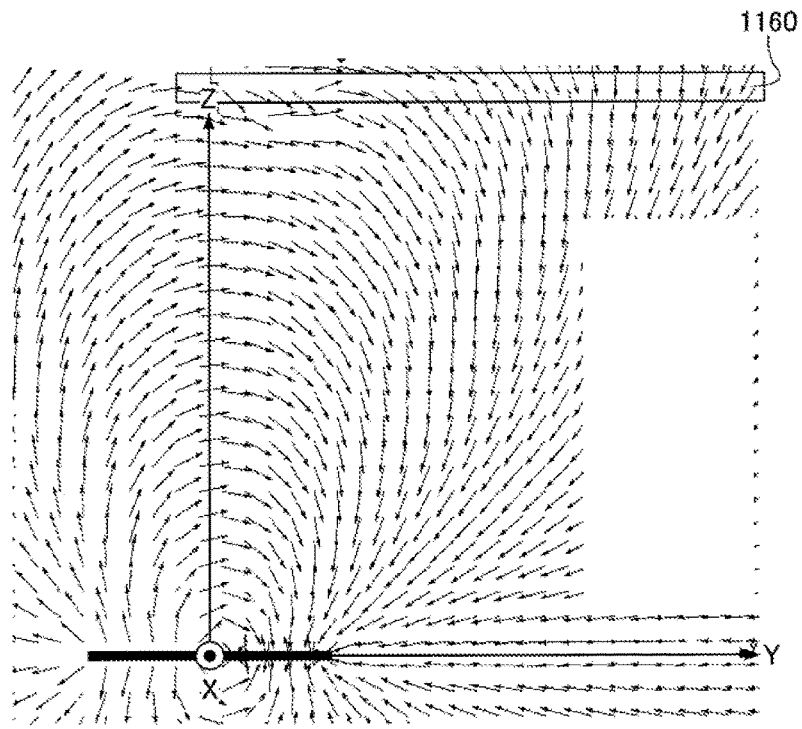
FIG. 31A is a diagram illustrating an example of a result of a simulation for a density of magnetic flux around the antenna device 1100 according to the third embodiment.
Figure 31B:
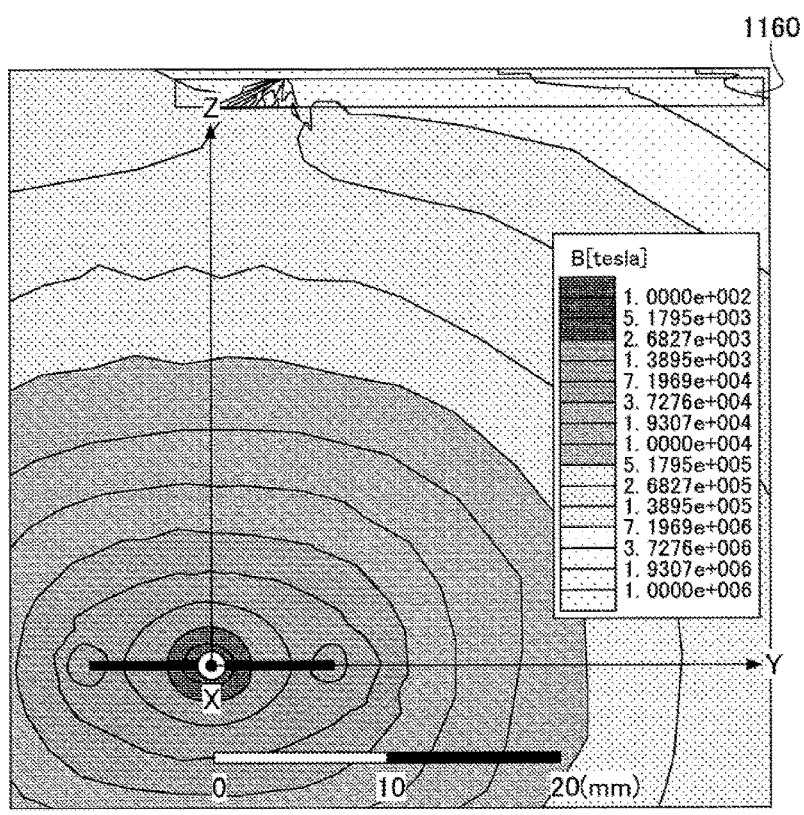
FIG. 31B is a diagram illustrating an example of a result of a simulation for a magnetic field H around the antenna device 1100 according to the third embodiment.

FIGS. 31A and 31B are diagrams illustrating results of simulations for density of magnetic flux B and the magnetic field H around the antenna device 1100 according to the third embodiment, respectively. FIG. 31A shows the density of magnetic flux B of the antenna device 1100, and FIG. 31B shows the magnetic field H of the antenna device 1100.

Figure 32A:
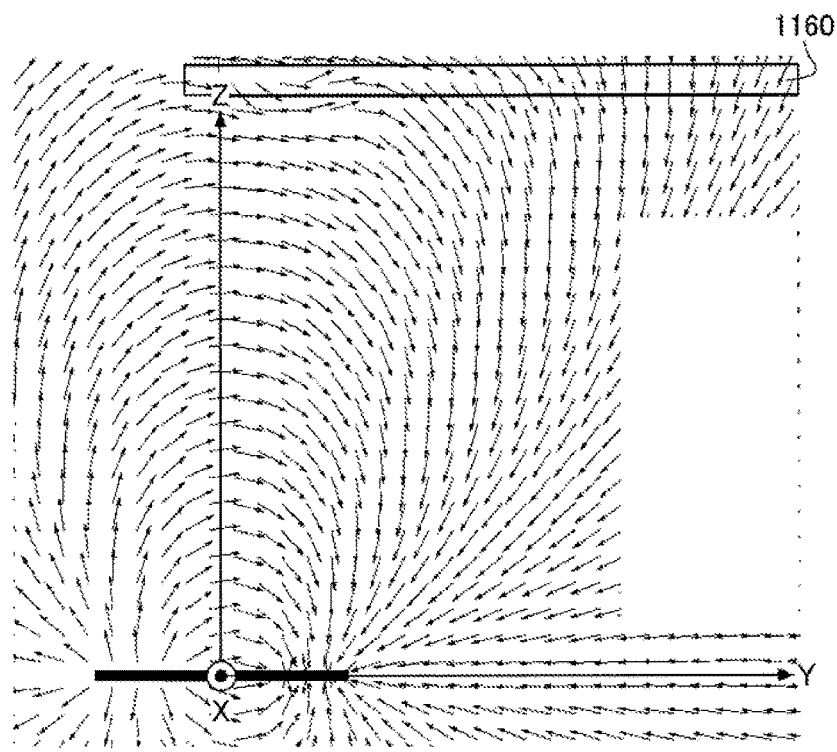
FIG. 32A is a diagram illustrating an example of a result of a simulation for a density of magnetic flux around the antenna unit 1200 according to the fourth embodiment.
Figure 32B:
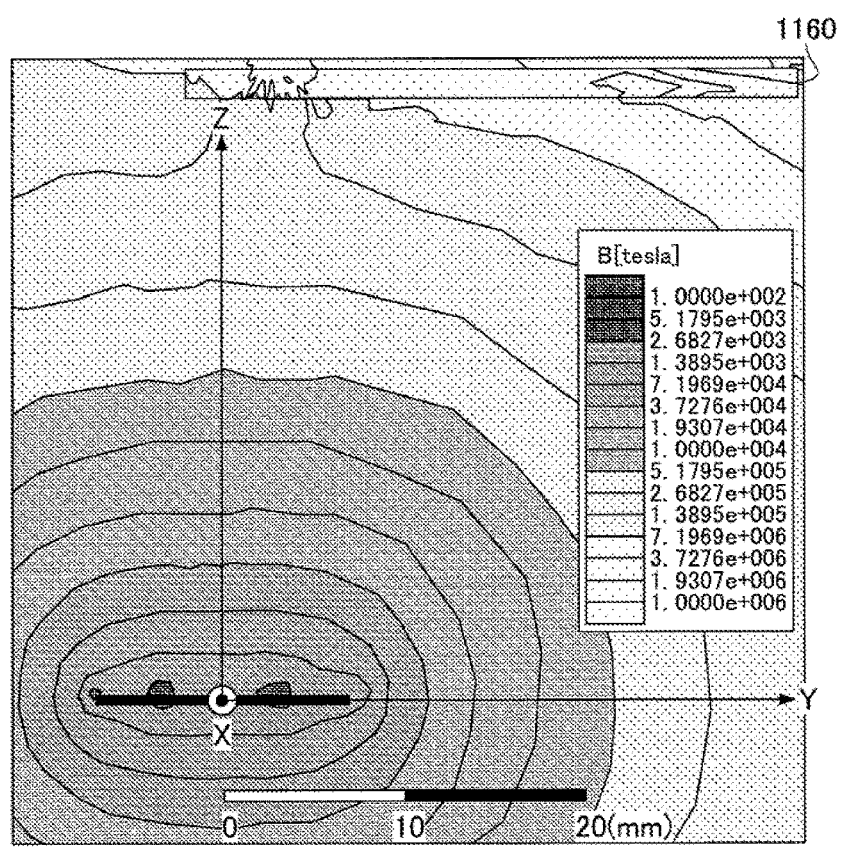
FIG. 32B is a diagram illustrating an example of a result of a simulation for a magnetic field H around the antenna unit 1200 according to the fourth embodiment.

FIGS. 32A and 32B are diagrams illustrating results of simulations for density of magnetic flux B and the magnetic field H around the antenna device 1200 according to the fourth embodiment, respectively. FIG. 32A shows the density of magnetic flux B of the antenna device 1200, and FIG. 32B shows the magnetic field of the antenna device 1200.

In FIGS. 31A and 32A, directions of arrows indicate directions of the density of magnetic flux B (directions of vectors). Moreover, in FIGS. 31B and 32B, the magnetic field in a dark region is higher than that in a bright region.

Moreover, the origin of the XYZ coordinate system in the antenna devices 1100 and 1200 is on the surface on the positive side in the Z-axis direction of the magnetic body 1110 (Z=0), at a center of the magnetic body 1110 in the short direction (X=0), and at a center of the magnetic body 1110 in the positive direction of the Y-axis.

Moreover, values of the density of magnetic flux B and the magnetic field H are obtained under a condition that a loop antenna 1160 is arranged above the antenna device 1100 or 1200 at a position where Z is 50 mm.

Comparing FIG. 31A with FIG. 32A, it is found that since curvatures of the density of magnetic flux B in the vicinity of the origin for the antenna device 1200 according to the fourth embodiment are smaller than those for the antenna device 1100 according to the third embodiment, the changes in directions of the density of magnetic flux B around the antenna device 1200 according to the fourth embodiment are more gradual than those around the antenna device 1100 according to the third embodiment.

The density of magnetic flux at a position separated from the origin in the Y-axis direction for the antenna device 1100 according to the third embodiment is almost the same as the density of magnetic flux B at the same position for the antenna device 1200 according to the fourth embodiment.

Moreover, for the magnetic field H, as can be seen by comparing FIG. 31B with FIG. 32B, curvatures of the isomagnetics of the magnetic field H in the vicinity of the origin for the antenna device 1200 according to the fourth embodiment are smaller than those for the antenna device 1100 according to the third embodiment, and the distribution of the magnetic field H around the antenna device 1200 according to the fourth embodiment is more gradual than that around the antenna device 1100 according to the third embodiment. Accordingly, the distribution of the magnetic flux can be made wider.

The magnetic field at a position separated from the origin in the Y-axis direction for the antenna device 1100 according to the third embodiment is almost the same as the magnetic field at the same position for the antenna device 1200 according to the fourth embodiment.

As described above, it is found that the distribution of the density of magnetic flux B and the magnetic field H around the antenna device 1200 according to the fourth embodiment (coarse coiling) is more gradual than those around the antenna device 1100 according to the third embodiment (close coiling). According to this property, the antenna device 1200 according to the fourth embodiment generates the magnetic field H more effectively, and wider distribution of the density of magnetic flux B can be obtained.

The above results are obtained by comparing the antenna device 1100 (close coiling) prepared under the condition setting of the third embodiment and the antenna device 1200 (coarse coiling) prepared under the condition setting of the fourth embodiment.

The number of turns of the coil 1120 or 1220, therefore, may be optimized depending on the intended use of the antenna device 1100 or 1200, or the like.

Figure 33:
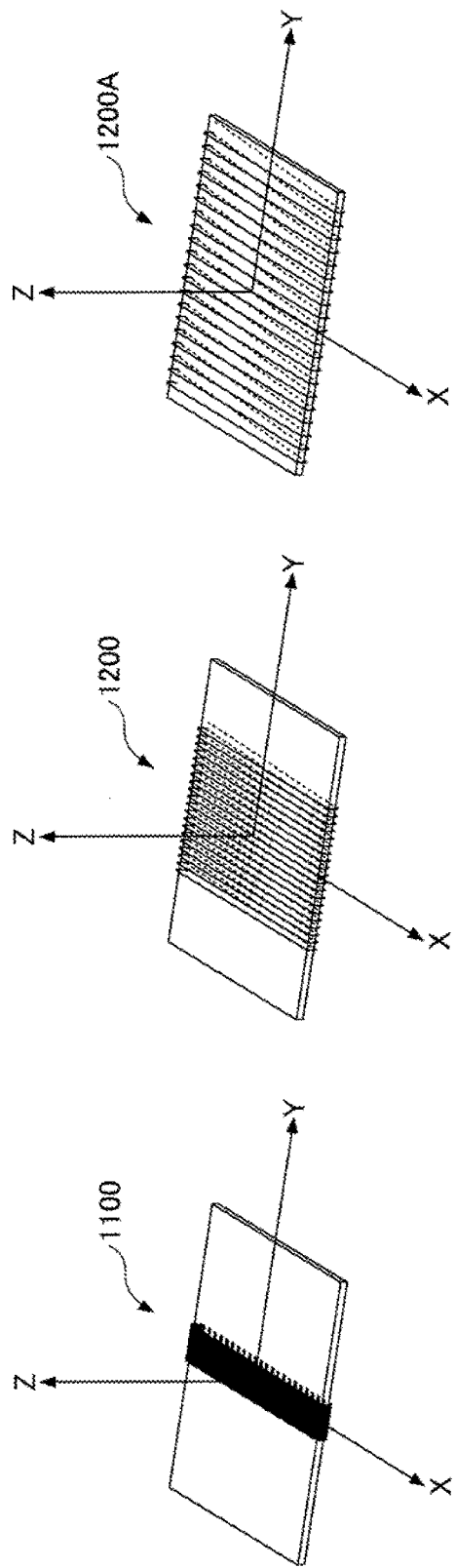
FIG. 33 is a perspective view illustrating an example of the antenna device 1100 according to the third embodiment and the antenna units 1200 and 1200A according to the fourth embodiment.

A communication distance is obtained for antenna devices 1100, 1200 and 1200A, as shown in FIG. 33, in order to investigate an influence of the way of winding in the coil 1100 or 1200 on the communication distance.

FIG. 33 is a perspective view illustrating the antenna device 1100 according to the third embodiment, and the antenna devices 1200 and 1200A according to the fourth embodiment.

The antenna device 1100, shown in FIG. 33, is the same as the antenna device 1100 according to the third embodiment, shown in FIG. 21. The antenna device 1200, shown in FIG. 33 is the same as the antenna device 1200 according to the fourth embodiment, shown in FIG. 29.

In the antenna device 1200A, as shown in FIG. 33, the coil 1220 is wound, so as to maintain the number of turns for the coil 1220 in the antenna device 1200, shown in FIG. 29, i.e. twenty turns, and to wind wires in a wider area in the Y-axis direction around the magnetic body 1110 in order to make the space between the wires in the coil 1220 wound around the magnetic body 1110 wider. The way of winding for the coil 1220 in the antenna device 1200A will be denoted as "very coarse coiling" in the following.

In the antenna device 1100, a line to space ratio (L/S ratio) for the coil 1120 is 50/19 µm. That is, in the coil 1120, a wire with a diameter of 69 µm, including a conductive wire with a diameter of 50 µm and enamel coating on it, is wound in the close coiling.

Moreover, in the antenna device 1200, the line to space ratio (L/S ratio) for the coil 1220 is 50/300 µm. That is, in the coil 1200, a wire including a conductive wire with a diameter of 50 µm is wound in the coarse coiling with a space of 300 µm between wires.

Moreover, in the antenna device 1200A, the line to space ratio (L/S ratio) for the coil 1220 is 50/600 µm. That is, in the coil 1220, a wire including a conductive wire with a diameter of 50 µm is wound in the coarse coiling with a space of 600 µm between wires.

The communication distances in the Z-axis direction for the antenna devices 1100, 1200 and 1200A are 27.5 mm, 30.0 mm and 31.0 mm, respectively, according to actual measurements.

From the results of the measurements as above, it is found that the communication distance can be adjusted by making the way of winding for the coil 1120 or 1220 either close or coarse.

As described above, according to the fourth embodiment, the antenna device 1200 having a long communication distance in the thickness direction of the magnetic body 1110 can be provided as in the third embodiment.

0154b

The antenna unit 1010, as shown in FIGS. 18A and 18B includes the two antenna devices 1100 according to the third embodiment, as above. Since the two antenna devices 1100 are configured so that magnetic fields, polarities of which are opposite to each other, are generated, an antenna unit 1010 having a long communication distance can be provided.

Next, connection coefficients in the antenna device 1200 (coarse coiling) and in the antenna device 1200A (very coarse coiling) will be described.

Figure 34:
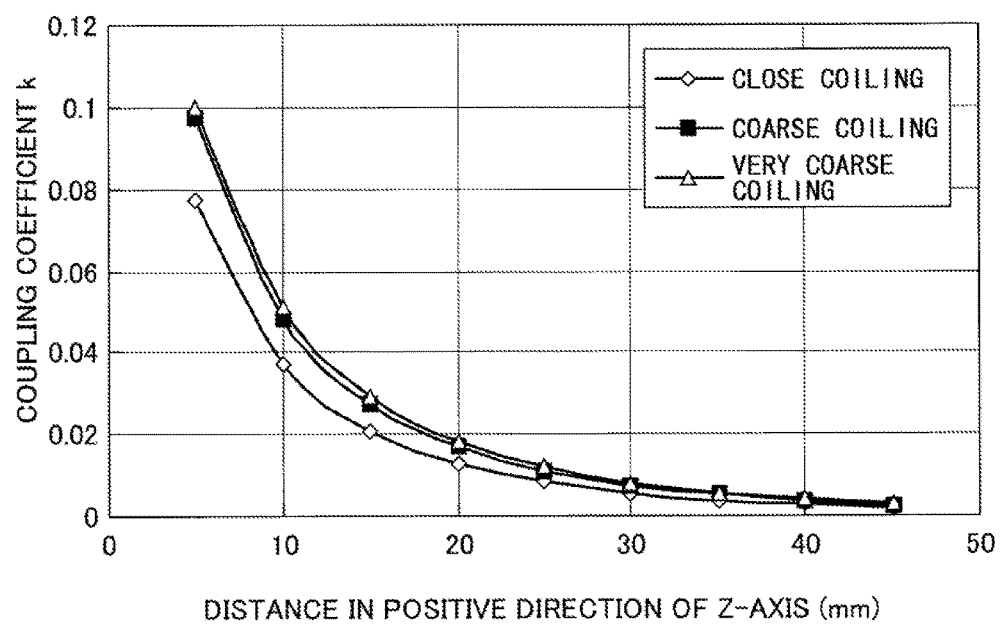
FIG. 34 is a diagram illustrating coupling coefficients of the antenna device 1100 (close coiling), the antenna unit 1200 (coarse coiling) and the antenna unit 1200A (very coarse coiling)

FIG. 34 is a diagram illustrating coupling coefficients of the antenna device 1100 (close coiling), the antenna device 1200 (coarse coiling) and the antenna device 1200A (very coarse coiling).

As shown in FIG. 34, the coupling coefficient k of the antenna device 1200A (very coarse coiling) is the largest, and the coupling coefficient k of the antenna device 1100 (close coiling) is the smallest.

From the above results, by winding the coil 1220 in the coarse coiling or in the very coarse coiling as in the antenna device 1200 or 1200A, rather than winding the coil 1120 in the close coiling as in the antenna device 1100, a large coupling coefficient and a long communication distance can be obtained.

As described above, the way of winding for the coil 1120 or 1220 may be set depending on the intended use of the antenna device 1100 or 1200, or the like. If the magnetic body 1110 is large enough in the Y-axis direction, the way of winding is preferably the coarse coiling or the very coarse coiling.

Figure 35:
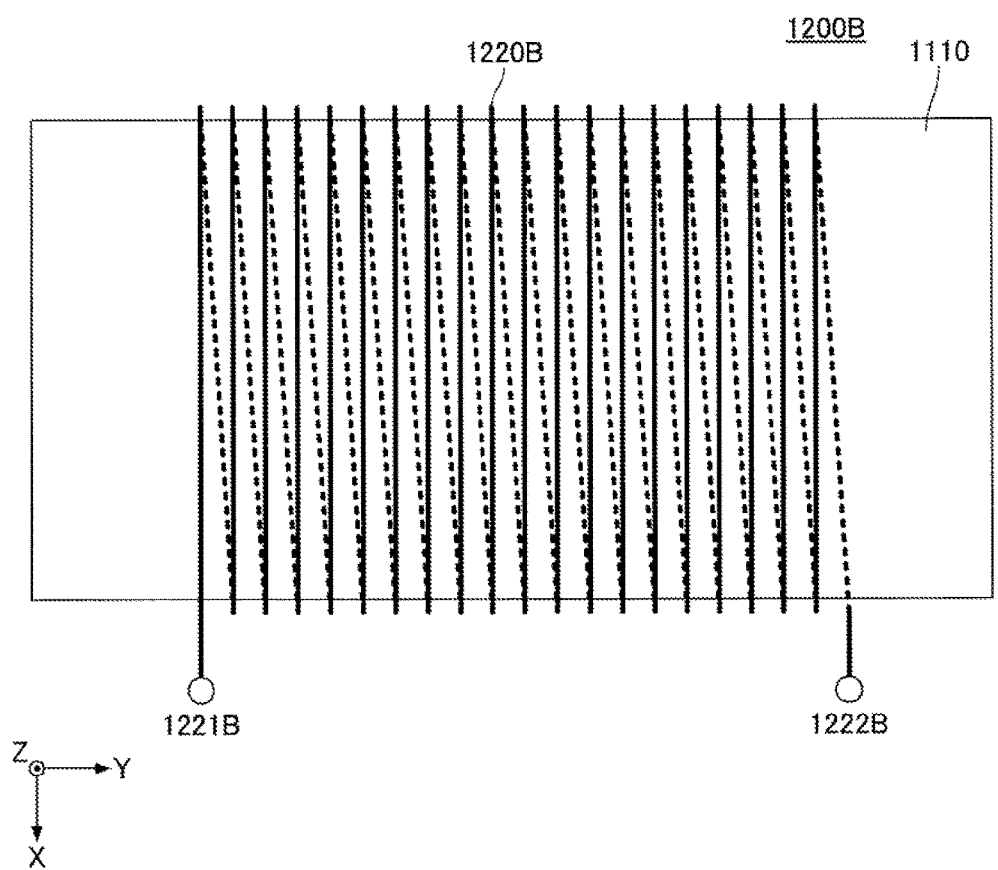
FIG. 35 is a diagram illustrating an example of an antenna unit 1200B according to a variation of the fourth embodiment.
Figure 36:
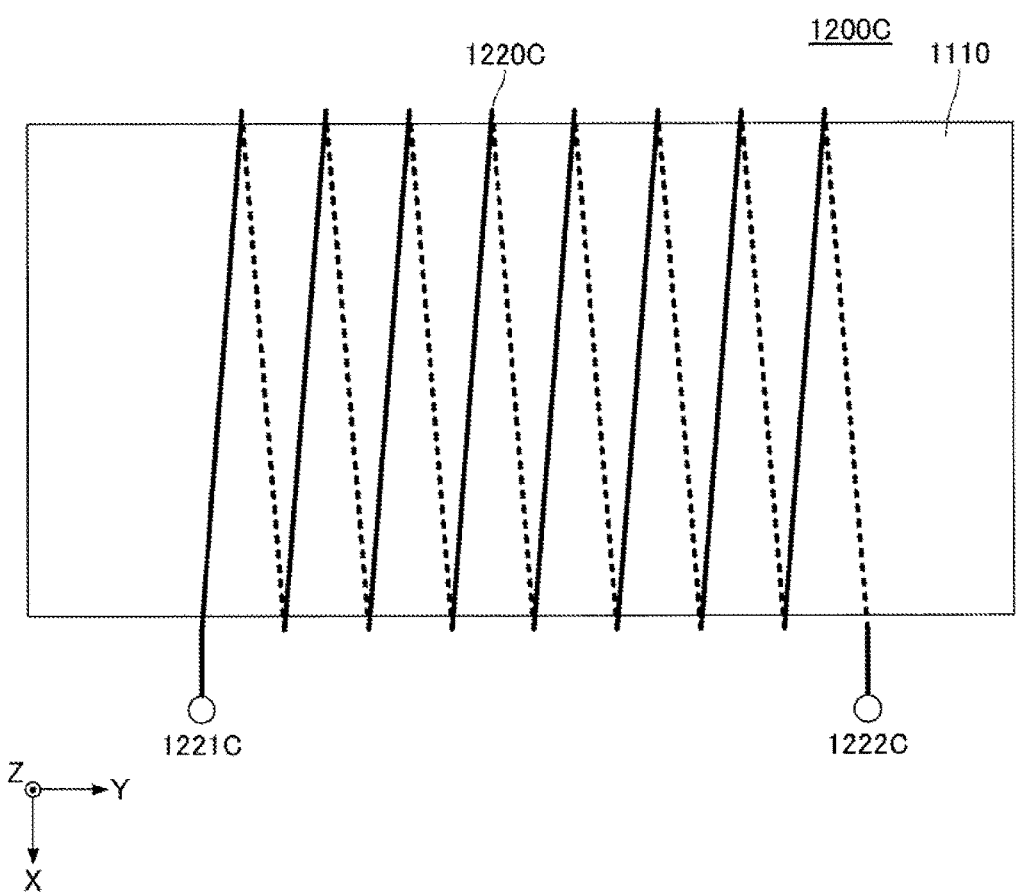
FIG. 36 is a diagram illustrating an example of an antenna unit 1200C according to the variation of the fourth embodiment.
Figure 37:
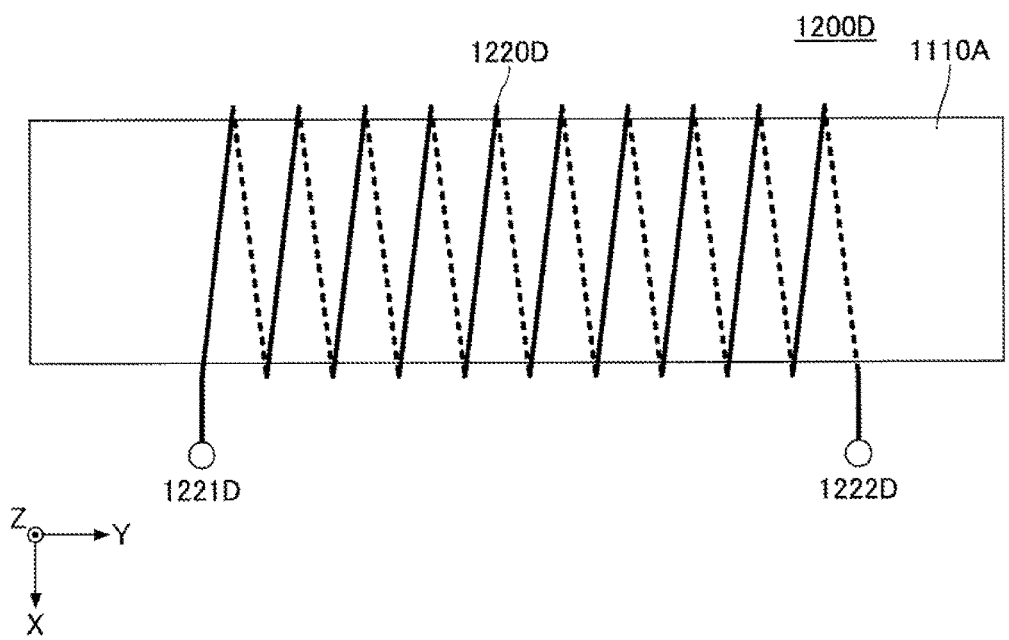
FIG. 37 is a diagram illustrating an example of an antenna unit 1200D according to the variation of the fourth embodiment.

Moreover, in the case of winding the coil 1220 in the coarse coiling, the way of winding may be changed, as shown in FIGS. 35 to 37.

FIGS. 35 to 37 are diagrams illustrating antenna devices 1200B, 1200C and 1200D according to a variation of the fourth embodiment.

In the antenna device 1200B shown in FIG. 35, a coil 1220B is wound in parallel to the X-axis on a surface of the magnetic body 1110 on the side of the positive direction of the Z-axis of the magnetic body 1110. On a surface on the side of the negative direction of the Z-axis of the magnetic body 1110, the coil 1220B is wound at an angle with the X-axis.

For example, in the antenna device 1200B, a distance between the ends 1221B and 1222B of the coil 1220B is 50 mm. The coil 1220B is wound wherein the space between the wires is from 0.4 mm to 0.5 mm and the number of turns is twenty (twenty turns).

In the antenna device 1200C shown in FIG. 36, a coil 1220C is wound at an angle with the X-axis on the surface on the side of the positive direction of the Z-axis of the magnetic body 1110 and on the surface on the side of the negative direction of the Z-axis of the magnetic body 1110. The angle between the coil 1220C and the X-axis on the side of the positive direction of the Z-axis is the same as the angle between the coil 1220C and the X-axis on the side of the negative direction of the Z-axis.

Accordingly, the coil 1220C on the surface on the side of the positive direction of the Z-axis and the coil 1220C on the surface on the side of the negative direction of the Z-axis are arranged in parallel, respectively.

For example, in the antenna device 1200C, a distance between the ends 1221C and 1222C of the coil 1220C is 50 mm. The coil 1220C is wound wherein the space between the wires is 1.5 mm and the number of turns is twenty (twenty turns).

In the antenna device 1200D shown in FIG. 37, a coil 1220D is wound around a magnetic body 1110A which is more elongated than the magnetic body 1110 shown in FIG. 36, i.e. the size in the X-axis direction is smaller, by the same way of winding as the coil 1220C in FIG. 36.

The coil 1220D is wound at an angle with the X-axis on the surface on the side of the positive direction of the Z-axis of the magnetic body 1110A and on the surface on the side of the negative direction of the Z-axis of the magnetic body 1110A. The angle between the coil 1220D and the X-axis on the side of the positive direction of the Z-axis of the magnetic body 1110A is the same as the angle between the coil 1220D and the X-axis on the side of the negative direction of the Z-axis of the magnetic body 1110A.

Accordingly, the coil 1220D on the surface on the side of the positive direction of the Z-axis and the coil 1220D on the surface on the side of the negative direction of the Z-axis are arranged in parallel, respectively.

For example, in the antenna device 1200D, a distance between the ends 1221D and 1222D of the coil 1220D is 50 mm. The coil 1220D is wound wherein the space between the wires is 0.7 mm to 1.1 mm and the number of turns is twenty (twenty turns).

<Fifth Embodiment>

Figure 38:
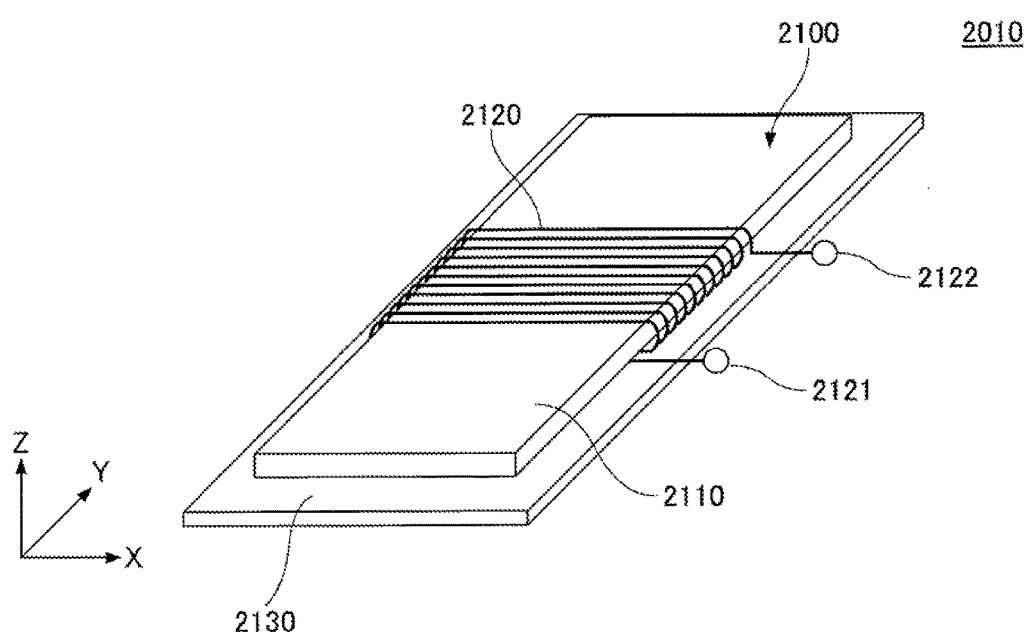
FIG. 38 is a perspective view illustrating an example of an antenna unit 2010 according to a fifth embodiment.
Figure 39:
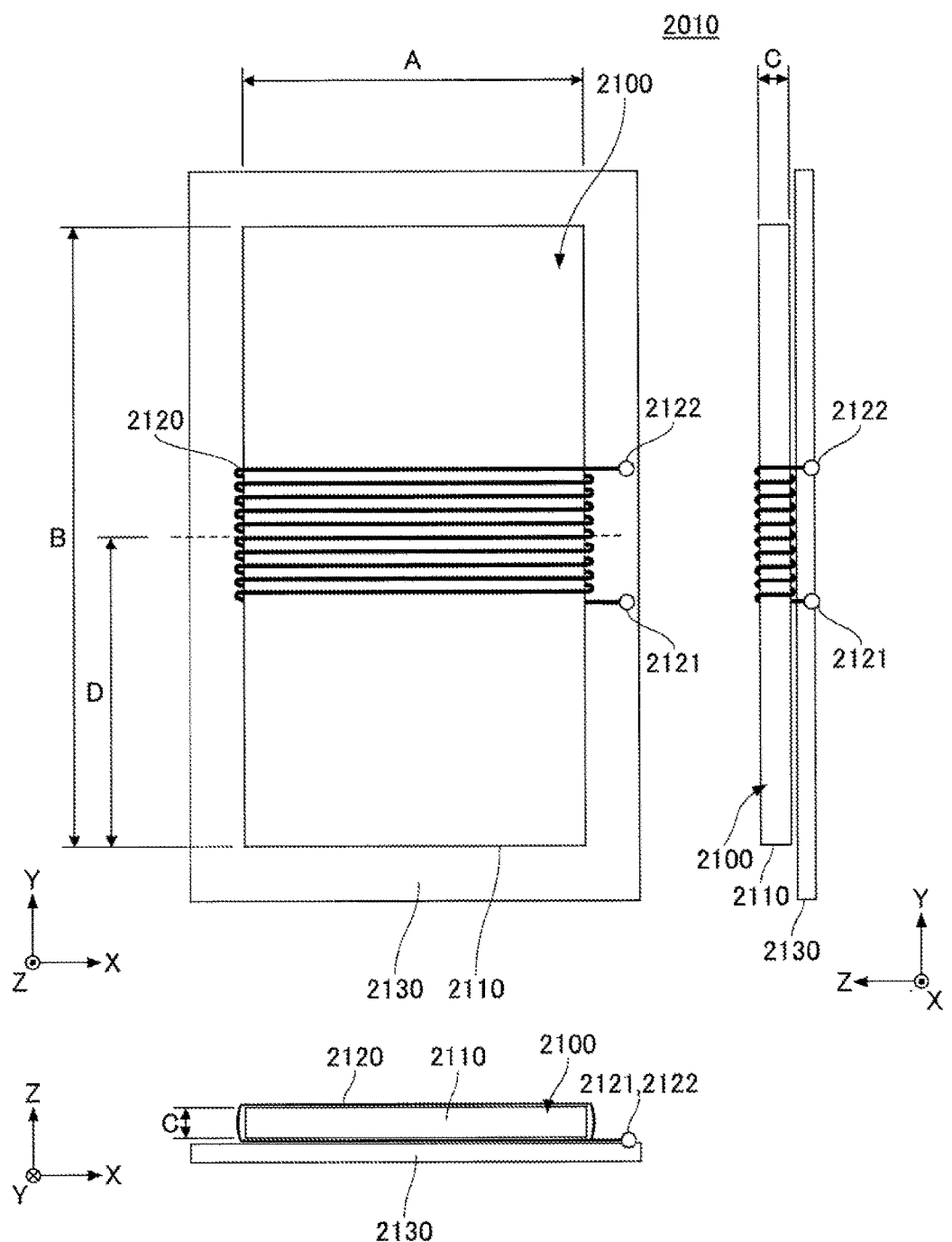
FIG. 39 is a top-front-side view illustrating an example of the antenna unit 2010 according to the fifth embodiment.

FIG. 38 is a perspective view illustrating an antenna unit 2010 according to a fifth embodiment. FIG. 39 is a top-front-side view illustrating the antenna unit 2010 according to the fifth embodiment. In FIGS. 38 and 39, an XYZ coordinate system, which is an orthogonal coordinate system, is employed.

The antenna unit 2010 is a magnetic coupling type antenna device, and includes an antenna device 2100, which includes a magnetic body 2110 and a coil 2120, and a metal plate 2130.

The magnetic coupling type antenna unit 2010 is different from a resonant type antenna device, which sends/receives electromagnetic waves by resonating with an electromagnetic wave of a specific frequency. Whereas, the magnetic coupling type antenna unit 2010 is an antenna device which magnetically couples to the magnetic flux generated from an antenna device in an other communication party, to perform communication.

Accordingly, a communication distance of the resonance type antenna device is from a few meters to more than several kilometers. On the other hand, the communication distance of the magnetic coupling type unit 2010 is, for example, about one meter or less.

That is, the magnetic coupling type antenna unit 2010 is an antenna device for short distance communication or proximity communication. The antenna unit 2010, for example, sends/receives a signal with a frequency of 13.56 MHz.

A magnetic body 2110 is a cuboid-shaped sintered ferrite, and for example, may have a short direction length (X-axis direction) A of 11 mm, a longitudinal direction length (Y-axis direction) B of 14 mm, and a thickness (Z-axis direction) C of 0.2 mm.

A size of the magnetic body 2110, as above, is an example. The magnetic body 2110 may have the short direction length (X-axis direction) A of 6 mm, the longitudinal direction length (Y-axis direction) B of 24 mm and the thickness (Z-axis direction) C of 0.2 mm.

The magnetic body 2110 is only required to be plate-like, and the shape of the magnetic body 2110 may be determined according to the size or the shape of a space where the antenna unit 2010 is implemented. The magnetic body 2110 is not limited to a sintered ferrite, but may use any ferromagnetic body, such as iron, nickel, cobalt, or an alloy of these metals. Moreover, the magnetic body 2110 may be a flexible sheet-like member having flexibility.

A coil 2120 is an example of a coiled antenna (coil antenna) which is wound in the short direction of the magnetic body 2110 (X-axis direction) around the magnetic body 2110 at a central region in the longitudinal direction of the magnetic body 2110 (Y-axis direction). Accordingly, a distance D between the center of the region where the coil 2120 is wound around the magnetic body 2110 in the Y-axis direction and the end portion of the magnetic body 2110 on the side of the negative direction of the Y-axis is 7 mm where the length B is 14 mm. When the length B is 24 mm, the length D is 12 mm.

Both ends 2121 and 2122 of the coil 2120 are connected to a communication unit of a device which performs communication using the antenna unit 2010.

As a coil 2120, for example, a copper line may be used. A diameter of the coil 2120 (wire diameter) may, for example, be 50 μm. A number of turns of the coil 2120 may be, for example, about twenty. Wires in the coil 2120 wound around the magnetic body 2110 are wound so as to be closely in contact with each other.

The winding of the coil 2120, as above, will be denoted as "close coiling" in the following. Moreover, on a surface of the conductor wire used for the coil 2120 an enamel coating is applied. The diameter of the coil 2120 is 69 μm including the enamel coating.

Meanwhile, the diameter or the number of turns is an example, and they may be arbitrarily determined according to a purpose of the antenna unit 2010 or the like.

Moreover, in the present embodiment, the coil 2120 is wound around the magnetic body 2110 in the short direction of the magnetic body 2110. The coil 2120 wound around the magnetic body 2110 in the short direction of the magnetic body 2110, as shown in FIG. 39, is considered to have a better characteristic than the coil 2120 wound around the magnetic body 2110 in the longitudinal direction of the magnetic body 2110.

This is because demagnetizing fields are generated at both end portions of the magnetic body 2110 (at the end portion on the side of the negative direction of the Y-axis, and at the end portion on the side of the positive direction of the Y-axis) by the coil 2120 wound in the short direction of the magnetic body 2110 in a looped shape. The influence of the demagnetizing field becomes smaller as the distance between the part where the coil 2120 is wound and the end portions of the magnetic body 2110.

Moreover, the coil wound around the magnetic body 2110 in the longitudinal direction of the magnetic body has a larger cross section than that of the coil wound in the short direction of the magnetic body and the magnetic resistance becomes smaller.

When the magnetic resistance increases, a magnetic field in a different direction from the Y-axis may occur, which will be explained later. On the other hand, when the magnetic resistance decreases, only the magnetic field in the Y-axis direction is used, and a range of use is restricted depending on the requirement or specification of the antenna.

For these reasons, the coil is preferably wound around the magnetic body 2110 in the short direction of the magnetic body 2110. Moreover, the magnetic body 2110 preferably has a rectangular shape from a planar view. Moreover, the coil 2120 is wound preferably at a central region of the magnetic body 2110, not at the end portion of the magnetic body.

The metal plate 2130 is a plate-like member, which is larger than the magnetic body 2110 from a planar view, and a copper plate may be used, for example. The metal plate 2130 is used for installing the metal body 2110 around which the coil 2120 is wound. The magnetic body 2110 around which the coil 2120 is wound is, for example, fixed to a surface of the metal plate 2130 by an adhesive agent.

In the embodiment, the copper plate is used for the metal plate 2130, but the metal plate is not limited to the plate-like member of copper. Other metals may be used for the metal plate 2130.

Moreover, in the embodiment, the magnetic body 2110 around which the coil 2120 is wound is fixed to the surface of the metal plate 2130 by the adhesive agent, but the present invention is not limited to the embodiment. As long as the positional relationship between the magnetic body 2110 around which the coil 2120 is wound and the metal plate 2130 is fixed, the magnetic body 2110 around which the coil 2120 is wound may be fixed to the metal plate 2130 by a method other than the fixation by the adhesive agent or the like.

Next, a principle of an antenna device 2100 of the antenna unit 2010, including the metal body 2110 and the coil 2120, will be explained in the following.

Figure 40:
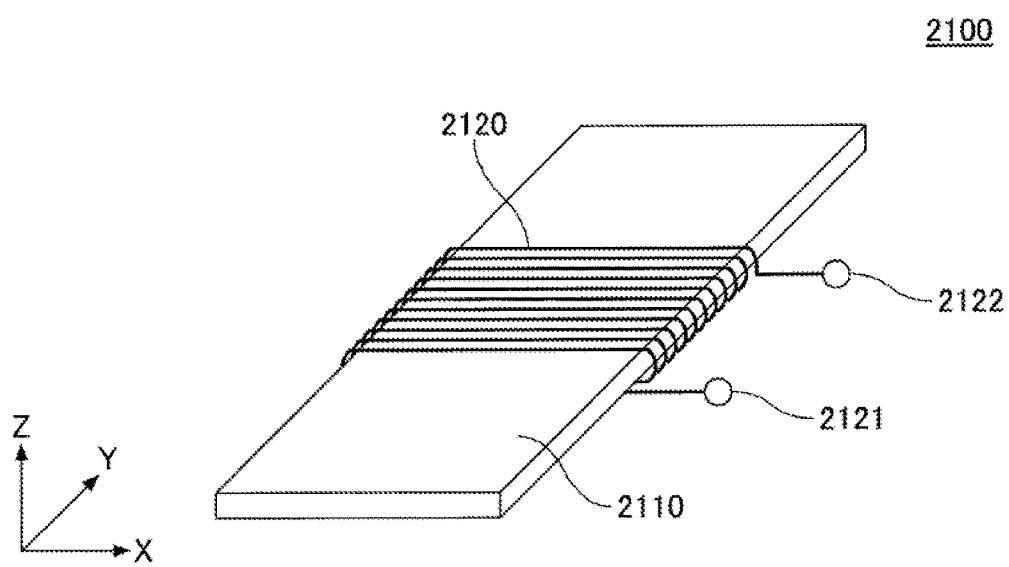
FIG. 40 is a perspective view illustrating an example of an antenna device 2100 according to the fifth embodiment.
Figure 41:
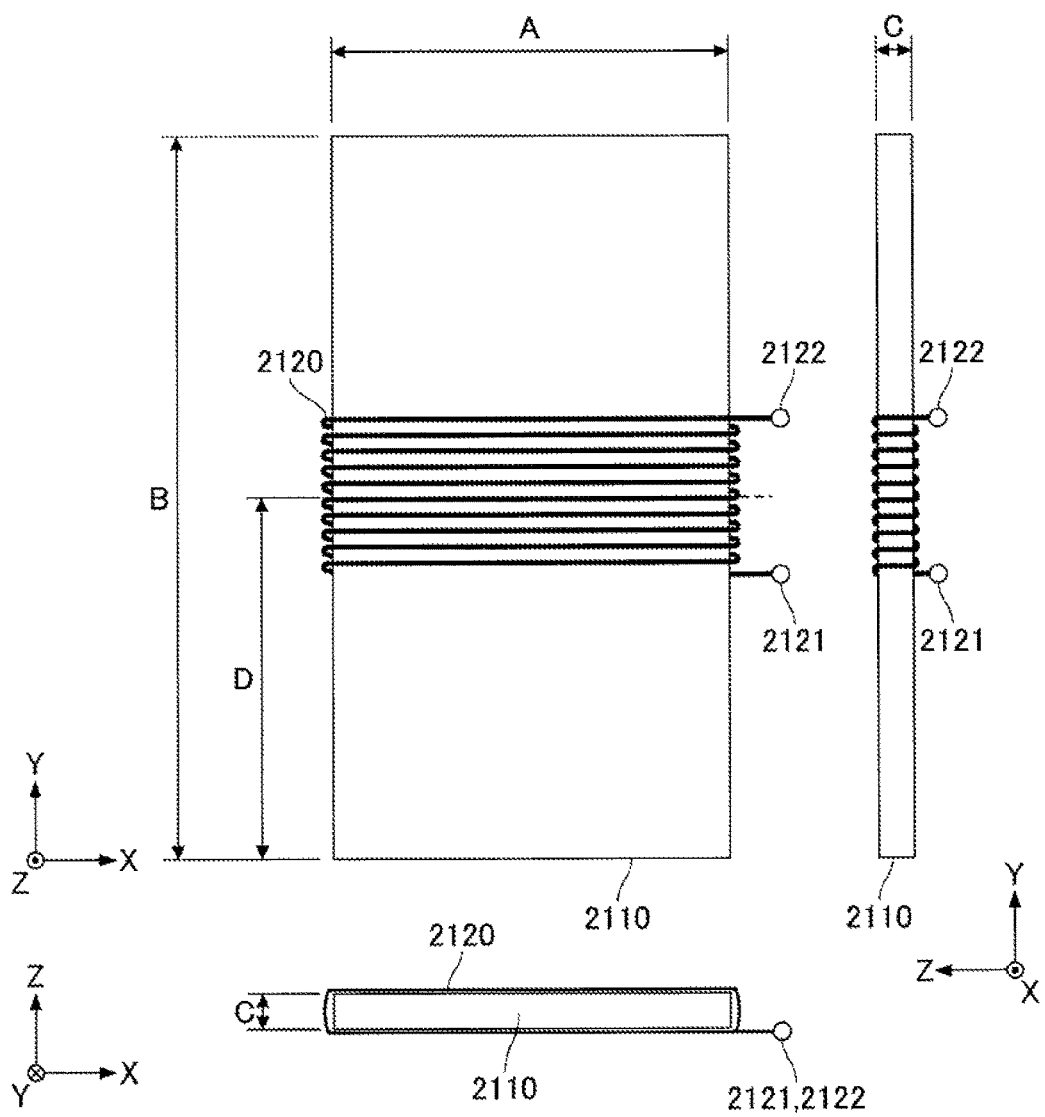
FIG. 41 is a top-front-side view illustrating an example of the antenna device 2100 according to the fifth embodiment.

FIG. 40 is a perspective view illustrating an antenna device 2100 according to a fifth embodiment. FIG. 41 is a top-front-side view illustrating the antenna device 2100 according to the fifth embodiment. In FIGS. 40 and 41, an XYZ coordinate system, which is an orthogonal coordinate system, is employed.

The antenna device 2100 is a magnetic coupling type antenna device, and includes a magnetic body 2110, and a coil 2120.

The magnetic coupling type antenna device 2100 is different from a resonant type antenna device, which sends/receives the electromagnetic wave by resonating with an electromagnetic wave of a specific frequency. Whereas, the magnetic coupling type antenna device 2100 is an antenna device which magnetically couples to the magnetic flux generated from the antenna device, which is the other communication party, to perform a communication.

Accordingly, a communication distance of the resonance type antenna device is from a few meters to more than several kilometers. On the other hand, a communication distance of the magnetic coupling type device 2100 is, for example, about one meter or less.

That is, the magnetic coupling type antenna device 2100 is an antenna device for a short distance communication or a proximity communication. The antenna device 2100, for example, sends/receives a signal with a frequency of 13.56 MHz.

Next, the antenna device 2100 according to the present embodiment will be compared with an antenna device for comparison 2150 having a planar antenna. The antenna device for comparison 2150 will be explained with reference to FIGS. 42 and 43.

Figure 42:
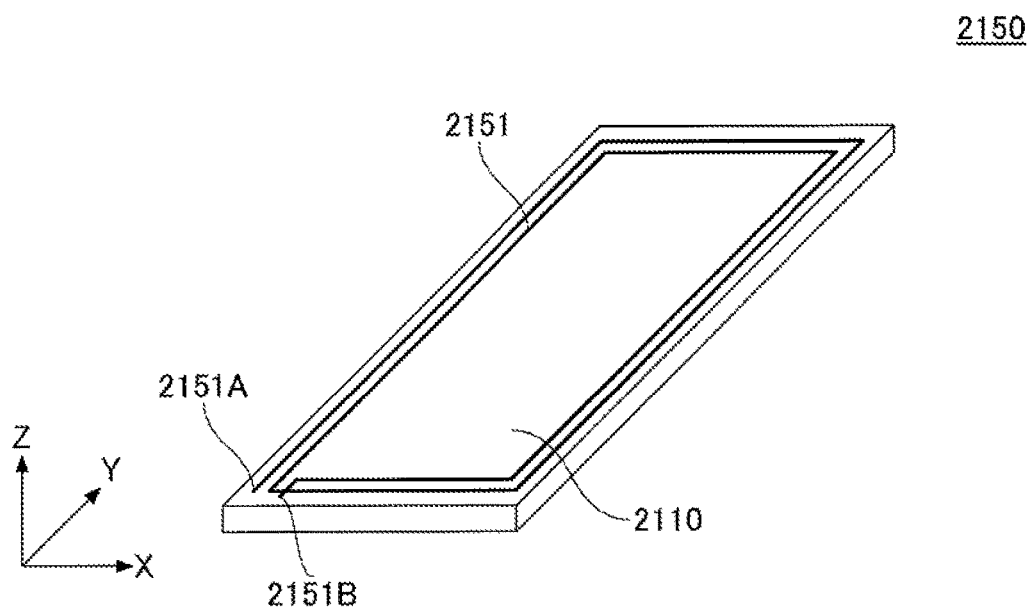
FIG. 42 is a perspective view illustrating the antenna unit for comparison 2150.
Figure 43:
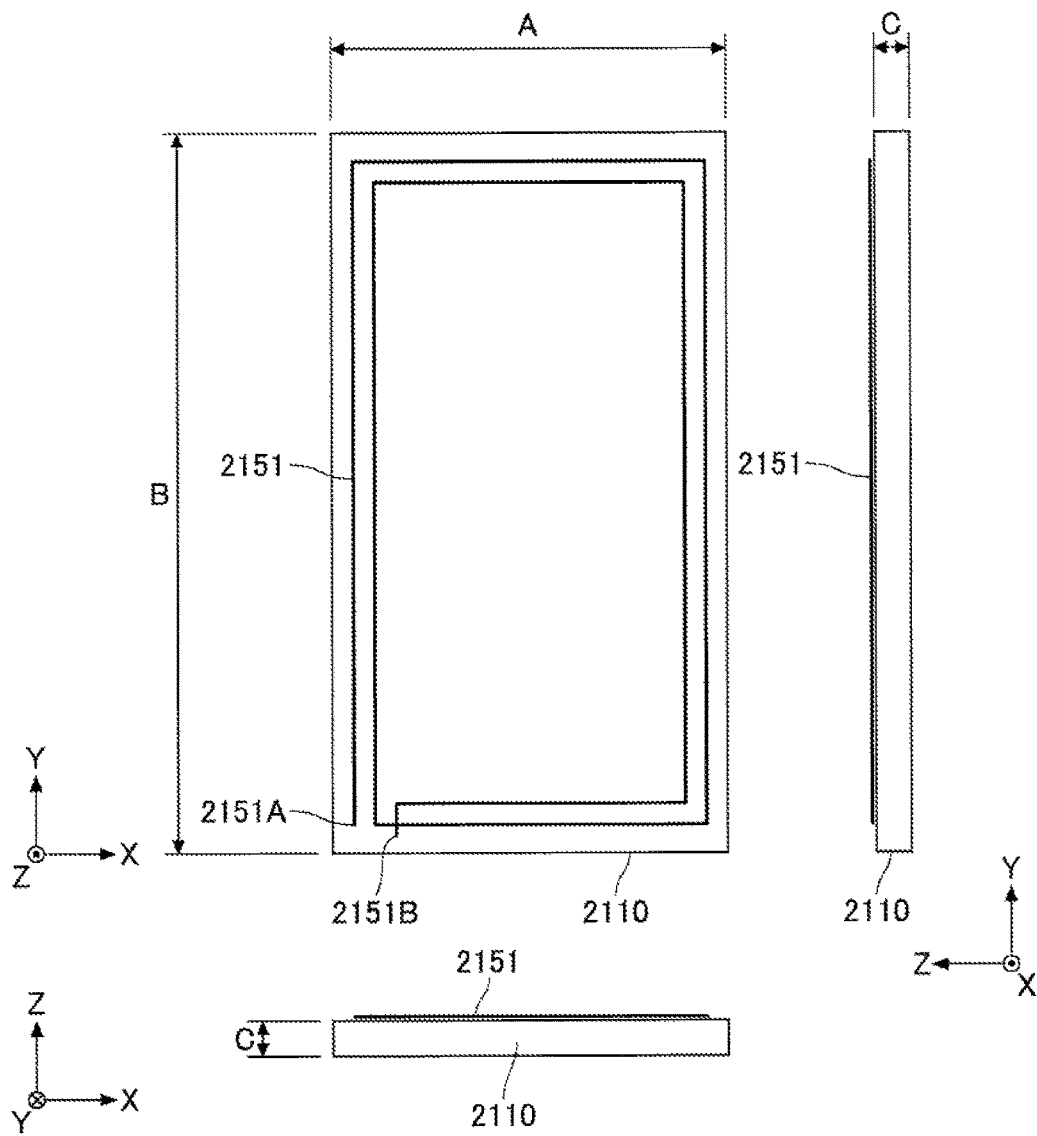
FIG. 43 is a top-front-side view illustrating the antenna unit for comparison 2150.

FIG. 42 is a perspective view illustrating the antenna device for comparison 2150. FIG. 43 is a top-front-side view illustrating the antenna device for comparison 2150. In FIGS. 42 and 43, as in the FIGS. 40 and 41, the XYZ coordinate system, which is an orthogonal coordinate system, is employed.

The antenna device for comparison 2150 is a magnetic coupling type antenna device, as well as the antenna device 2100 according to the fifth embodiment, and includes a magnetic body 2110 and a planar antenna 2151. The magnetic body 2110 in the antenna device for comparison 2150 is the same as the magnetic body in the antenna device 2100 according to the present embodiment.

The planar antenna 2151 is a copper line which is wound in a rectangular shape along an outer periphery of a surface on a positive side in the Z-axis direction of the magnetic body 2110. A number of turns of the planar antenna 2151 is, for example, two. Both ends 2151A and 2151B of the planar antenna 2151 are connected to a communication unit in an apparatus, which performs communication using the antenna device 2150.

Next, with reference to FIGS. 44A to 45B, results of electromagnetic field simulations will be explained for the antenna device 2100 according to the fifth embodiment and the antenna device for comparison 2150.

Figure 44A:
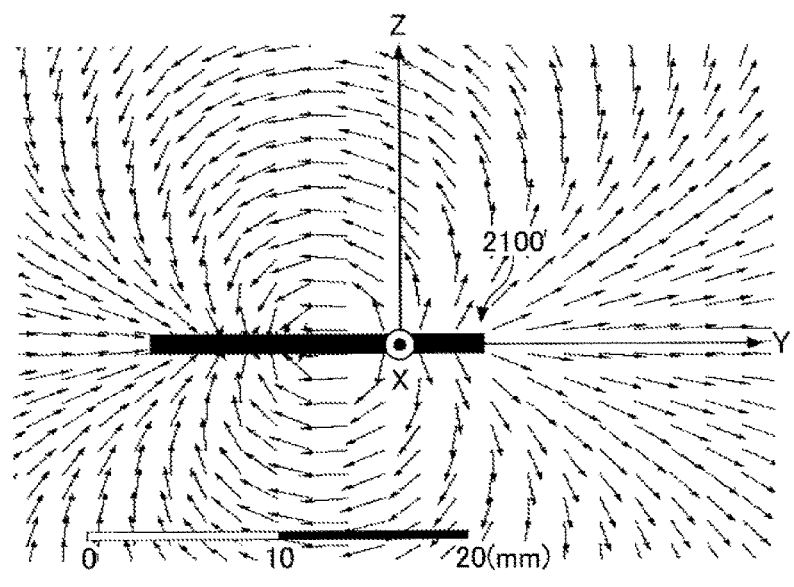
FIG. 44A is a diagram illustrating an example of a result of a simulation for a density of magnetic flux B around the antenna device 2100 according to the fifth embodiment.
Figure 44B:
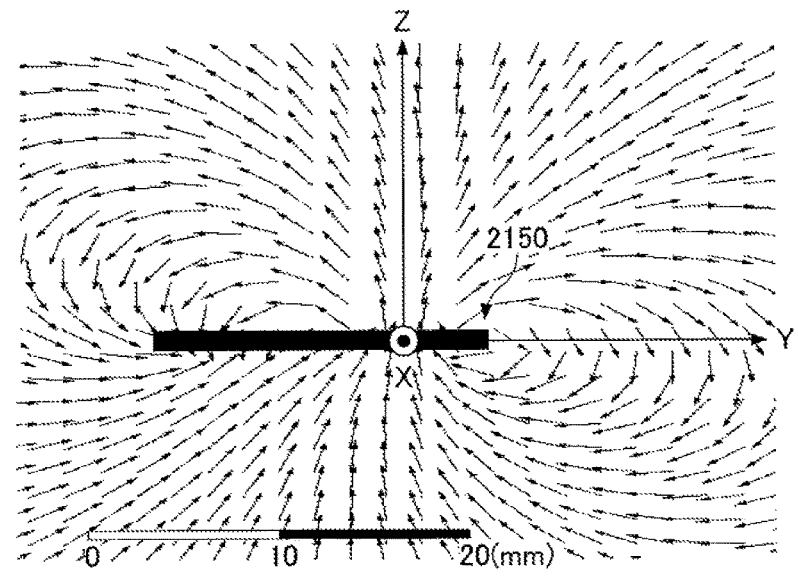
FIG. 44B is a diagram illustrating an example of a result of a simulation for a density of magnetic flux B around the antenna unit for comparison 2150.

FIGS. 44A and 44B are diagrams illustrating results of simulations for density of magnetic flux B around the antenna device 2100 according to the fifth embodiment and the antenna device for comparison 2150, respectively. FIG. 44A shows the density of magnetic flux B of the antenna device 2100, and FIG. 44B shows the density of magnetic flux B of the antenna device 2150.

In FIGS. 44A and 44B, directions of arrows indicate directions of the density of magnetic flux B (directions of vectors).

Moreover, in the electromagnetic field simulations, models for the antenna device 2100 and antenna device 2150, which are shown in lower parts of FIGS. 44A and 44B, respectively. In the antenna device 2100, the origin of the XYZ coordinate system is on the surface on the positive side in the Z-axis direction of the magnetic body 2110 (Z=0), at a center of the magnetic body 2110 in the short direction (X=0), and at the midpoint of the end portion of the magnetic body 2110 on the positive side in the Y-axis direction and an end portion of the coil 2120 on the positive side in the Y-axis direction.

Moreover, in the antenna device 2150, on half of the positive side in the Y-axis direction, of the surface on the positive side in the Z-axis direction, the planar antenna 2151 having a rectangular shape is disposed, and the origin of the XYZ coordinate system is set at the center of the loop of the planar antenna 2151. Positions of the origins are the same in FIGS. 44A and 44B.

Comparing FIGS. 44A and 44B, it is found that the density of magnetic flux B by the antenna device for comparison 2150 is concentrated around the Z-axis in the Z-axis direction, and that the density of magnetic flux B by the antenna device according to the fifth embodiment is widely distributed in the total YZ-plane.

Moreover, strengths of the magnetic field H at a point separated in the Z-axis direction from the origin are found to be almost equivalent between the antenna device 2100 according to the fifth embodiment and the antenna device for comparison 2150.

A density of magnetic flux B around the antenna device for comparison 2150 is distributed so as to arise from the planar coil 2151 in the positive direction of the Z-axis, turn to the positive and negative directions of the Y-axis, and return to the planar coil 2151 from the side of the negative direction of the Z-axis.

A density of magnetic flux B around the antenna device 2100 according to the fifth embodiment is distributed so as to arise from the coil 2120 in the positive direction of the Y-axis, turn to the positive and negative directions of the Z-axis, and return to the coil 2120 from the side of the negative direction of the Y-axis.

Moreover, at a position separated from the origin in the Y-axis direction, it is found that the magnetic flux B loop is larger in the direction of the Z-axis and the intensity of the magnetic field H is larger for the antenna device 2100 according to the fifth embodiment compared with the antenna device for comparison 2150.

FIGS. 45A and 45B show results of simulations for the magnetic field H around the antenna device 2100 according to the fifth embodiment and the antenna device for comparison 2150, respectively. FIG. 45A shows the magnetic field H of the antenna device 2100, and FIG. 45B shows the magnetic field H of the antenna device 2150.

In the simulations for the magnetic field H, as shown in FIGS. 45A and 45B, the same models for the antenna devices 2100 and 2150 as in FIGS. 44A and 44B are employed, and the positions of the origins in the XYZ coordinate system are the same as in FIGS. 44A and 44B, respectively.

In FIGS. 45A and 45B, the magnetic field in a dark region is higher than that in a lighter region.

As shown in FIGS. 45A and 45B, compared with the magnetic field H formed by the antenna device for comparison 2150 (FIG. 45B), the magnetic field H formed by the antenna device 2100 according to the fifth embodiment (FIG. 45A) is found to show overall higher values. Moreover, also at positions separated from the origin in the Z-axis direction and in the Y-axis direction, higher values of the magnetic field are obtained for the antenna device 2100 according to the fifth embodiment.

As described above, from the results of the electromagnetic field simulation, shown in FIGS. 44A to 45B, the distribution of the density of magnetic flux B is found to be quite different between the antenna device 2100 according to the fifth embodiment and the antenna device for comparison 2150.

Moreover, the magnetic field H of the antenna device 2100 according to the fifth embodiment is higher in a wider area than that of the antenna device for comparison 2150, and also at positions separated from the origin in the Z-axis direction and in the Y-axis direction, higher values are obtained.

When an electric current is applied to the planar antenna in the antenna device for comparison 2150, a magnetic field H in the Z-axis direction arises according to Ampere's right-handed screw rule.

Since the directions of the magnetic field H and of the magnetic flux B are the same, the magnetic flux B from the planar coil 2151 of the antenna device for comparison 2150 is radiated from the magnetic body 2110 in the Z-axis direction, and as shown in FIG. 44B, forms a distribution having a shape of a figure eight rotated by 90 degrees with a center at the origin.

On the other hand, in the antenna device 2100 according to the fifth embodiment, the magnetic field H formed by the coil 2120, which is wound around the magnetic body 2110 in a form of a loop, has a direction of the Y-axis according to the Ampere's right-handed screw rule.

For this reason, in the case of the antenna device 2100 according to the fifth embodiment, the magnetic flux by the coil 2120 propagates in the Y-axis direction inside the magnetic body 2110.

In this way, the magnetic flux by the coil 2120 has the direction of the Y-axis, but on the whole, as shown in FIG. 44A, the magnetic flux by the antenna device 2100 according to the fifth embodiment is found to be distributed in the Z-axis direction. Moreover, the magnetic field H generated by the coil 2120 is found to spread also in the Z-axis direction, as shown in FIG. 45A.

Since a magnetic resistance inside the magnetic body 2110 is higher than that outside the magnetic body (in the air), a magnetic flux having the Y-axis direction generated by the antenna device 2100 propagates in a space where the magnetic resistance is lower, i.e. outside the magnetic body 2110.

For this reason, in the antenna device 2100 according to the fifth embodiment, the magnetic flux having the Y-axis direction generated inside the magnetic body 2110 by the coil 2120 spreads outside the magnetic body 2110, and is considered to spread also to the Z-axis direction (see FIG. 44A).

Moreover, the magnetic body 2110 has a length in the Z-axis direction which is quite small compared with the lengths in the Z-axis direction and the Y-axis direction. That is, the magnetic body 2110 is like a thin plate-like member. This means that a cross section of the magnetic body 2110 parallel to the XZ-plane is small and thin in the Z-axis direction.

In general, the magnetic resistance of the magnetic body becomes higher, as the cross section becomes smaller. For this reason, the magnetic resistance of the magnetic body 2110 according to the fifth embodiment is quite high.

Accordingly, when an electric current is applied to the coil 2120 of the antenna device 2100 according to the fifth embodiment, the magnetic flux B generated inside the magnetic body 2110 in the Y-axis direction enters a state easily radiated in the Z-axis direction.

For this reason, in the antenna device 2100, making the thickness of the magnetic body 2110 thin is effective for obtaining a long communication distance in the Z-axis direction (direction of the thickness of the magnetic body 2110).

Next, with reference to FIGS. 46A to 47B, the principle of the antenna unit 2010 according to the fifth embodiment will be explained through explanations of a result of simulations for a coupling coefficient of the antenna unit 2010 according to the fifth embodiment. Meanwhile, the principle will be explained comparing with the antenna unit for comparison 2050.

Figure 46A:
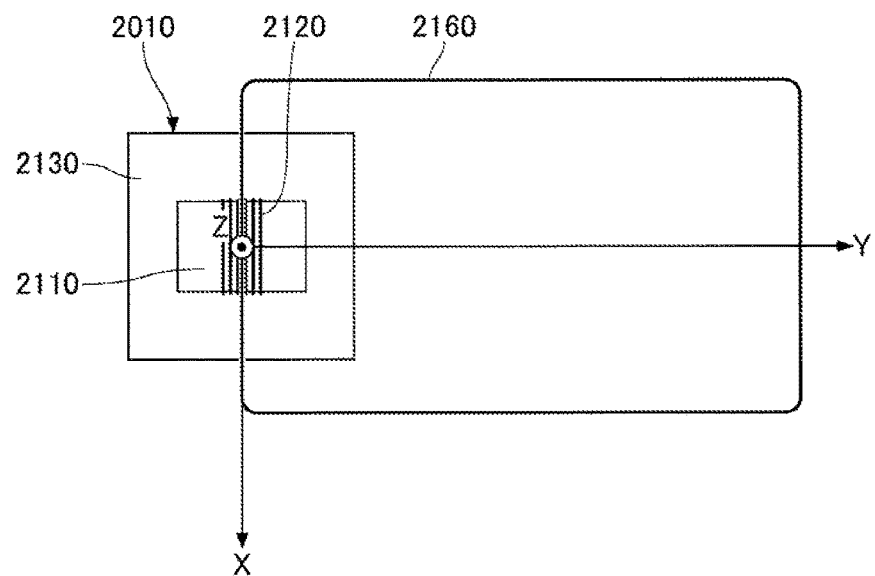
FIG. 46A is a diagram illustrating an example of a model for the simulation for the antenna unit 2010 according to the fifth embodiment.
Figure 46B:
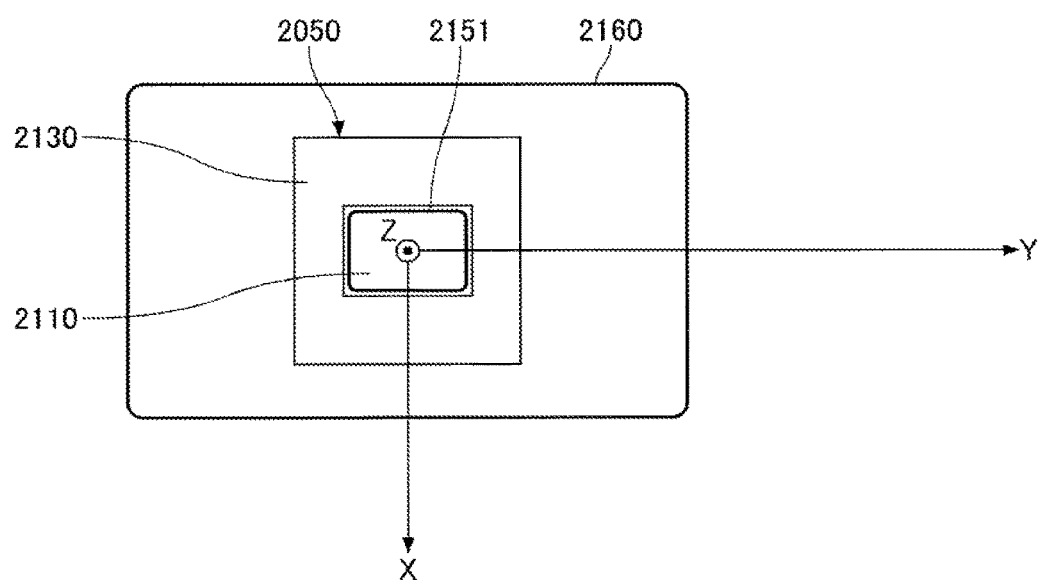
FIG. 46B is a diagram illustrating an example of a model for the simulation for the antenna unit for comparison 2050.

FIGS. 46A and 46B are diagrams illustrating models for the simulations for the antenna unit 2010 according to the fifth embodiment and the antenna unit for comparison 2050. FIG. 46A shows the model for simulations for the antenna unit 2010 according to the fifth embodiment, and FIG. 46B shows the model for simulations for the antenna unit for comparison 2050.

The antenna unit for comparison 2050 includes the metal plate 2130 added to the antenna device 2150 as shown in FIGS. 42 and 43.

In FIG. 46A, the XYZ coordinate system is employed as in FIGS. 38 and 39. The origin of the XYZ coordinate system in FIG. 46A is positioned at the center of the magnetic body 2110, the coil 2120, and the metal plate 2130 of the antenna unit 2010 in planar view on the XY-plane on the surface of the magnetic body 2110 on the side of the positive direction in the Z-axis.

Moreover, as shown in FIG. 46A, a loop antenna 2160 is arranged so that a part of the loop antenna 2160 extends in the direction of the X-axis at the position where Z is 50 mm above the antenna unit 2010.

In FIG. 46B, the origin of the XYZ coordinate system is positioned in the same way as in FIG. 46A. That is, the origin of the XYZ coordinate system in FIG. 46B is positioned at the center of the magnetic body 2110, the coil 2120, and the metal plate 2130 of the antenna unit 2050 in planar view on the XY-plane on the surface of the magnetic body on the side of the positive direction in the Z-axis.

Moreover, in FIG. 46B, the loop antenna 2160 is arranged so that the center of the loop is positioned on the Z-axis at the position where Z is 50 mm above the antenna unit 2050.

The arrangements of the loop coil 2160 of the antenna unit 2010 according to the fifth embodiment and of the antenna unit for comparison 2050 are different from each other, as stated above, since optimum positions are selected at other ends of communications, respectively.

Figure 47A:
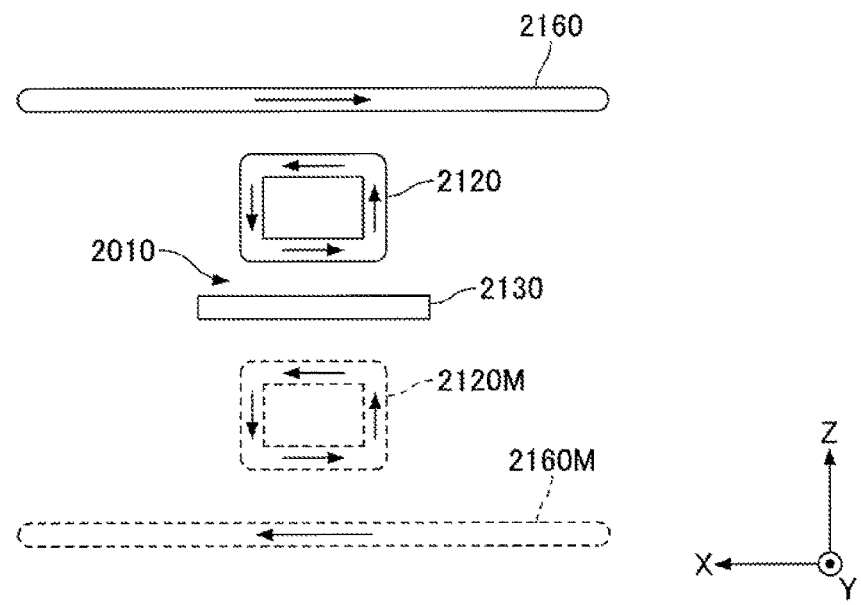
FIG. 47A is a diagram illustrating a side surface of the model shown in FIG. 46A parallel to the XZ-plane viewed from a side in the positive direction of the Y-axis.
Figure 47B:
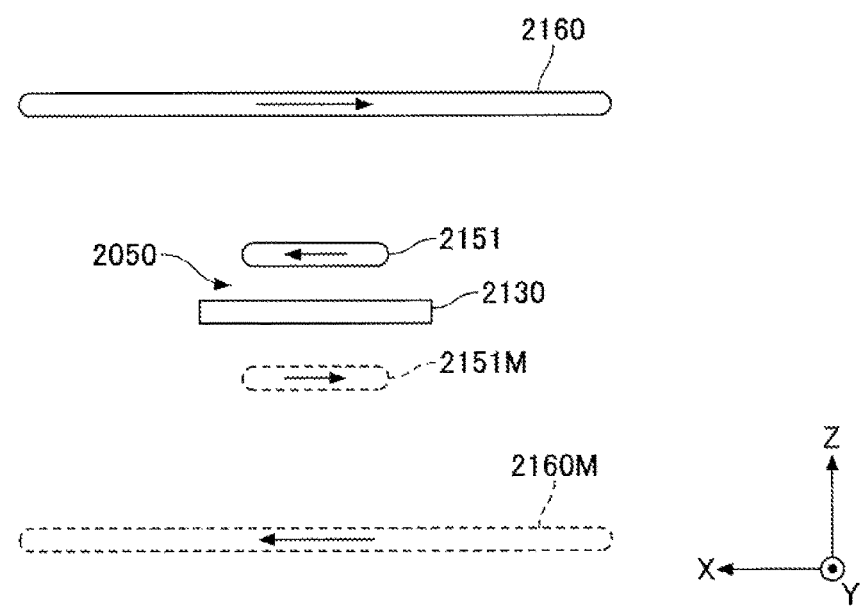
FIG. 47B is a diagram illustrating a side surface of the model shown in FIG. 46B parallel to the XZ-plane viewed from the side in the positive direction of the Y-axis.

FIGS. 47A and 47B are diagrams illustrating side surfaces of the model shown in FIGS. 46A and 46B parallel to the XZ-plane viewed from a side in the positive direction of the Y-axis. FIG. 47A shows the model for the antenna unit 2010 according to the fifth embodiment shown in FIG. 46A, and FIG. 47B shows the model for the antenna unit for comparison 2050 for simulation.

Meanwhile, in FIGS. 47A and 47B, the positional relationship in the direction of the Z-axis is not a precise positional relationship, in order to illustrate schematically giving priority to viewablity.

The coil 2120 is actually wound in spirals (See FIGS. 38 and 39), but in FIG. 47A, the coil 2120 is shown as a loop in order to show a loop of the electric current applied to the coil 2120 in FIG. 47A.

Moreover, since the planar antenna 2151 includes a loop in the XY-plane, the planar antenna 2151 becomes an antenna having a linear shape in the direction of X-axis in the side surfaces parallel to the XZ-plane, as shown in FIG. 47B.

Moreover, in FIG. 47A, in order to explain the influence from an eddy current (mirror current), a coil 2120M and a loop coil 2160M to which the mirror current of the electric current applied to the coil 2120 and the loop antenna 2160 positioned above the metal plate 2130 is applied are shown below the metal plate 2130 in dashed lines.

In the same way, in FIG. 47B, a planar coil 2151M and a loop coil 2160M to which a mirror current is applied are shown.

In FIG. 47A, when the electric current is applied to the coil 2120 in the counter clockwise direction, in the part of the coil 2120 nearest to the metal plate 2130 the electric current flows in the negative direction of the X-axis. Moreover, since a mirror current generated in the coil 2120M flows in the opposite direction to the above electric current, in the part of the coil 2120M nearest to the metal plate 2130 the mirror current flows in the positive direction of the X-axis.

Accordingly, when the electric current is applied to the coil 2120 in the counter clockwise direction, the mirror current which also flows in the counter clockwise direction is generated in the coil 2120M.

In FIG. 47A, the electric current which flows in the coil 2120 in the positive direction of the Z-axis and the mirror current which flows in the coil 2120M in the positive direction of the Z-axis flow at the position where the X-coordinate and Z-coordinate are the same, and the magnetic fields H and the magnetic fluxes B generated by these current reinforce each other.

As stated above, in the antenna unit 2010 according to the fifth embodiment, the magnetic fields H and the densities of magnetic flux B generated by the electric current which flows in the coil 2120 and the mirror current which flows in the coil 2120M reinforce each other.

In other words, since the coil 2120 is wound in spirals in a direction parallel to the metal plate 2130, the magnetic field H generated by the coil 2120 by applying an electric current to the coil 2120 in the counter clockwise direction is parallel to the metal plate 2130 and has a direction in the positive direction of the Y-axis.

Moreover, since the mirror current generated in the coil 2120M flows in the counter clockwise direction, the magnetic field generated by the coil 2120M is parallel to the metal plate 2130 and has a direction in the positive direction of the Y-axis, which is the same direction as the magnetic field H generated by the coil 2120.

For this reason, in the antenna unit 2010 according to the fifth embodiment, the magnetic fields H and the densities of magnetic flux B generated by the electric current which flows in the coil 2120 and the mirror current which flows in the coil 2120M reinforce each other.

As a result, the magnetic field H and the density of magnetic flux B in the direction of Z-axis are strengthened by using the metal plate 2130 than in the case where only the coil is used without the metal plate 2130.

On the other hand, as shown in FIG. 47B, when the electric current is applied to the planar coil 2151 in the positive direction of the X-axis, in the planar coil 2151M, a mirror current flows in the negative direction of the X-axis.

For this reason, magnetic fields H generated by the electric current which flows in the planar coil 2151 in the positive direction of the X-axis and by the mirror current which flows in the planar coil 2151M in the negative direction of the X-axis cancel each other. The cancellation occurs at any portion on the planar coil 2151 in the XY-plane.

Accordingly, in the antenna unit for comparison 2050, the magnetic fields H generated by the electric current which flows in the planar coil 2151 in the positive direction of the X-axis and by the mirror current which flows in the planar coil 2151M in the negative direction of the X-axis cancel each other, and the magnetic field H in the Z-axis direction decreases.

In other words, a magnetic field generated by the planar coil 2151 has a direction orthogonal to the metal plate 2130. The direction of the magnetic field by the planar coil 2151 is opposite to the direction of the magnetic field generated by the mirror current which flows the planar coil 2151M, and the magnetic fields cancel each other.

A value of the coupling coefficient k calculated by the simulations using such models is found to be 0.0092568 for the antenna unit 2010 according to the fifth embodiment and 0.0034487 for the antenna unit for comparison 2050.

As stated above, in the antenna unit 2010 according to the fifth embodiment which includes the metal plate 2130, by the mirror current which flows in the coil 2120 the magnetic field H and the density of magnetic fluxes are strengthened, and the communication distance becomes longer.

Moreover, the antenna unit 2010 is embedded into a terminal apparatus which performs short distance communication by the magnetic coupling and connected to the communication circuit inside the terminal apparatus. The antenna unit 2010 may be mounted on a PCB (Printed Circuit Board) inside the terminal apparatus. Since a variety of signals flow in wirings on the PCB, a noise may Occur.

Even in such a case, since the antenna unit 2010 includes the metal plate 2130, if the antenna unit 2010 is mounted on the PCB while maintaining the metal plate 2130 disposed below the coil 2120, the noise generated from the PCB is shielded by the metal plate 2130, and the noise is suppressed to enter the electric current in the coil 2120.

As described above, according to the fifth embodiment, the antenna unit 2010, which provides a long communication distance in the thickness direction of the magnetic body 2110 having a thin plate shape wherein the communication distance is not shortened even if the antenna unit 2010 is embedded into a terminal apparatus which performs short distance communication by magnetic coupling, is provided.

That is, according to the fifth embodiment, the antenna unit 2010, wherein the communication distance in the thickness direction of the magnetic body 2110 is long, is provided.

In the antenna device 2100, at the central part in the longitudinal direction of the magnetic body 2110 formed in a cuboid having a thin plate shape, by winding the coil 2120 in the short direction of the magnetic body 2110, and arranging the coil on the metal plate 2130, the communication distance in the thickness direction of the magnetic body becomes longer.

As explained above with reference to FIGS. 44A to 45B, the antenna device 2100 included in the antenna unit 2010 according to the fifth embodiment includes the magnetic body 2110 and the coil 2120, having the above configurations, and most of the magnetic flux generated at the coil 2120 is directed in the positive direction of the Y-axis inside the magnetic body 2110.

Then, the magnetic flux radiated from the coil 2120 in the positive direction of the Y-axis, is directed in the positive direction of the Z-axis, draws a loop, and returns to the coil 2120 from the side of the negative direction of the Y-axis.

Since the antenna device 2100 generates the magnetic flux having the distribution as above, in the antenna unit 2010 obtained by appending the metal plate 2130 to the antenna device 2100, the magnetic flux generated by the mirror current also has a direction directed in the positive direction of the Y-axis from the coil 2120M, is directed in the positive direction of the Z-axis, draws a loop, and returns to the coil 2120 from the side of the negative direction of the Y-axis.

Accordingly, in the antenna unit 2010 according to the fifth embodiment, the magnetic fields H and the densities of magnetic flux B generated by the electric current which flows in the coil 2120 and by the mirror current which flows in the coil 2120M enhance each other, and the communication distance in the Z-axis direction becomes longer.

Moreover, in the antenna unit 2010, the communication distance in the longitudinal direction (Y-axis direction) is longer than those for the antenna unit 2050, since not only the communication distance in the Z-axis direction is longer than that of the antenna unit 2050 but also the density of magnetic flux B and the magnetic field H in the longitudinal direction of the magnetic body 2110 are higher than those in the antenna unit 2050.

Moreover, although the communication distances in the X-axis direction for the antenna units 2010 and 2050 are not compared, since the density of magnetic flux B and the magnetic field H in the Y-axis direction and in the Z-axis direction are high for the antenna unit 2010, the density of magnetic flux B and the magnetic field H in the X-axis direction of the magnetic body 2110 are also considered to be high compared with the antenna unit 2050.

As described above, according to the fifth embodiment, in a short distance communication of the magnetic coupling type, the antenna unit 2010 which provides a longer communication distance than that by the antenna unit for comparison 2050, in which the planar coil 2151 is used, can be provided.

By incorporating the antenna unit 2010 as above into, for example, a terminal apparatus which performs a short distance communication by magnetic coupling, the communication distance to the other end of the communication becomes longer, and a certain communication can be performed.

Moreover, when the antenna unit 2010 is installed on the PCB substrate, the form and empty space can be utilized effectively. For example, in the case of incorporating into an SIM card, by arranging at the corner portion of the PCB substrate, a degree of freedom occurs in a layout of other circuit elements or the like.

Furthermore, the connecting portion has an effect of preventing a decline in the magnetic permeability of the magnetic body. For example, compared with the case where two plate-like magnetic bodies are arranged via an air or a material other than the magnetic body, the communication distance can be made longer. Moreover, by changing the shape of the connecting portion, an adjustment to strengthen a magnetic field in a direction slightly deviated from the x- or y-axis directions is possible.

As described above, usability of the terminal apparatus including the antenna unit 2010 can be improved and reliability can be enhanced.

<Sixth Embodiment>

An antenna device 2200 according to the sixth embodiment is a variation of the antenna device 2100 according to the fifth embodiment. The antenna device 2200 according to the sixth embodiment is included in the antenna unit 2010 (See FIG. 38), as the antenna device 2100 according to the fifth embodiment. That is, the antenna device according to the sixth embodiment is obtained by appending the metal plate 2130 to the antenna device 2200 according to the sixth embodiment.

In the following, a configuration of the antenna device 2200 according to the sixth embodiment will be explained.

Figure 48:
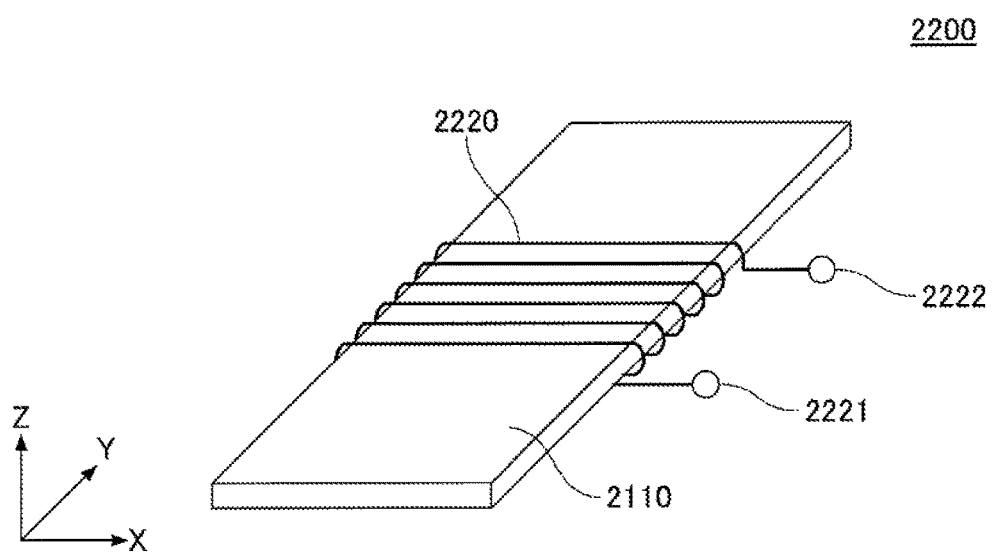
FIG. 48 is a perspective view illustrating an example of an antenna unit 2200 according to a sixth embodiment.
Figure 49:
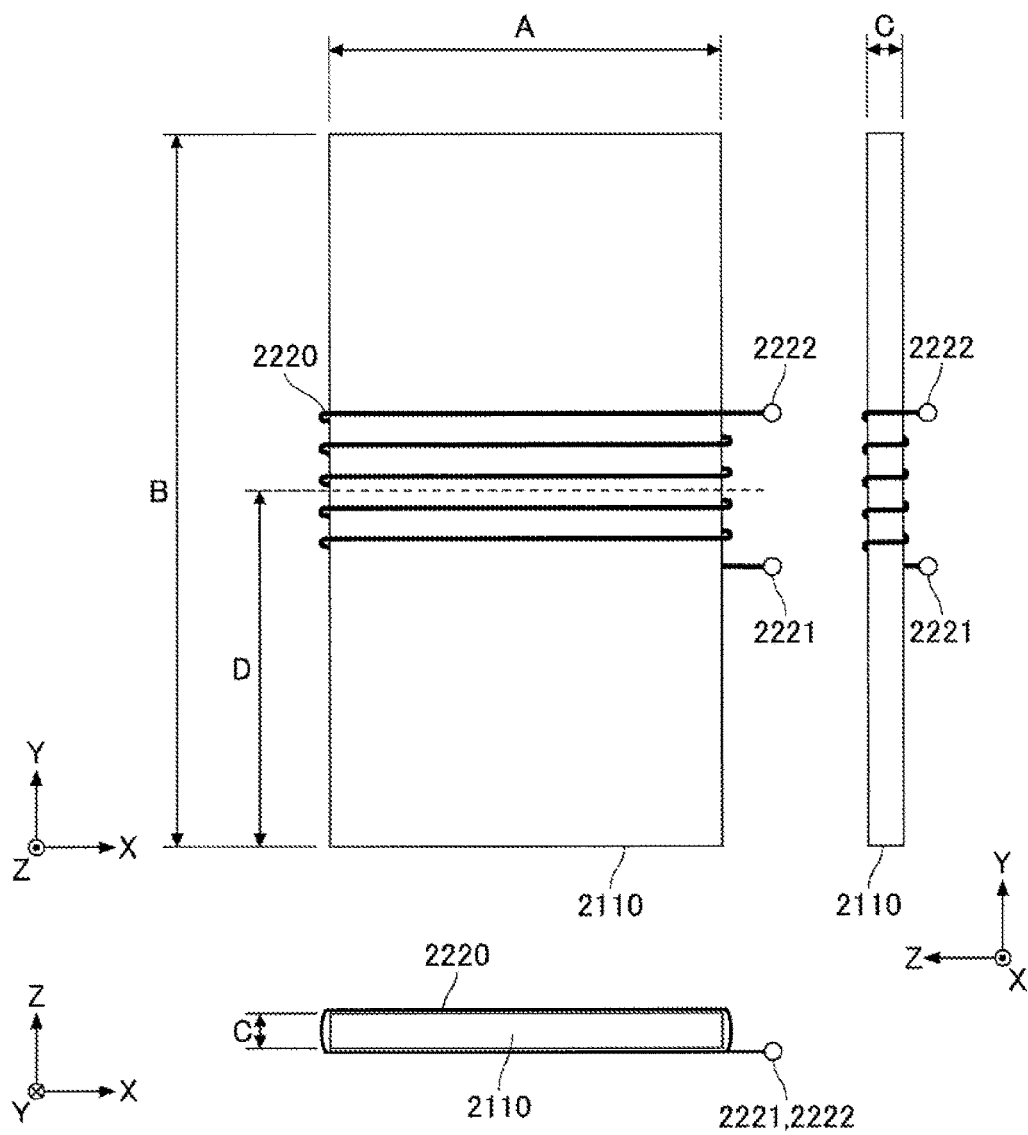
FIG. 49 is a top-front-side view illustrating an example of the antenna unit 2200 according to the sixth embodiment.

FIG. 48 is a perspective view showing an antenna device 2200 according to a sixth embodiment. FIG. 49 is a top-front-side view showing the antenna device 2200 according to the sixth embodiment. In FIGS. 48 and 49, an XYZ coordinate system, which is an orthogonal coordinate system, is employed.

The antenna device 2200 according to the sixth embodiment is different from the antenna device 2100 according to the fifth embodiment in that a number of turns of the coil 2220 is less than that of the coil 2120 in the fifth embodiment. Accordingly, wires in the coil 2220 wound around the magnetic body 2110 are wound so as not to be in contact with each other.

The antenna device 2200 is a magnetic coupling type antenna device, and includes a magnetic body 2110 and a coil 2220. The magnetic body 2110 is the same as the magnetic body 2110 in the antenna device according to the fifth embodiment. The coil 2220 is a coil, a number of turns of which is less than the coil 2120 according to the fifth embodiment. According to this feature, wires in the coil 2220 wound around the magnetic body 2110 are wound so as not to be in contact with each other.

The other configurations are the same as the antenna device 2100 according to the fifth embodiment, and duplicate explanations will be omitted.

The coil 2220 is wound in the short direction (X-axis direction) of the magnetic body 2110 in the central part in the longitudinal direction (Y-axis direction) of the magnetic body 2110. Accordingly, a distance D between the center of the region where the coil 2220 is wound around the magnetic body 2110 in the Y-axis direction and the end portion of the magnetic body 2110 on the side of the negative direction of the Y-axis is 7 mm where the length B is 14 mm. When the length B is 24 mm, the length D is 12 mm.

Both ends 2221 and 2222 of the coil 2220 are connected to a communication unit of an apparatus which performs a communication using the antenna device 2200.

As a coil 2220, for example, a copper line may be used. A diameter of the coil 2220 (wire diameter) may, for example, be 50 μm. A number of turns of the coil 2220 may be, for example, about eight. Wires in the coil 2220 wound around the magnetic body 2110 are wound so as not to be in contact with each other. The winding of the coil 2220, as above, will be denoted as "coarse coiling" in the following.

Next, with reference to FIGS. 50A to 51B, results of electromagnetic field simulations will be explained for the antenna device 2200 (coarse coiling) according to the sixth embodiment and for the antenna device 2100 (close coiling) according to the fifth embodiment.

Figure 50A:
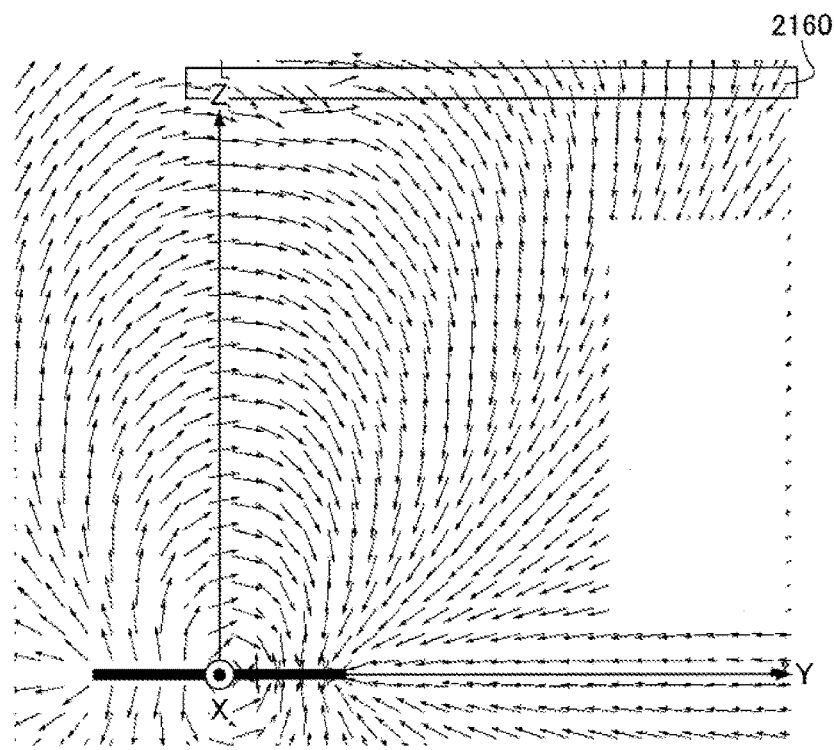
FIG. 50A is a diagram illustrating an example of a result of a simulation for a density of magnetic flux around the antenna device 2100 according to the fifth embodiment.
Figure 50B:
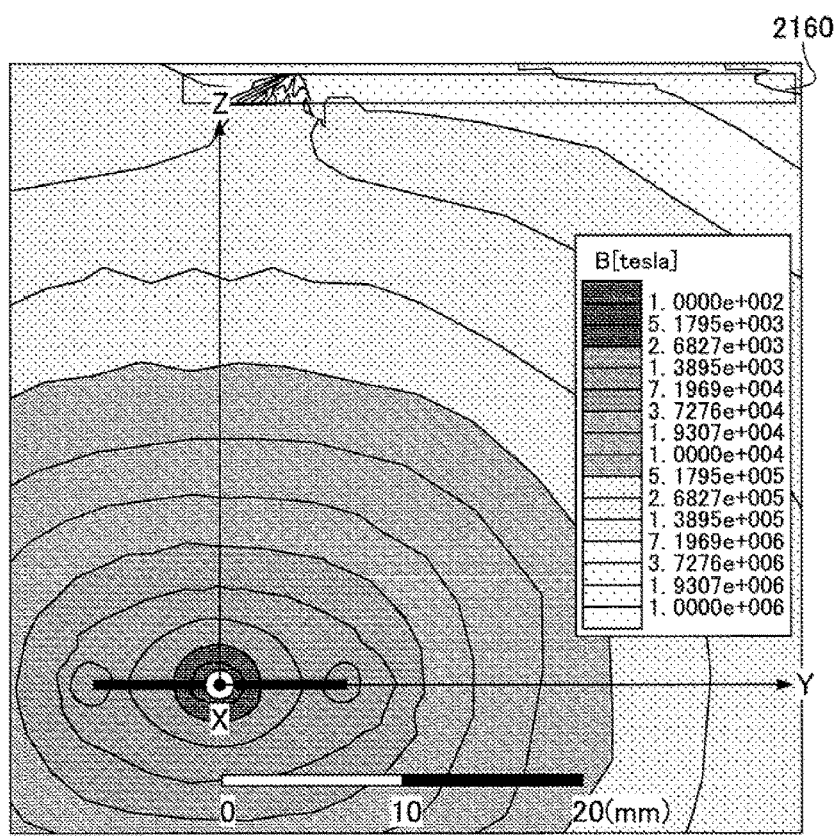
FIG. 50B is a diagram illustrating an example of a result of a simulation for a magnetic field H around the antenna device 2100 according to the fifth embodiment.

FIGS. 50A and 50B are diagrams illustrating results of simulations for density of magnetic flux B and the magnetic field H around the antenna device 2100 according to the fifth embodiment, respectively. FIG. 50A shows the density of magnetic flux B of the antenna device 2100, and FIG. 50B shows the magnetic field H of the antenna device 2100.

Figure 51A:
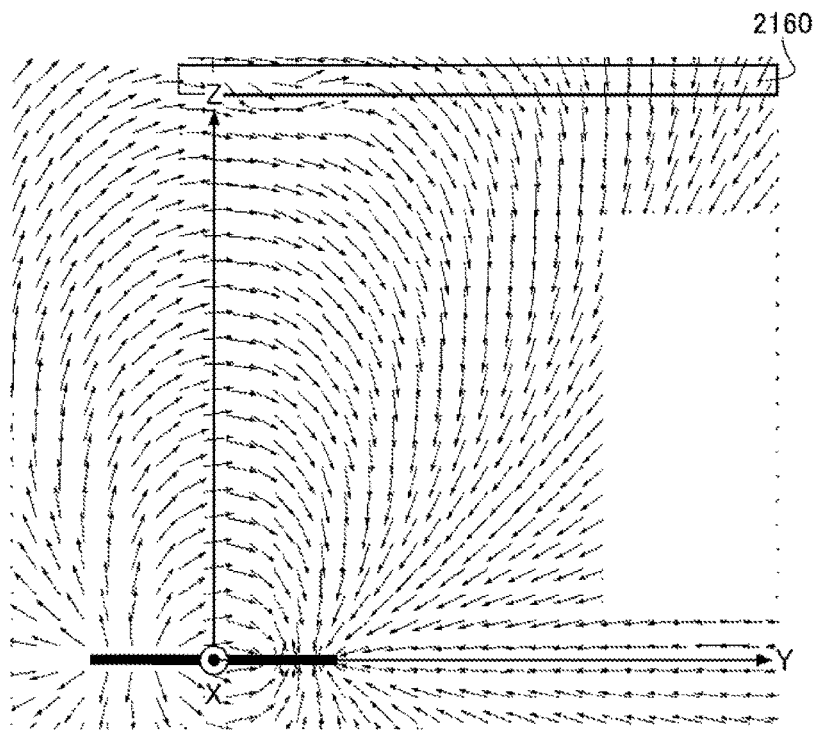
FIG. 51A is a diagram illustrating an example of a result of a simulation for a density of magnetic flux around the antenna unit 2200 according to the sixth embodiment.
Figure 51B:
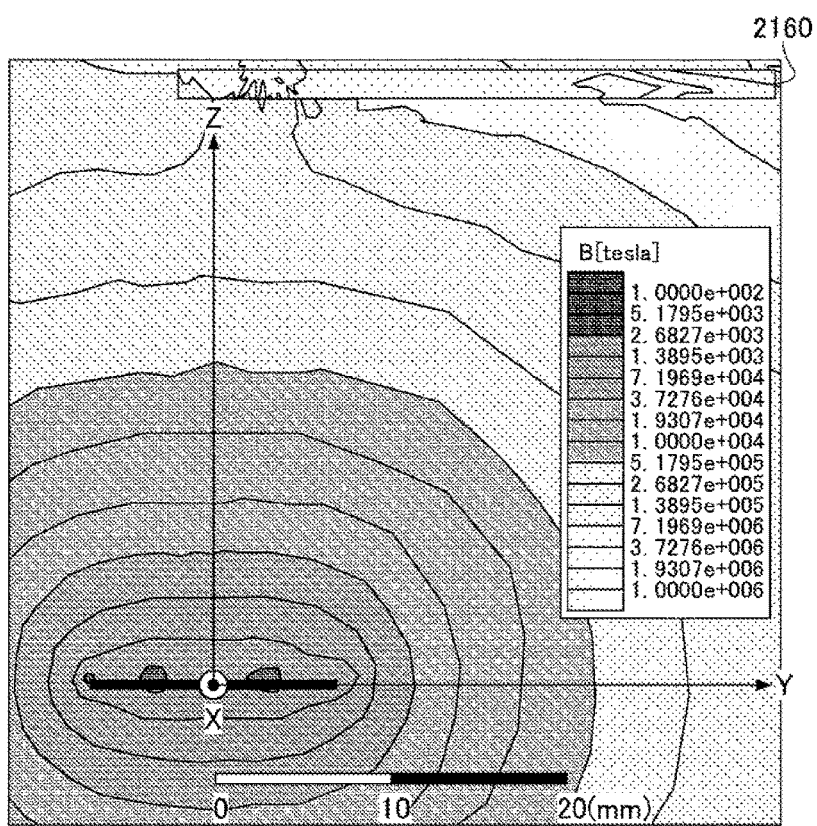
FIG. 51B is a diagram illustrating an example of a result of a simulation for a magnetic field H around the antenna unit 2200 according to the sixth embodiment.

FIGS. 51A and 51B are diagrams illustrating results of simulations for density of magnetic flux B and the magnetic field H around the antenna device 2200 according to the sixth embodiment, respectively. FIG. 51A shows the density of magnetic flux B of the antenna device 2200, and FIG. 51B shows the magnetic field of the antenna device 2200.

In FIGS. 50A and 51A, directions of arrows indicate directions of the density of magnetic flux B (directions of vectors). Moreover, in FIGS. 50B and 51B, the magnetic field in a dark region is higher than that in a bright region.

Moreover, the origin of the XYZ coordinate system in the antenna devices 2100 and 2200 is on the surface on the positive side in the Z-axis direction of the magnetic body 2110 (Z=0), at a center of the magnetic body 2110 in the short direction (X=0), and at a center of the magnetic body 2110 in the positive direction of the Y-axis.

Moreover, values of the density of magnetic flux B and the magnetic field H are obtained under a condition that a loop antenna 2160 is arranged above the antenna device 2100 or 2200 at a position where Z is 50 mm.

Comparing FIG. 50A with FIG. 51A, it is found that since curvatures of the density of magnetic flux B in the vicinity of the origin for the antenna device 2200 according to the sixth embodiment are smaller than those for the antenna device 2100 according to the fifth embodiment, the changes in directions of the density of magnetic flux B around the antenna device 2200 according to the sixth embodiment are more gradual than those around the antenna device 2100 according to the fifth embodiment.

The density of magnetic flux B at a position separated from the origin in the Y-axis direction for the antenna device 2100 according to the fifth embodiment is almost the same as the density of magnetic flux B at the same position for the antenna device 2200 according to the sixth embodiment.

Moreover, for the magnetic field H, as can be seen by comparing FIG. 50B with FIG. 51B, curvatures of the isomagnetics of the magnetic field H in the vicinity of the origin for the antenna device 2200 according to the sixth embodiment are smaller than those for the antenna device 2100 according to the fifth embodiment, and the distribution of the magnetic field H around the antenna device 2200 according to the sixth embodiment is more gradual than that around the antenna device 2100 according to the fifth embodiment. Accordingly, the distribution of the magnetic flux can be made wider.

The magnetic field at a position separated from the origin in the Y-axis direction for the antenna device 2100 according to the fifth embodiment is almost the same as the magnetic field at the same position for the antenna device 2200 according to the sixth embodiment.

As described above, it is found that the distribution of the density of magnetic flux B and the magnetic field H around the antenna device 2200 according to the sixth embodiment (coarse coiling) is more gradual than those around the antenna device 2100 according to the fifth embodiment (close coiling). According to this property, the antenna device 2200 according to the sixth embodiment generates the magnetic field H more effectively, and wider distribution of the density of magnetic flux B can be obtained.

The above results are obtained by comparing the antenna device 2100 (close coiling) prepared under the condition setting of the fifth embodiment and the antenna device 2200 (coarse coiling) prepared under the condition setting of the sixth embodiment.

The number of turns of the coil 2120 or 2220, therefore, may be optimized depending on the intended use of the antenna device 2100 or 2200, or the like.

A communication distance is obtained for antenna devices 2100, 2200 and 2200A, as shown in FIG. 52, in order to investigate an influence of the way of winding in the coil 2100 or 2200 on the communication distance.

FIG. 52 is a perspective view illustrating the antenna device 2100 according to the fifth embodiment, and the antenna devices 2200 and 2200A according to the sixth embodiment.

The antenna device 2100, shown in FIG. 52, is the same as the antenna device 2100 according to the fifth embodiment, shown in FIG. 40. The antenna device 2200, shown in FIG. 52 is the same as the antenna device 2200 according to the sixth embodiment, shown in FIG. 48.

In the antenna device 2200A, as shown in FIG. 52, the coil 2220 is wound, so as to maintain the number of turns for the coil 2220 in the antenna device 2200, shown in FIG. 48, i.e. twenty turns, and to wind wires in a wider area in the Y-axis direction around the magnetic body 2110 in order to make the space between the wires in the coil 2220 wound around the magnetic body 2110 wider. The way of winding for the coil 2220 in the antenna device 2200A will be denoted as "very coarse coiling" in the following.

In the antenna device 2100, a line to space ratio (L/S ratio) for the coil 2120 is 50/19 μm. That is, in the coil 2120, a wire with a diameter of 69 μm, including a conductive wire with a diameter of 50 μm and enamel coating on it, is wound in the close coiling.

Moreover, in the antenna device 2200, the line to space ratio (L/S ratio) for the coil 2220 is 50/300 μm. That is, in the coil 2220, a wire including a conductive wire with a diameter of 50 μm is wound in the coarse coiling with a space of 300 μm between wires.

Moreover, in the antenna device 2200A, the line to space ratio (L/S ratio) for the coil 2220A is 50/600 μm. That is, in the coil 2200A, a wire including a conductive wire with a diameter of 50 μm is wound in the coarse coiling with a space of 600 μm between wires.

The communication distances in the Z-axis direction for the antenna devices 2100, 2200 and 2200A are 27.5 mm, 30.0 mm and 31.0 mm, respectively, according to actual measurements.

From the results of the measurements as above, it is found that the communication distance can be adjusted by making the way of winding for the coil 2120 or 2220 either close or coarse.

In the antenna device according to the sixth embodiment, the antenna device 2200 or 2200A, as described above, is arranged on the metal plate 2130. This configuration is the same as that of the antenna unit 2010 according to the fifth embodiment (See FIGS. 38 and 39).

As described above, according to the sixth embodiment, the antenna device having a long communication distance in the thickness direction of the magnetic body 2110 can be provided as in the fifth embodiment.

Next, connection coefficients in the antenna device 2200 (coarse coiling) and in the antenna device 2200A (very coarse coiling) will be described.

Figure 53:
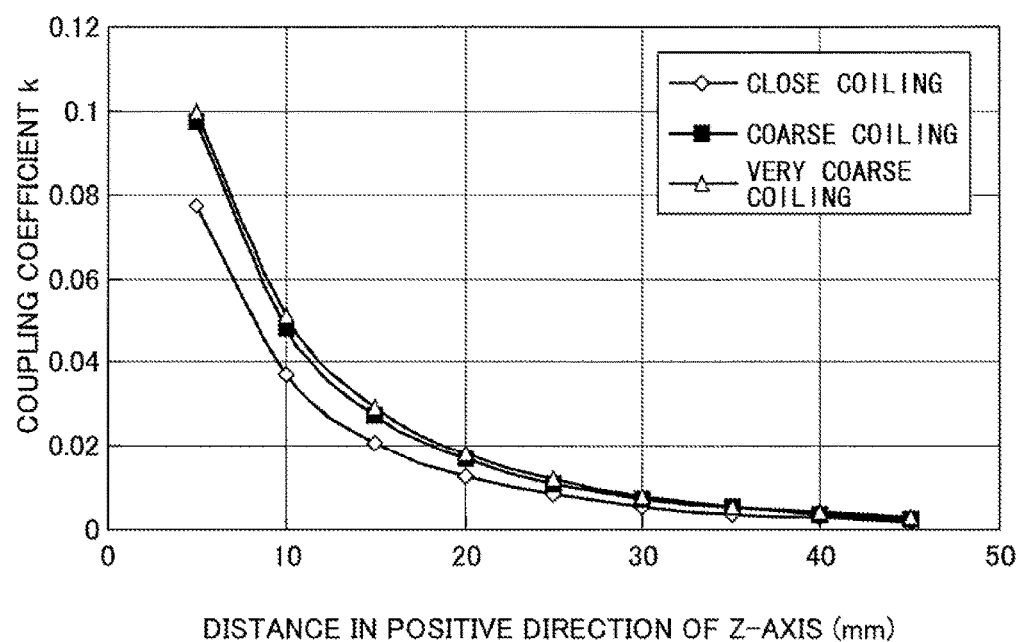
FIG. 53 is a diagram illustrating a coupling coefficient of the antenna device 2100 (close coiling), the antenna unit 2200 (coarse coiling) and the antenna unit 2200A (very coarse coiling)

FIG. 53 is a diagram illustrating coupling coefficients of the antenna device 2100 (close coiling), the antenna device 2200 (coarse coiling) and the antenna device 2200A (very coarse coiling).

As shown in FIG. 53, the coupling coefficient k of the antenna device 2200A (very coarse coiling) is the largest, and the coupling coefficient k of the antenna device 2100 (close coiling) is the smallest.

From the above results, by winding the coil 2220 in the coarse coiling or in the very coarse coiling as in the antenna device 2220 or 2220A, rather than winding the coil 2120 in the close coiling as in the antenna device 2100, a large coupling coefficient and a long communication distance can be obtained.

As described above, the way of winding for the coil 2120 or 2220 may be set depending on the intended use of the antenna device 2100 or 2200, or the like. If the magnetic body 2110 is large enough in the Y-axis direction, the way of winding is preferably the coarse coiling or the very coarse coiling.

Figure 54:
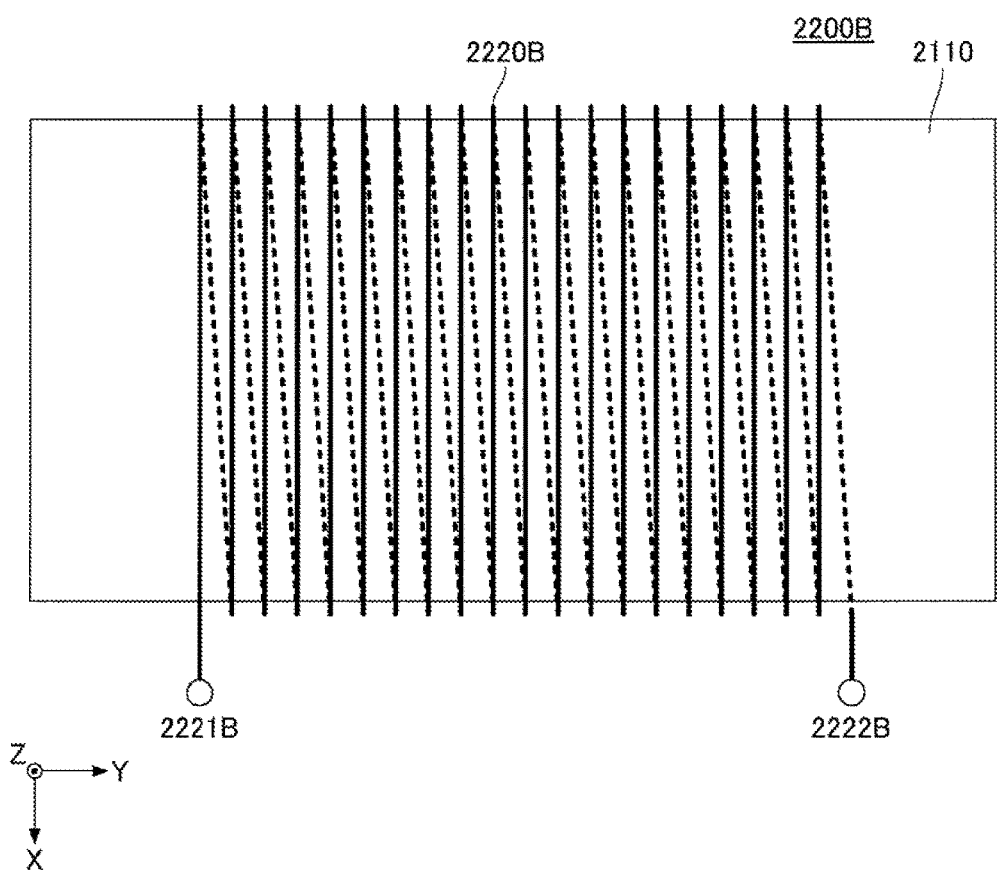
FIG. 54 is a diagram illustrating an example of an antenna unit 2200B according to a variation of the sixth embodiment.
Figure 55:
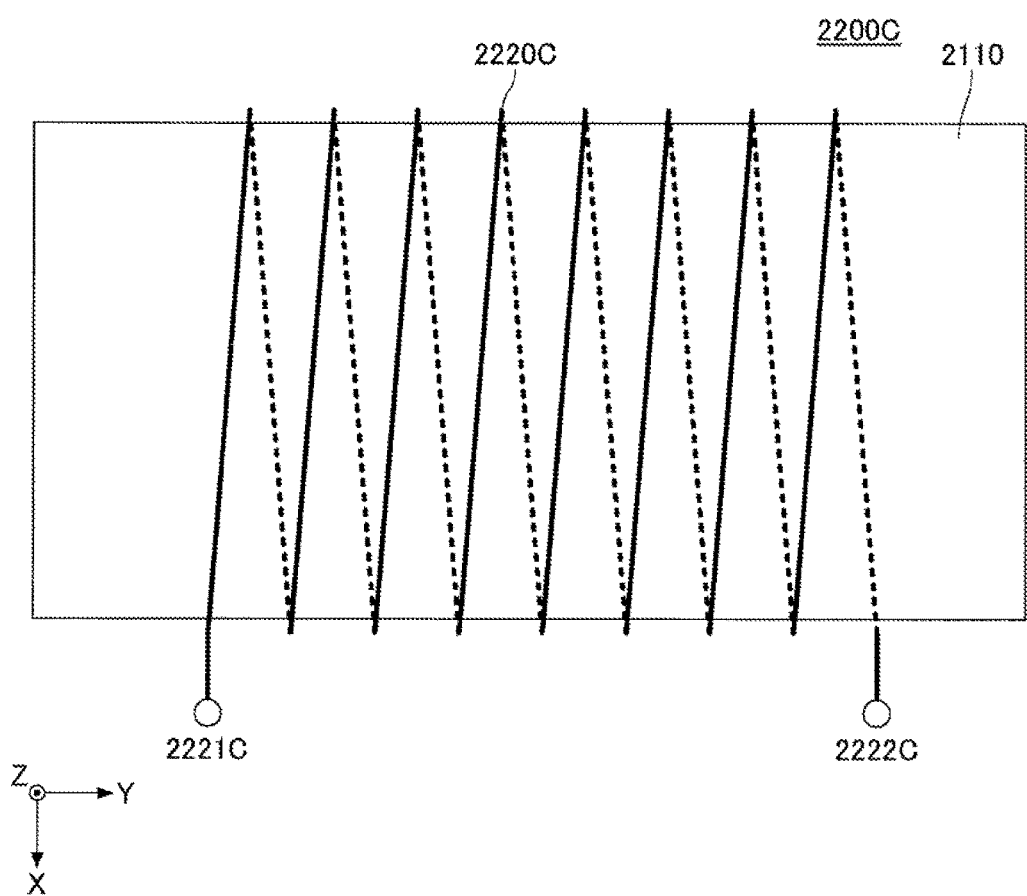
FIG. 55 is a diagram illustrating an example of an antenna unit 2200C according to the variation of the sixth embodiment.
Figure 56:
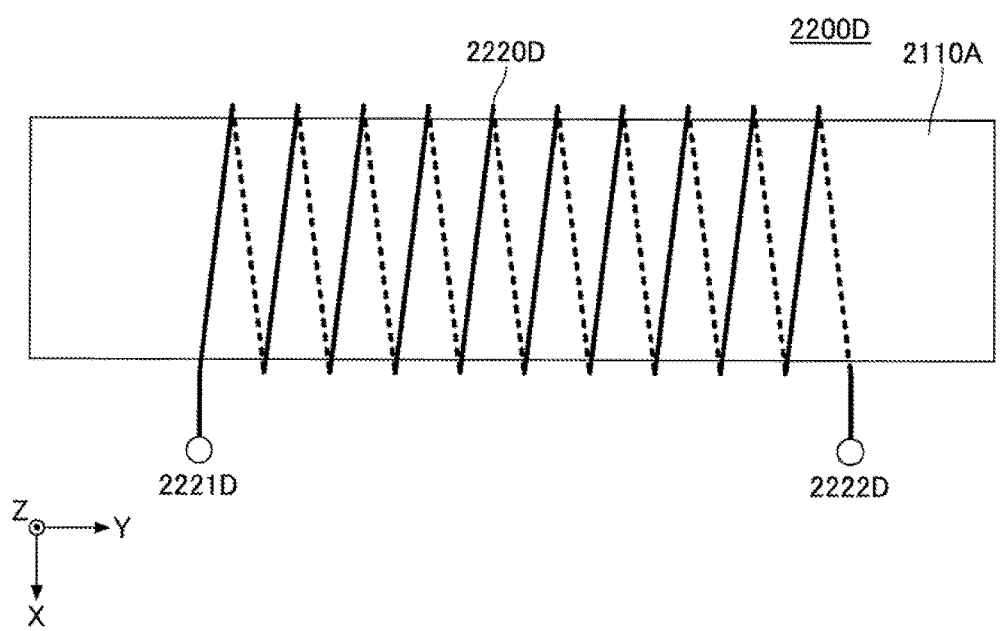
FIG. 56 is a diagram illustrating an example of an antenna unit 2200D according to the variation of the sixth embodiment.

Moreover, in the case of winding the coil 2220 in the coarse coiling, the way of winding may be changed, as shown in FIGS. 54 to 56.

FIGS. 54 to 56 are diagrams illustrating antenna devices 2200B, 2200C and 2200D according to a variation of the sixth embodiment.

In the antenna device 2200B shown in FIG. 54, a coil 2220B is wound in parallel to the X-axis on a surface of the magnetic body 2110 on the side of the positive direction of the Z-axis of the magnetic body 2110. On a surface on the side of the negative direction of the Z-axis of the magnetic body 2110, the coil 2220B is wound at an angle with the X-axis.

For example, in the antenna device 2200B, a distance between the ends 2221B and 222B of the coil 2220B is 50 mm. The coil 2220B is wound wherein the space between the wires is from 0.4 mm to 0.5 mm and the number of turns is twenty (twenty turns).

In the antenna device 2200C shown in FIG. 55, a coil 2220C is wound at an angle with the X-axis on the surface on the side of the positive direction of the Z-axis of the magnetic body 2110 and on the surface on the side of the negative direction of the Z-axis of the magnetic body 2110. The angle between the coil 2220C and the X-axis on the side of the positive direction of the Z-axis is the same as the angle between the coil 2220C and the X-axis on the side of the negative direction of the Z-axis.

Accordingly, the coil 2220C on the surface on the side of the positive direction of the Z-axis and the coil 2220C on the surface on the side of the negative direction of the Z-axis are arranged in parallel, respectively.

For example, in the antenna device 2200C, a distance between the ends 2221C and 2222C of the coil 2220C is 50 mm. The coil 2220C is wound wherein the space between the wires is 1.5 mm and the number of turns is twenty (twenty turns).

In the antenna device 2200D shown in FIG. 56, a coil 2220D is wound around a magnetic body 2110A which is more elongated than the magnetic body 2110 shown in FIG. 55, i.e. the size in the X-axis direction is smaller, by the same way of winding as the coil 2220C in FIG. 55.

The coil 2220D is wound at an angle with the X-axis on the surface on the side of the positive direction of the Z-axis of the magnetic body 2110A and on the surface on the side of the negative direction of the Z-axis of the magnetic body 2110A. The angle between the coil 2220D and the X-axis on the side of the positive direction of the Z-axis of the magnetic body 2110A is the same as the angle between the coil 2220D and the X-axis on the side of the negative direction of the Z-axis of the magnetic body 2110A.

Accordingly, the coil 2220D on the surface on the side of the positive direction of the Z-axis and the coil 2220D on the surface on the side of the negative direction of the Z-axis are arranged in parallel, respectively.

For example, in the antenna device 2200D, a distance between the ends 2221D and 2222D of the coil 2220D is 50 mm. The coil 2220D is wound wherein the space between the wires is 0.7 mm to 1.1 mm and the number of turns is twenty (twenty turns).

The antenna device according to the exemplary embodiments of the present invention is described as above. The present invention is not limited to the specifically disclosed embodiments, but various variations and modifications may be made without departing from the scope of the present invention.

The present application is based on and claims the benefit of priorities of Japanese Priority Applications No. 2013-053237 filed on Mar. 15, 2013, Japanese Priority Application No. 2013-070150 filed on Mar. 28, 2013 and Japanese Priority Application No. 2013-070151 filed on Mar. 28, 2013 with the Japanese Patent Office, the entire contents of which are hereby incorporated by reference.

DESCRIPTION OF THE REFERENCE NUMERALS

| | |
|---|---|
| 100, 200, 200A, 200B, 200C, 200D, 1100, 1200, 1200A, 1200B, 1200C, 1200D, 2100, 2200, 2200A, 2200B, 2200C, 2200D | antenna device |
| 110, 110A, 1011, 1011C, 1110, 1110A, 2110, 2110A | magnetic body |
| 120, 220, 220B, 220C, 220D, 1012A, 1012B, 1120, 1220, 1220B, 1220C, 1220D, 2120, 2120M, 2220, 2220B, 2220C, 2220D | coil |
| 130, 1130 | PCB |
| 131, 1131 | copper foil |
| 150, 1150, 2150 | antenna device for comparison |
| 151, 1151, 2151 | planar antenna |
| 160, 1160, 2160 | loop antenna |
| 1010, 1010A, 2010 | antenna unit |
| 1011A, 1011B, 1011D, 1011E | magnetic body part |
| 1111 | bent part |

| | |
|---|---|
| 2050 | antenna unit for comparison |
| 2130 | metal plate |
| 2151M | planar coil |
| 2160M | loop coil |

The invention claimed is:

1. An apparatus bearing an antenna device of a magnetic coupling type, comprising:
- a flexible magnetic body which has a plate-like shape and has flexibility;
- a printed circuit board (PCB) including a copper foil formed on a side of the PCB facing the flexible magnetic body; and
- a coil, which is wound around the flexible magnetic body, in a short direction of the flexible magnetic body, the flexible magnetic body including the coil wound around the flexible magnetic body being disposed on the printed circuit board, and both ends of the coil extending in the short direction beyond the flexible magnetic body, to connect to a communication circuit disposed on the PCB,
- wherein the coil wound around the flexible magnetic body is wound so that an angle between the coil and the short direction of the flexible magnetic body on a side of the flexible magnetic body including a longitudinal direction and the short direction of the flexible magnetic body is the same as an angle between the coil and the short direction of the flexible magnetic body on another side of the flexible magnetic body including the longitudinal direction and the short direction.

2. The apparatus as claimed in claim 1 wherein the coil is wound around the flexible magnetic body so that the coil forms a loop in a short direction of the flexible magnetic body.

3. The apparatus as claimed in claim 1 wherein the coil is wound in a state where the coil has an interval between the adjacent loops.

4. The apparatus as claimed in claim 1, wherein the antenna device formed by the coil wound around the flexible magnetic body is mounted on the PCB.

5. An apparatus bearing an antenna device of a magnetic coupling type, comprising:
- a flexible magnetic body which has a plate-like shape and has flexibility; and
- a printed circuit board (PCB) including a copper foil disposed on a side of the PCB facing the flexible magnetic body; and
- a coil, which is wound around the flexible magnetic body, in a short direction of the flexible magnetic body, the flexible magnetic body including the coil wound around the flexible magnetic body being disposed on the printed circuit board, and both ends of the coil extending in the short direction beyond the flexible magnetic body, to connect to a communication circuit disposed on the PCB.

6. The apparatus as claimed in claim 5, wherein the antenna device formed by the coil wound around the flexible magnetic body is mounted on the PCB.

7. An apparatus bearing an antenna device of a magnetic coupling type comprising:
- an L-shaped flexible magnetic body including:
  - a first magnetic body part which constitutes a first plate-like leg of the L-shaped flexible magnetic body and which is flexible; and
  - a second magnetic body part which constitutes a second plate-like leg of the L-shaped flexible magnetic body and which is flexible, the second magnetic body part being connected at an angle to the first magnetic body part;
- a first antenna which has a coiled shape and is wound around the first magnetic body part, in a short direction of the first magnetic body part;
- a second antenna which has a coiled shape and is wound around the second magnetic body part, in a short direction of the second magnetic body part, and generates a magnetic field, a polarity of which is opposite to a polarity of a magnetic field generated by the first antenna; and
- a printed circuit board (PCB) including a copper foil formed on a side of the PCB facing the flexible magnetic body,
- wherein the coil shaped first antenna wound around the first magnetic body part is wound so that an angle between the first antenna and the short direction of the first magnetic body part on a side of the first magnetic body part including a longitudinal direction and the short direction of the first magnetic body part is the same as an angle between the first antenna and the short direction of the first magnetic body part on another side of the first magnetic body part including the longitudinal direction and the short direction.

8. The apparatus as claimed in claim 7 wherein the first antenna is wound around the first magnetic body part so that the first antenna forms a loop in a short direction of the first magnetic body part, and the second antenna is wound around the second magnetic body part so that the second antenna forms a loop in a short direction of the second magnetic body part.

9. The apparatus as claimed in claim 7 wherein the first antenna is wound in a state where the first antenna has an interval between the adjacent loops, and the second antenna is wound in a state where the second antenna has an interval between the adjacent loops.

10. The apparatus as claimed in claim 7, wherein the first antenna and the second antenna are mounted on the PCB.

11. The apparatus as claimed in claim 7, wherein the PCB includes a communication circuit to process signals received or to be transmitted by the antenna device.

* * * * *